US011619036B2

(12) United States Patent
Shakkour et al.

(10) Patent No.: US 11,619,036 B2
(45) Date of Patent: Apr. 4, 2023

(54) MODULARIZED ELECTRONIC FAUCETS

(71) Applicant: MAC Faucets, LLC, Paramount, CA (US)

(72) Inventors: Fadi Shakkour, Encino, CA (US); Roaa Nabeel Nacy, Anaheim, CA (US)

(*) Notice: Subject to any disclaimer, the term of this patent is extended or adjusted under 35 U.S.C. 154(b) by 576 days.

(21) Appl. No.: 16/662,925

(22) Filed: Oct. 24, 2019

(65) Prior Publication Data

US 2021/0123221 A1 Apr. 29, 2021

(51) Int. Cl.

| | |
|---|---|
| ***E03C 1/05*** | (2006.01) |
| ***G05D 7/06*** | (2006.01) |
| ***E03C 1/04*** | (2006.01) |
| ***E03B 7/07*** | (2006.01) |
| *E03C 1/02* | (2006.01) |

(52) U.S. Cl.

CPC .............. *E03C 1/057* (2013.01); *E03B 7/071* (2013.01); *E03B 7/075* (2013.01); *E03C 1/0403* (2013.01); *E03C 1/0404* (2013.01); *G05D 7/06* (2013.01); *G05D 7/0629* (2013.01); *E03C 2001/026* (2013.01)

(58) Field of Classification Search

CPC .. E03C 1/057; E03C 1/0404; E03C 2001/028; E03C 2001/0416

See application file for complete search history.

(56) References Cited

U.S. PATENT DOCUMENTS

| | | | | |
|---|---|---|---|---|
| 4,886,207 | A * | 12/1989 | Lee | E03C 1/057 251/30.01 |
| 5,025,516 | A * | 6/1991 | Wilson | E03C 1/057 250/221 |
| 5,984,262 | A | 11/1999 | Parsons et al. | |
| 6,006,784 | A * | 12/1999 | Tsutsui | E03C 1/057 137/359 |
| 7,174,577 | B2 * | 2/2007 | Jost | E03C 1/057 251/129.04 |
| 7,650,653 | B2 * | 1/2010 | Johnson | E03C 1/0401 251/367 |
| 8,348,229 | B2 * | 1/2013 | Burns | E03C 1/057 251/129.06 |
| 9,133,607 | B2 * | 9/2015 | Schoolcraft | E03C 1/057 |
| 9,587,384 | B2 * | 3/2017 | Schoolcraft | E03C 1/0404 |
| 2008/0115836 | A1 * | 5/2008 | Hsieh | E03C 1/057 137/88 |
| 2019/0024351 | A1 * | 1/2019 | Schloss | E03B 7/075 |
| 2019/0234058 | A1 | 8/2019 | Shakkour et al. | |

OTHER PUBLICATIONS amazon.com; Visited Website Jul. 26, 2019 ; Serached for Duck-Bill Valve Kit Pair.

* cited by examiner

*Primary Examiner* — Reinaldo Sanchez-Medina

(74) *Attorney, Agent, or Firm* — Patent Law Agency, LLC; Peter Ganjian

(57) ABSTRACT

An electronic faucet that has a controller module cartridge that is detachably connected to a spout assembly by an adapter.

25 Claims, 84 Drawing Sheets

MODULARIZED ELECTRONIC FAUCETS

CROSS-REFERENCE TO RELATED APPLICATIONS

All documents mentioned in this specification are herein incorporated by reference to the same extent as if each individual document was specifically and individually indicated to be incorporated by reference.

It should be noted that throughout the disclosure, where a definition or use of a term in any incorporated documents) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to electronic (or automatic) faucets and more particularly, to modularized electronic faucets with a controller module in a form of a cartridge.

Description of Related Art

Conventional electronic faucets are well known and have been in use for a number of years. In general, conventional electronic faucets are comprised of multiple complex parts, any one or more of which may fail due to a variety of reasons, including normal wear and tear, corrosion, etc. In general, due to the shear number and complexity of the components of the electronic faucet, it is a difficult, labor-intensive task to diagnose the cause of failure of the electronic faucets.

Additionally, replacement of faulty parts and components has the added complexity in that parts vary from manufacturer to manufacturer and from model to model (i.e., specialty items), therefore parts are seldom stocked by local plumbing wholesalers and distributors let alone the service contractor. This leads to long downtime while parts are ordered.

When a conventional electronic faucet fails, it may require extensive plumbing and sometimes, construction work. Alternatively, costly, exorbitant amount of labor and time is used to diagnose and identify which, of the multiplicity of its complex components have failed so that the failed components may be replaced.

Further, conventional electronic faucets cannot be partially upgraded without changing the entire unit. For example, the faucet design (its look and feel) may be desirable to a user, but they may wish to upgrade its electronic controller only without changing the actual faucet. This type of partial upgrade may be, impossible with existing conventional electronic faucets.

Accordingly, in light of the current state of the art and the drawbacks to existing electronic faucets, a need exists for an electronic faucet that would be easy to assemble/disassemble, upgrade (or partially upgrade) to new systems, and easy to maintain with no need or requirement for diagnoses to determine specific component failure, component replacement, plumbing/construction skills, or specialized plumbing tools.

BRIEF SUMMARY OF THE INVENTION

A non-limiting, exemplary aspect of an embodiment of the present invention provides an electronic faucet, comprising:

a spout assembly;

a controller module cartridge; and an adapter;

the spout assembly is detachably connected to a spout-terminal of the adapter, and the controller module cartridge is detachably connected to a controller terminal of the adapter.

Another non-limiting, exemplary aspect of an embodiment of the present invention provides an electronic faucet, comprising:

a controller module cartridge that is detachably connected to a spout assembly by an adapter, without tools for detaching.

Yet another non-limiting, exemplary aspect of an embodiment of the present invention provides an electronic faucet, comprising:

a spout assembly;

a controller module cartridge; and an adapter;

the spout assembly is detachably connected to a spout-terminal of the adapter, and the controller module cartridge is detachably connected to a controller terminal of the adapter by a latching mechanism.

A further non-limiting, exemplary aspect of an embodiment of the present invention provides an electronic faucet, comprising:

a spout assembly;

a controller module cartridge; and an adapter;

wherein: as the controller module cartridge engages the adapter, flow of water and optical signals are enabled between the spout assembly and the controller module cartridge only when the controller module cartridge is installed;

wherein: as the controller module cartridge, disengages the adapter, flow of water and communication signals are disabled between spout assembly and the controller module cartridge.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention provide a modularized electronic faucet that is easy to assemble and disassemble, upgrade (or partially upgrade) to new systems, and easy to maintain with no need or requirement for diagnoses to determine specific component failure, component replacement, plumbing/construction skills, or specialized plumbing tools.

Figure 1:
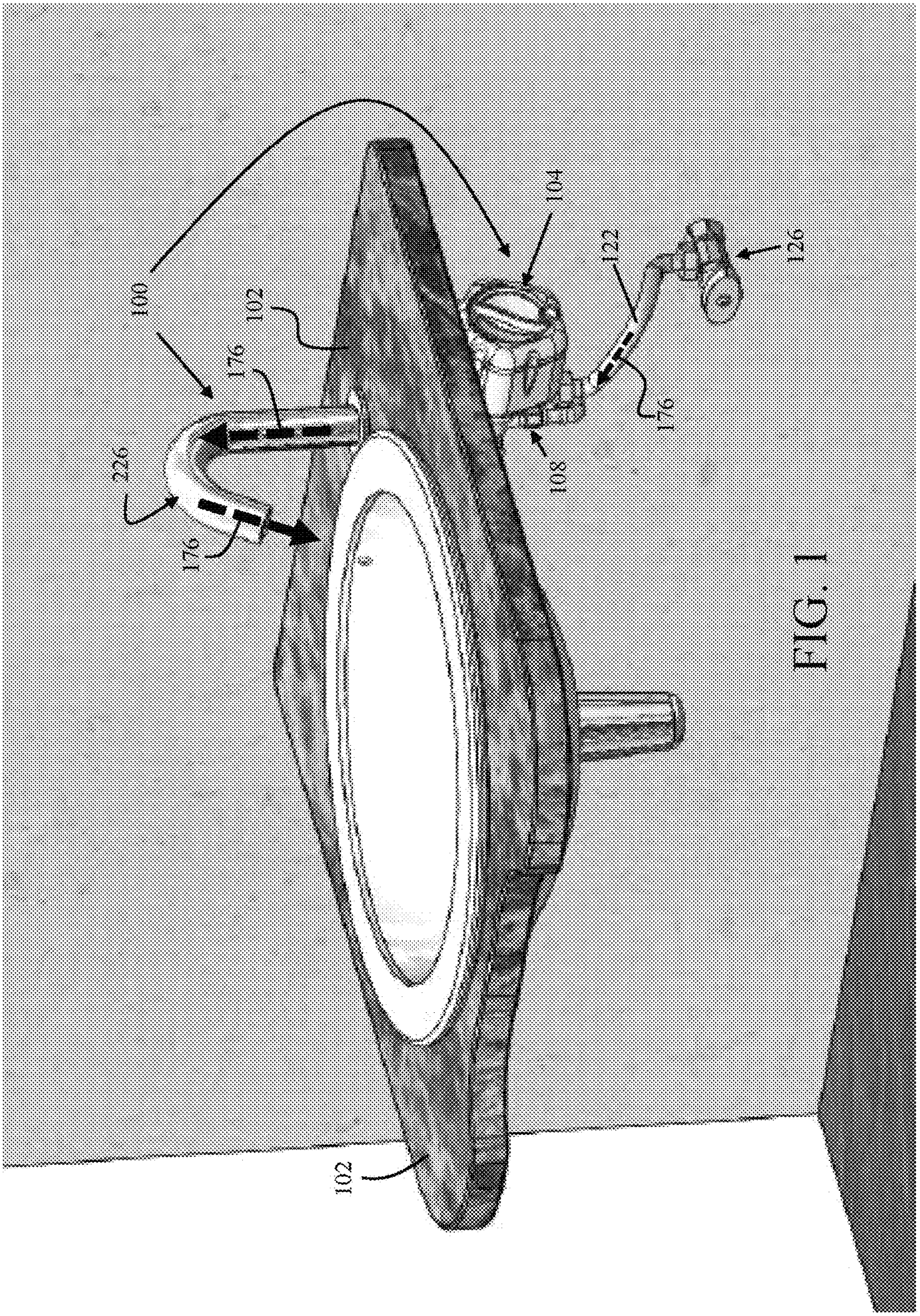
FIG. 1 is a non-limiting, exemplary illustration of a modularized electronic, faucet fully installed onto a base in accordance with one or more embodiments of the present invention.
Figure 2A:
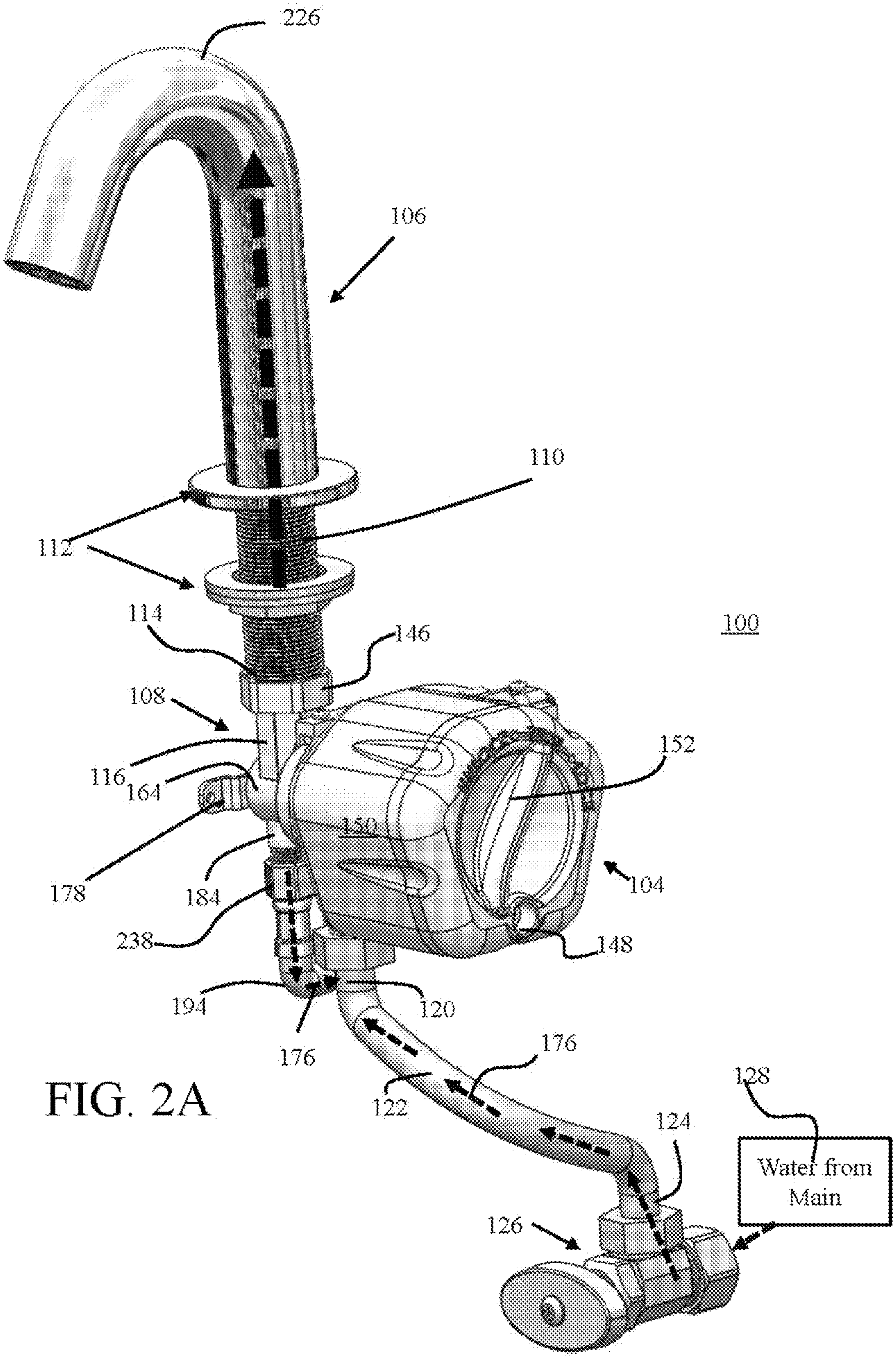
FIGS. 2A to 2I are non-limiting, exemplary illustrations of various views of the modularized electronic faucet shown in FIG. 1, but without the vanity in accordance with one or more embodiments of the present invention.
Figure 2B:
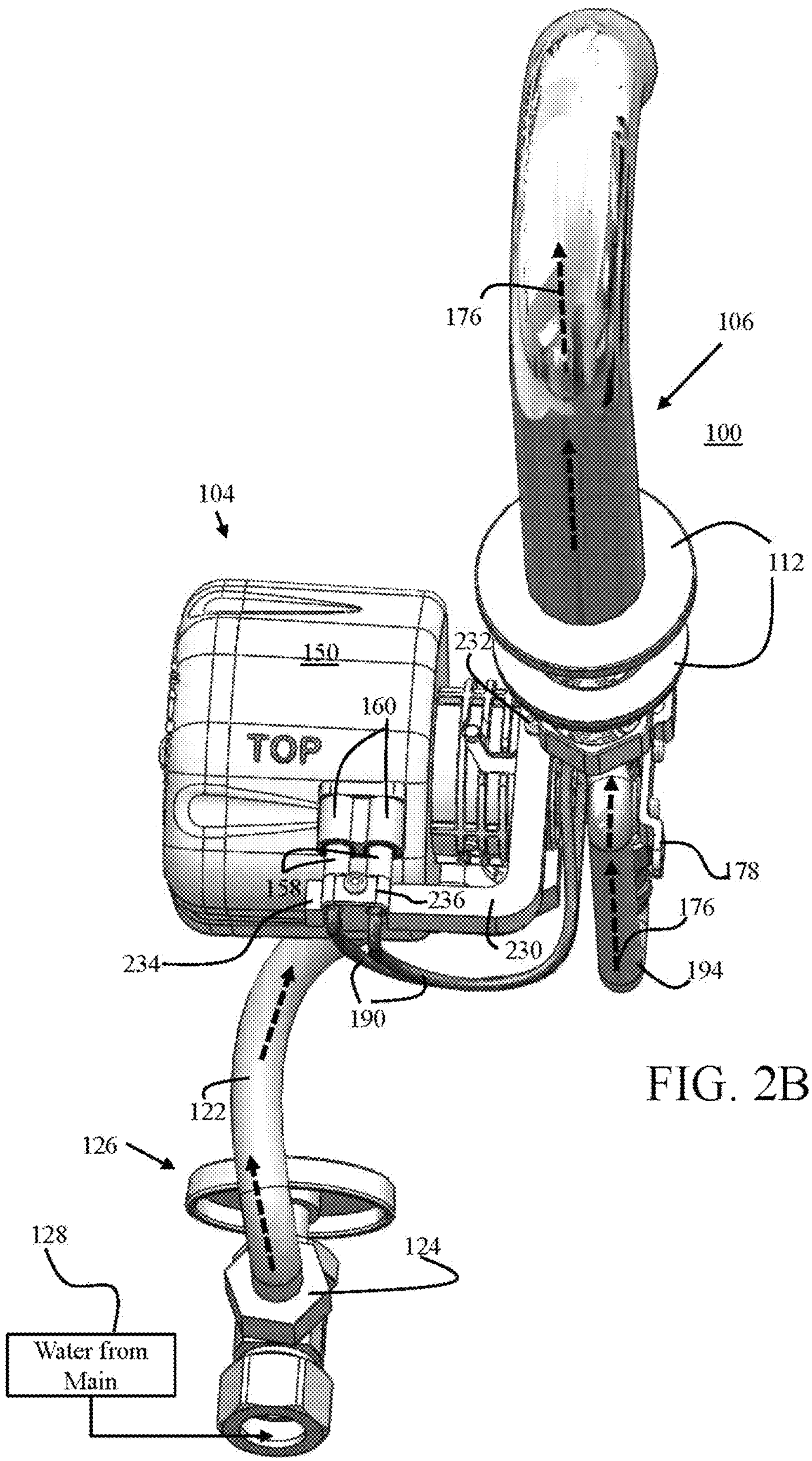
Figure 2C:
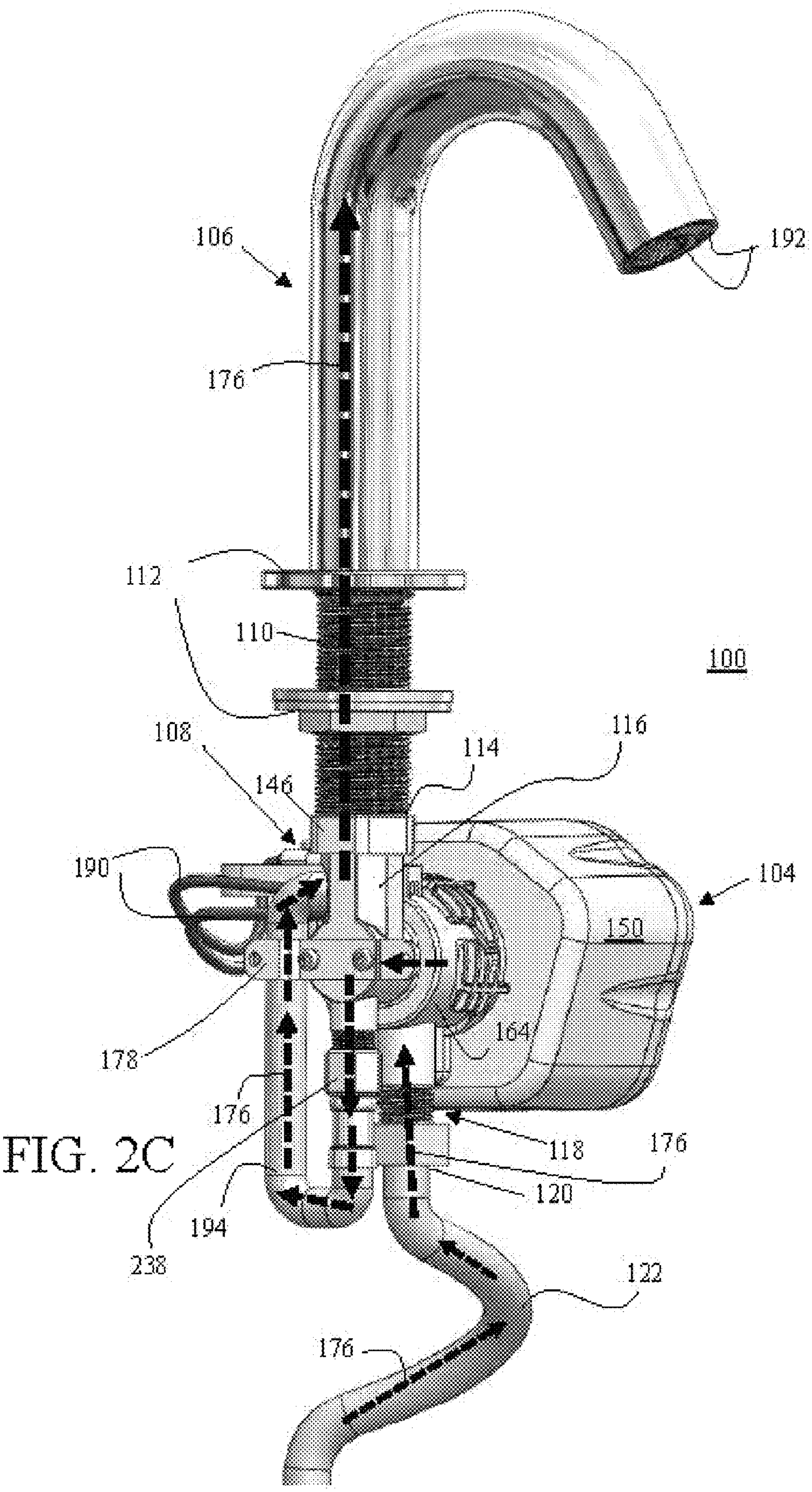
Figure 2D:
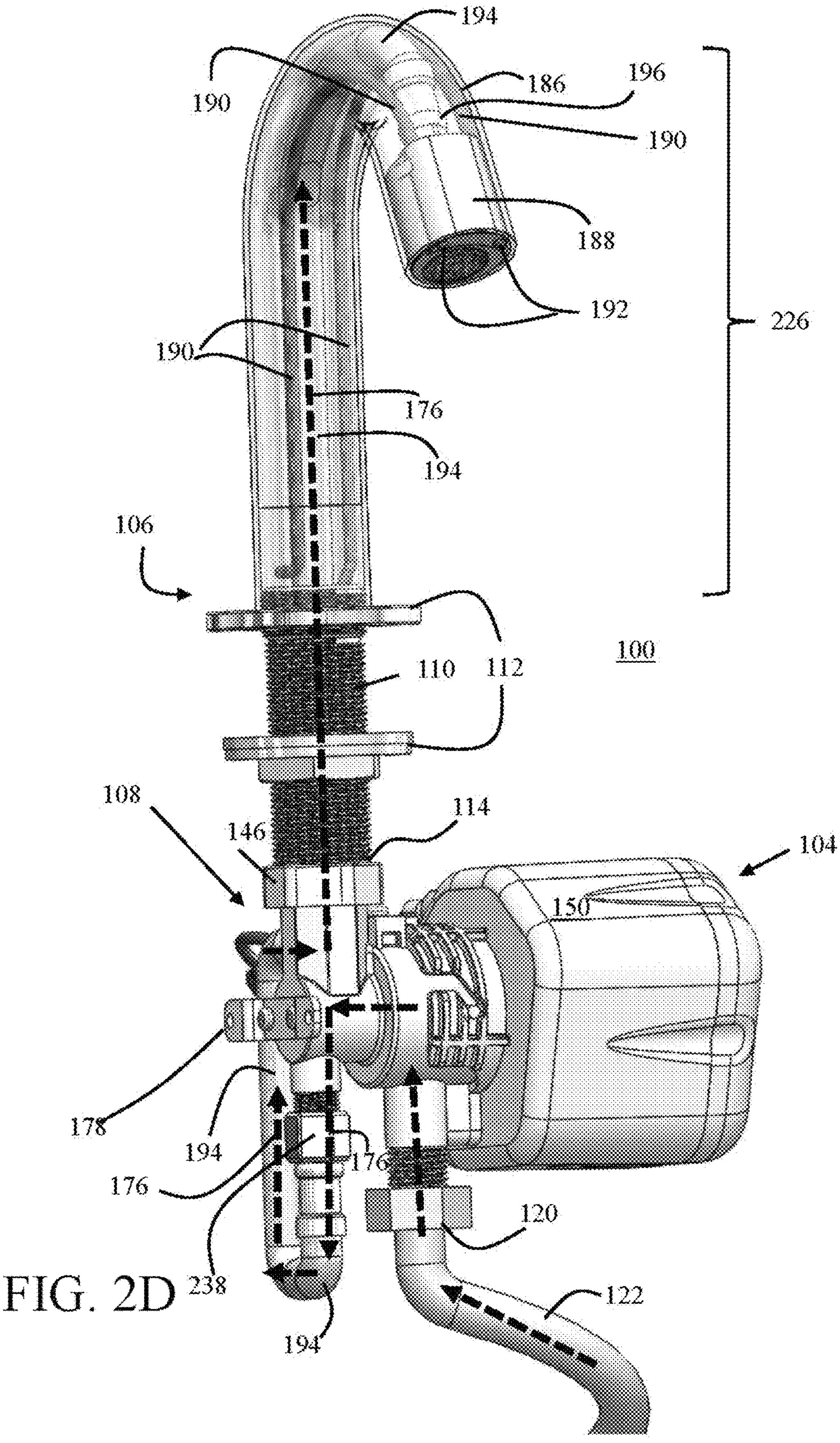
Figure 2E:
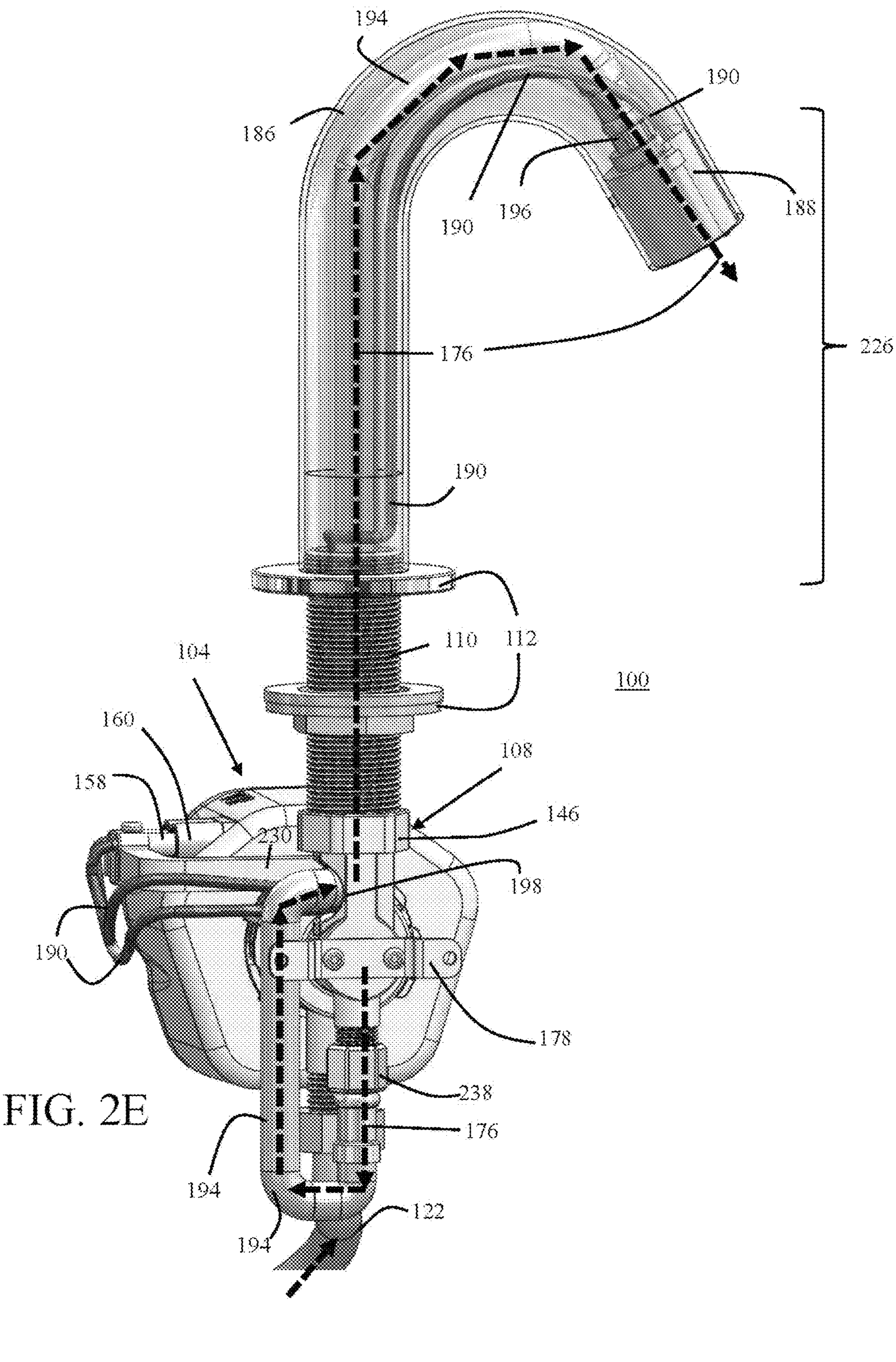
Figure 2F:
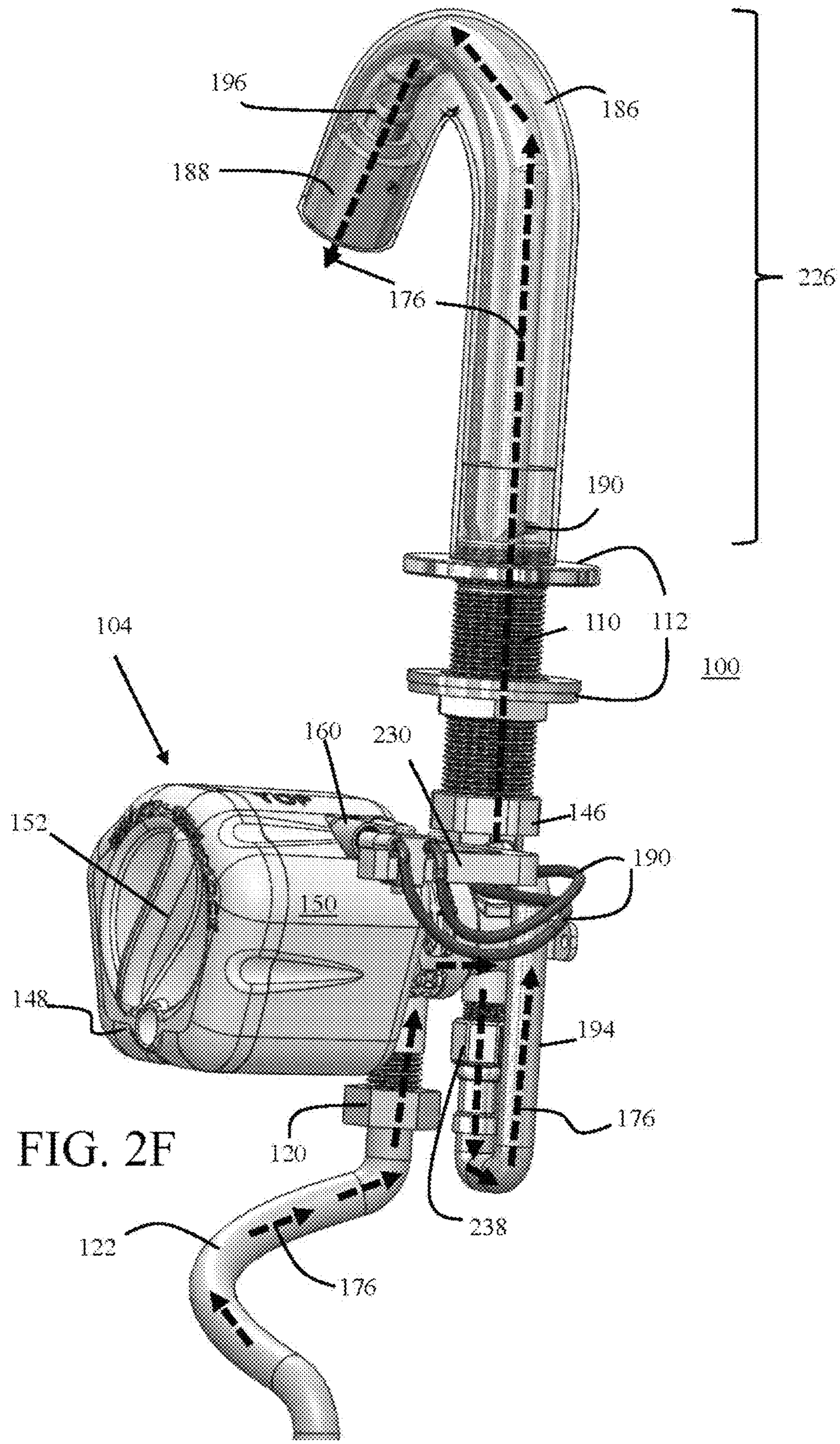
Figure 2G:
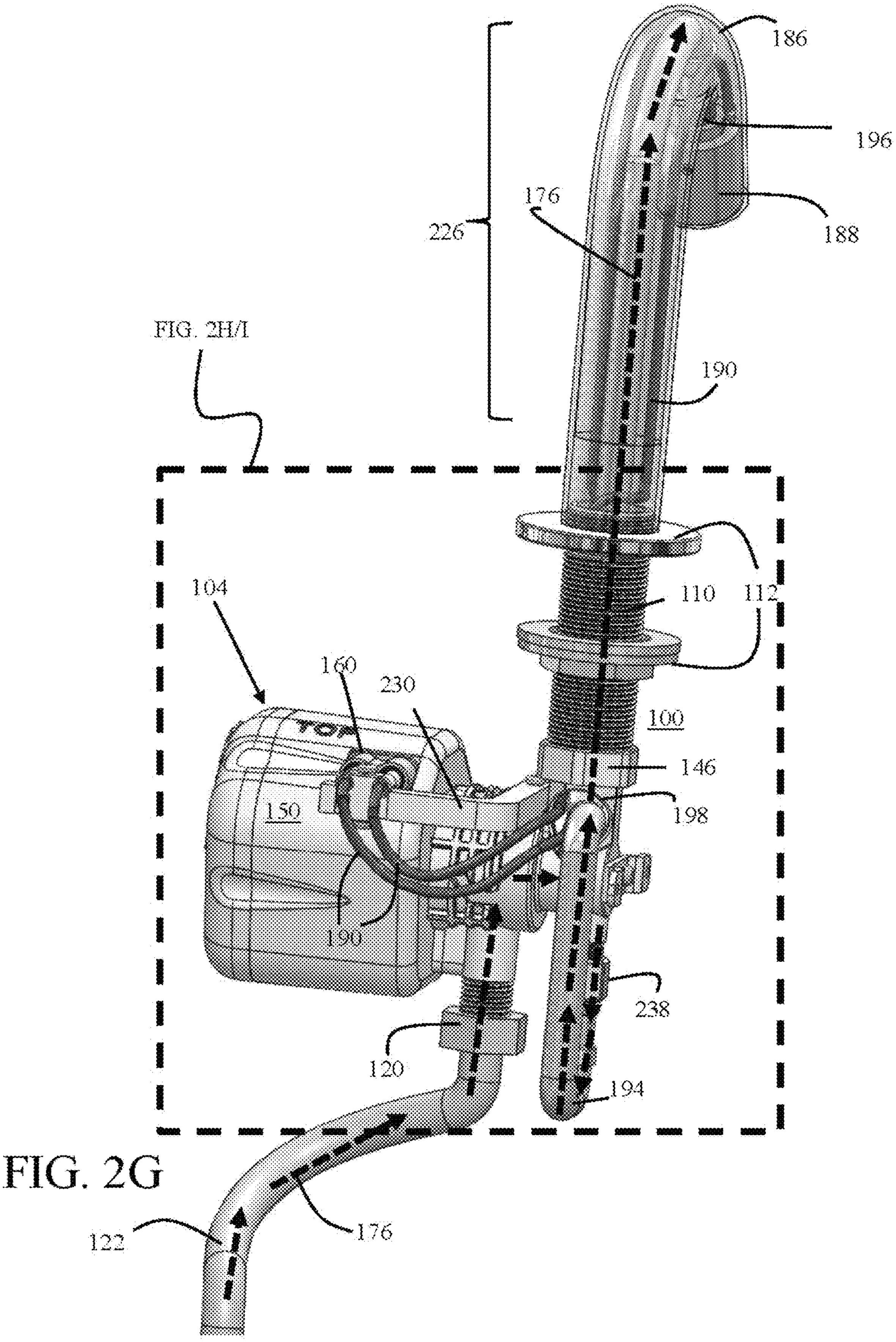
Figure 2H:
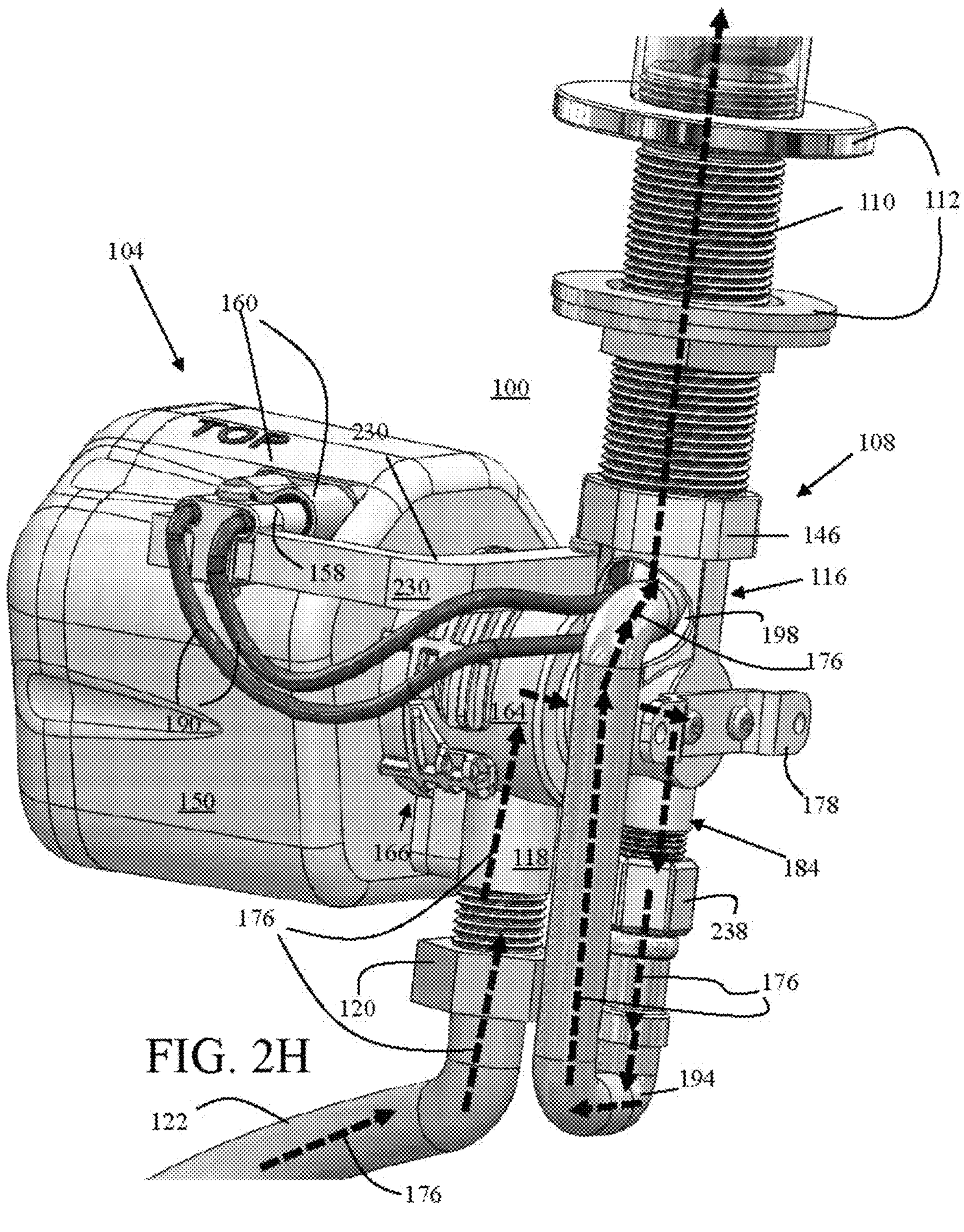

FIG. 1 is a non-limiting, exemplary illustration of a modularized electronic faucet fully installed onto a base in accordance with one or more embodiments of the present invention. As illustrated, the look, feel, and use of modularized electronic faucet 100 from a user's point of view standing in front of a vanity 102 is the same as conventional electronic faucet As a use example, modularized electronic faucet 100 may be used by users to wash hands in the same manner as a conventional electronic faucet. Users simply extend their hands towards spout 226, which includes detector-ends 192 (FIG. 2D) of plastic optical fiber 190 communicatively associated with electronic controller module circuitry 218. Once the user hands are detected by electronic controller module circuitry 218 (best shown in FIG. 5C), water is automatically enabled to flow (shown by dashed arrows 176) through spout 226 to enable users to wash their hands.

FIGS. 2A to 2I are non-limiting, exemplary illustrations of various views of the modularized electronic faucet shown in FIG. 1, but without the vanity in accordance with one or more embodiments of the present invention.

Figure 2I:
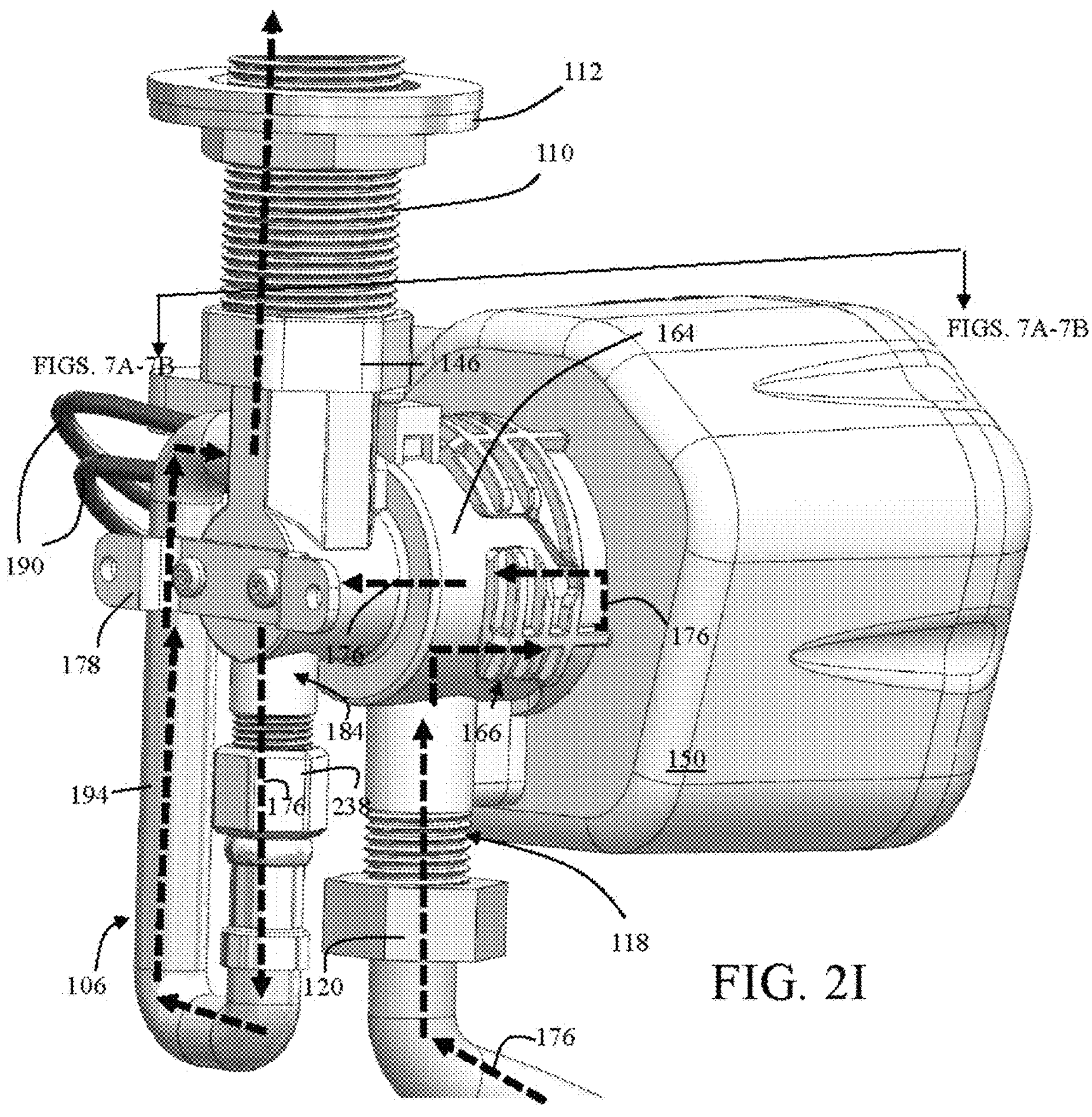

As illustrated in FIGS. 1 to 2I, modularized electronic faucet 100 is comprised of controller module cartridge 104 in a form of a replaceable cartridge, a spout assembly 106 that includes spout 226, and an adapter 108, which enables controller module cartridge 104 to connect to spout assembly 106.

As shown in FIGS. 1 to 2I, spout assembly 106 may be mechanically connected to vanity 102 in a very well-known conventional manner by spout shank 110 secured by well-known shank nut/washer-base combination 112. However, shank end 114 of spout assembly 106 may be connected to a spout-terminal 116 of adapter 108 in accordance with one or more embodiments of the present invention as further detailed below in relation to FIG. 8.

Adapter 108 includes a main inlet 118 (FIG. 2C) that may be connected to an egress end 120 of a flexible hose 122, an ingress end 124 of which flexible hose 122 may be connected to a well-known conventional main water valve 126 of water from main 128 (or other upstream fixtures).

Adapter 108 further includes a controller terminal 164 to which controller module cartridge 104 is detachably connected. It should be noted that adapter 108 may easily be optionally connected to a wall (if need be) by a connector 178.

As illustrated throughout most of the figures, water flow 176 from water from main 128 through upstream fixture 126, and, into main inlet 118 (best shown in FIG. 2C or 2I) of adapter 108. As detailed below, main inlet 118 includes a main inlet valve 180 (FIG. 4A) that may be shut-OFF or turned ON automatically when removing or installing controller module cartridge 104.

As shown in FIG. 2I, water flow 176 passed main inlet valve 180 (FIG. 4A) via main inlet 118 of adapter 108 enters controller terminal 164 of adapter 108, flow 176 of which is further controlled by controller module cartridge 104 (detailed below).

Flow 176 of water continues from controller module cartridge 104 back into controller terminal 164 of adapter 108, passing a check valve 182 (FIG. 4A) after which, flow 176 is directed to main outlet 184 of adapter 108, egressing adapter 108 and entering into spout assembly 106.

Spout assembly 106 is comprised of an esthetically pleasing shell 186 shown in FIGS. 2D to 2G (e.g., may be made of brass, or other material etc.) that encases a well-known, conventional aerator housing 188 and well-known conventional aerator.

Spout assembly 106 further includes a set of well-known plastic optical fibers (POF) 190, detector-ends 192 of which are secured with aerator housing 188. Spout assembly 106 further includes a flexible hose 194, through which water flows 176 and exits an egress end 196 of hose 194, passing through aerator before exiting. The present invention uses plastic optical fibers so to move the actual, optical sensors to inside the controller module cartridge 104. This way, all electronics, including all sensors are easily replaced when the controller module cartridge 104 is replaced, rather than replacing individual parts or components.

An ingress end 238 of hose 194 is connected to main outlet 184 of adapter 108. Accordingly, water flows 176 from main outlet 184 of adapter 108 and into hose 194 of spout, assembly 106 before exiting through aerator. It should be noted that hose 194 is routed through a relief opening 198 (FIG. 2H) of spout terminal 116 of adapter 108 and into shank 110 of shell 186 of spout assembly 106.

Figure 3A:
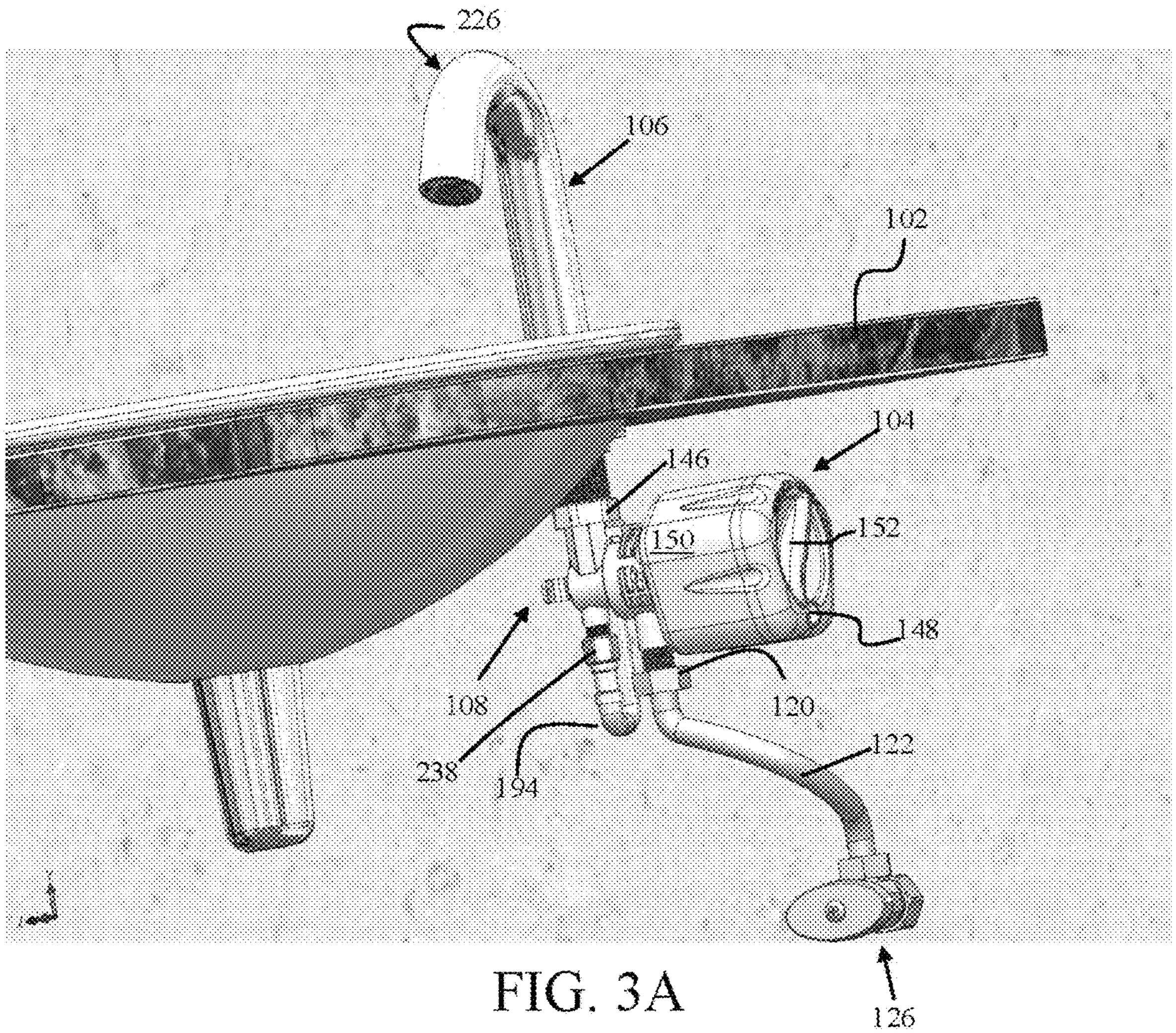
FIG. 3A to 3S are non-limiting, exemplary illustrations that progressively illustrate from the front, the rear, and side views a non-limiting, exemplary method of removing and replacing a controller module cartridge of the modularized electronic faucet of FIGS. 1 to 2I in accordance with one or more embodiments of the present invention.
Figure 3B:
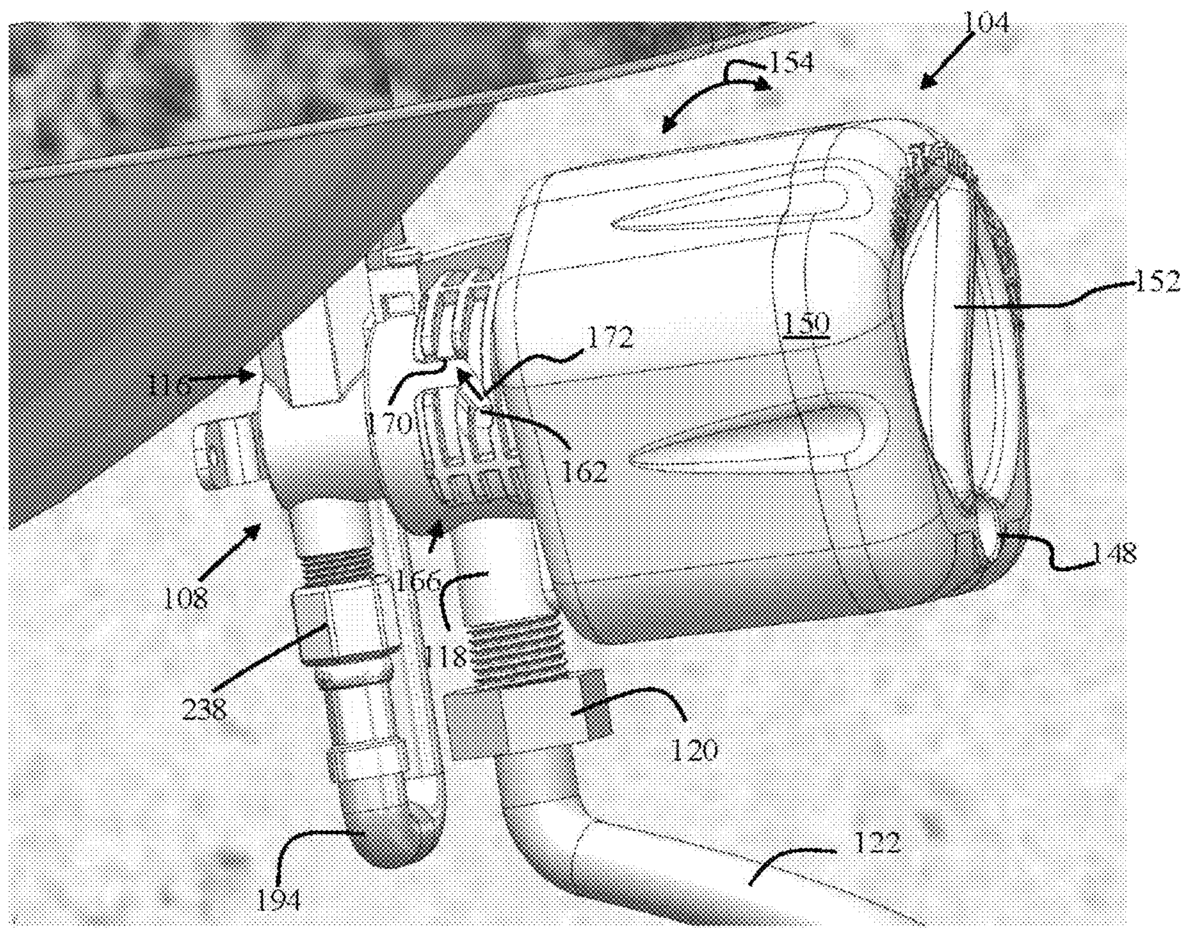
Figure 3C:
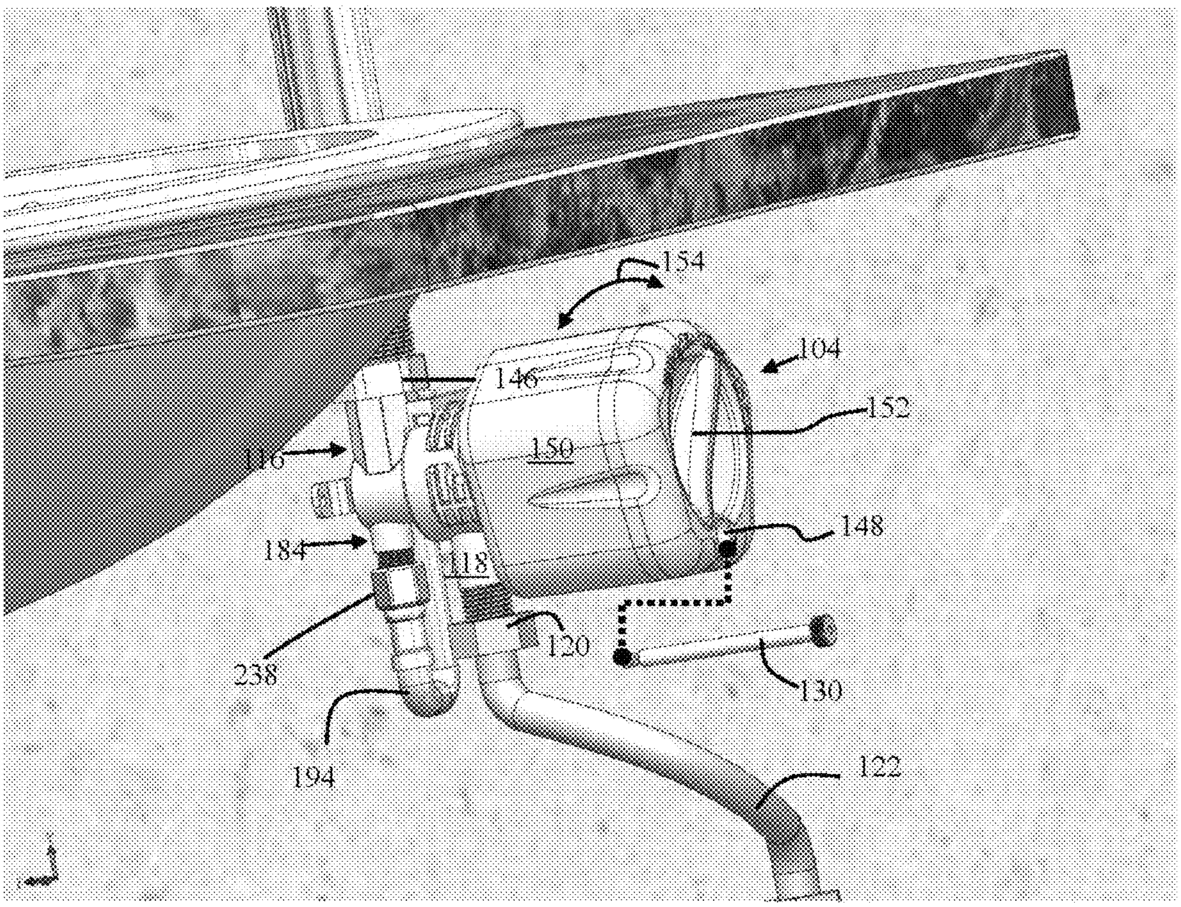
Figure 3D:
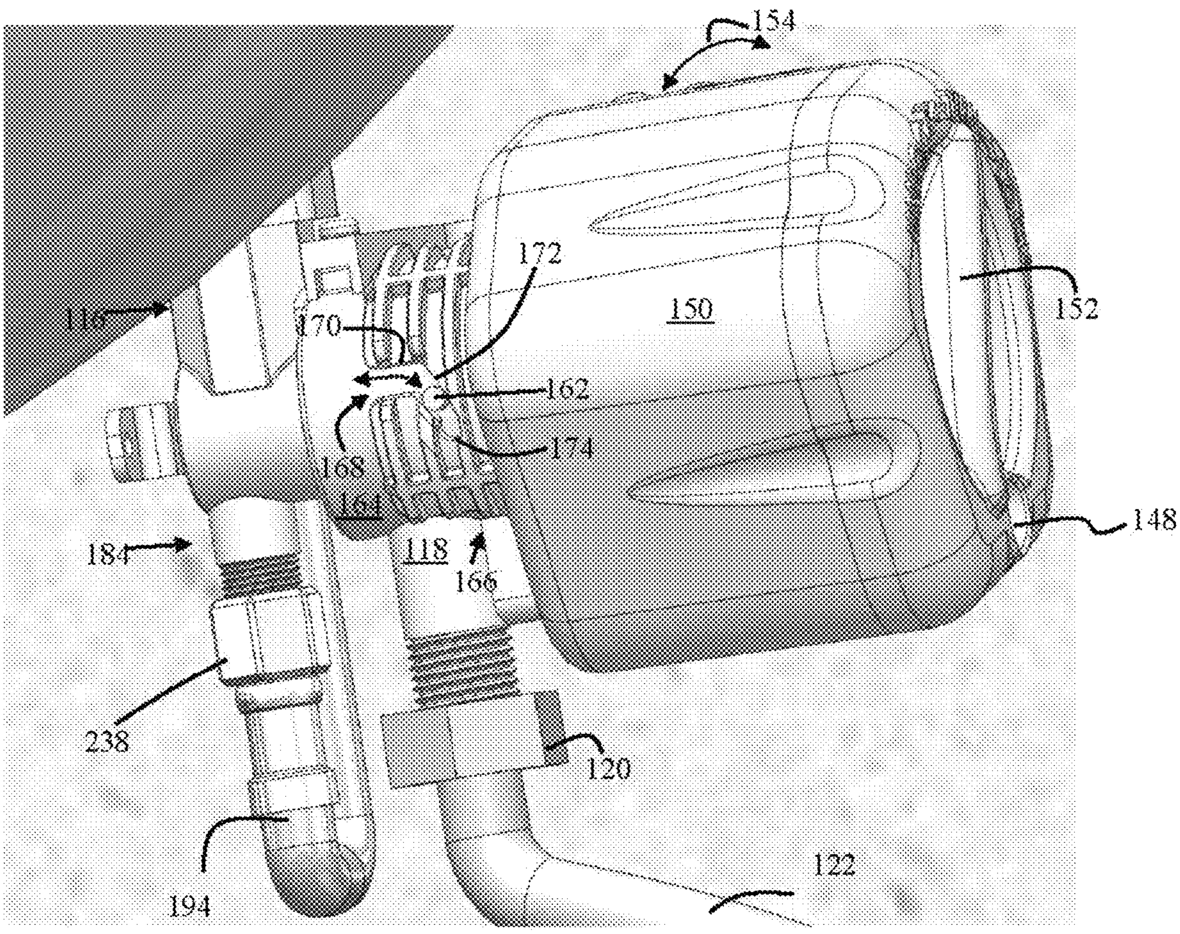
Figure 3E:
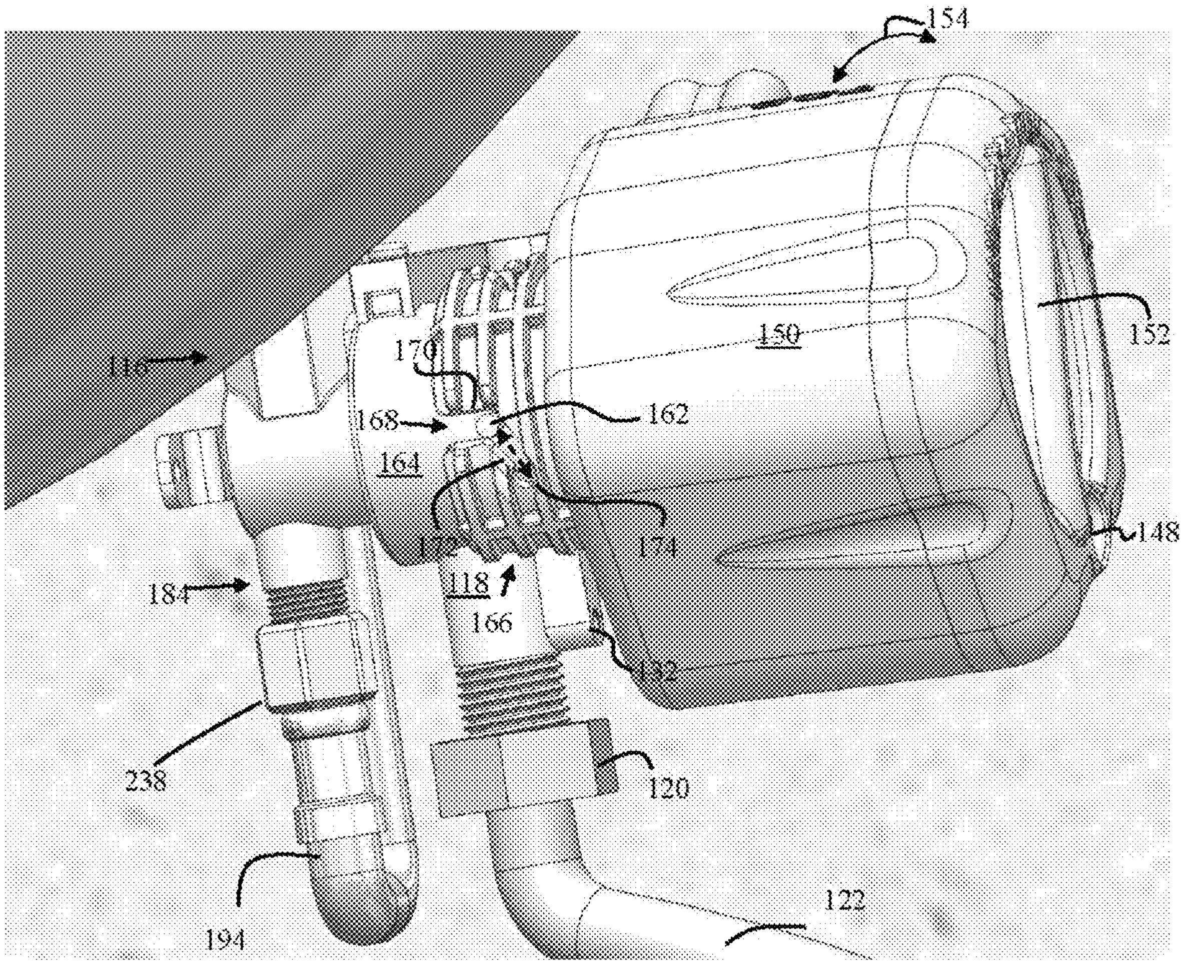
Figure 3F:
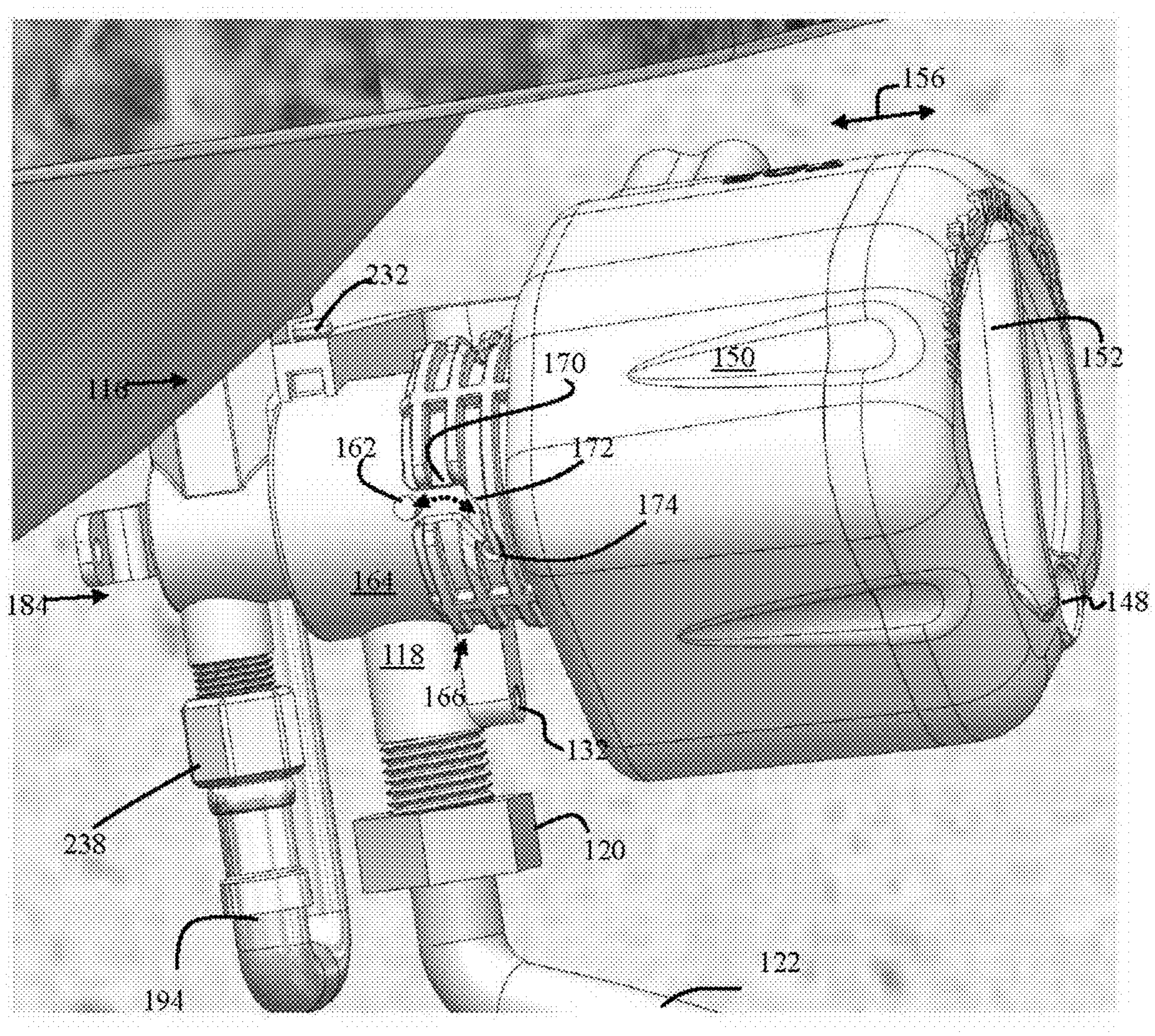
Figure 3G:
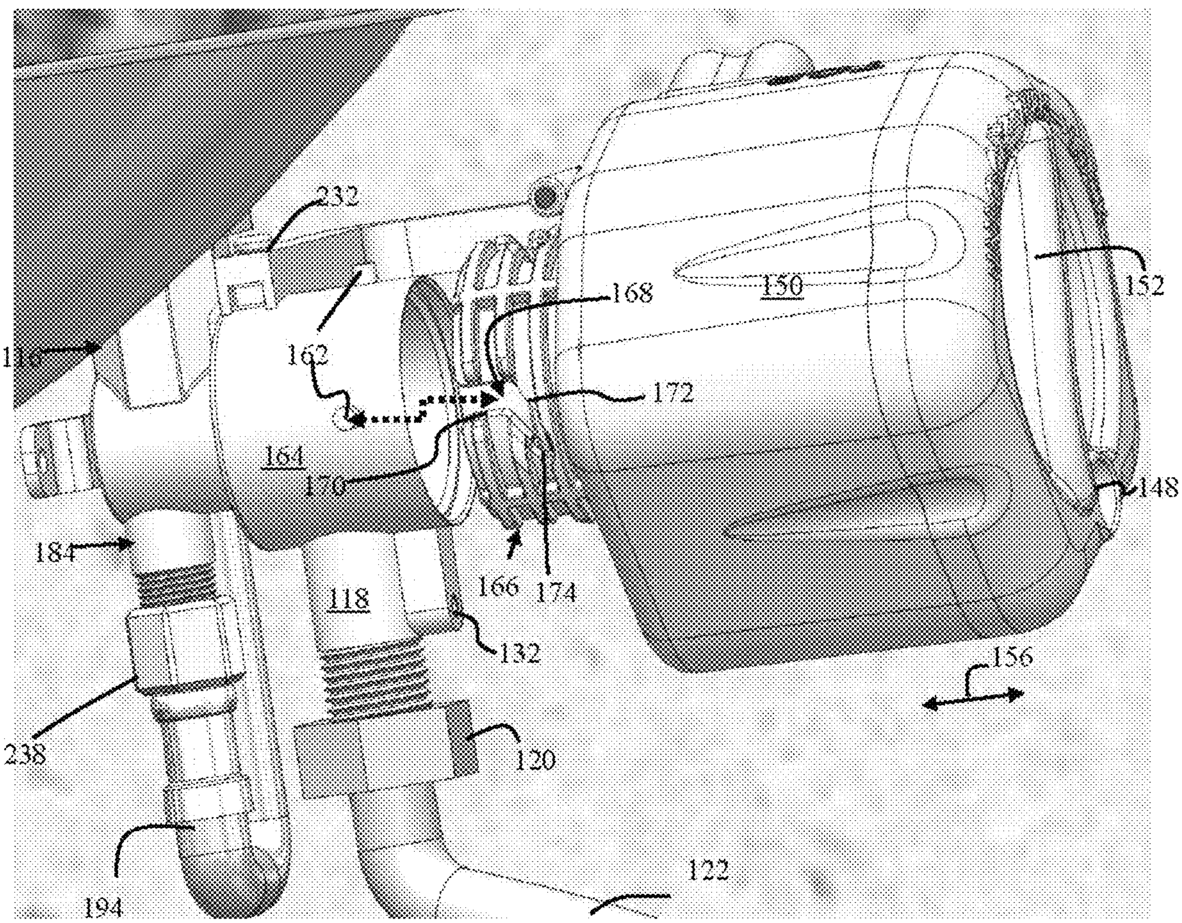
Figure 3H:
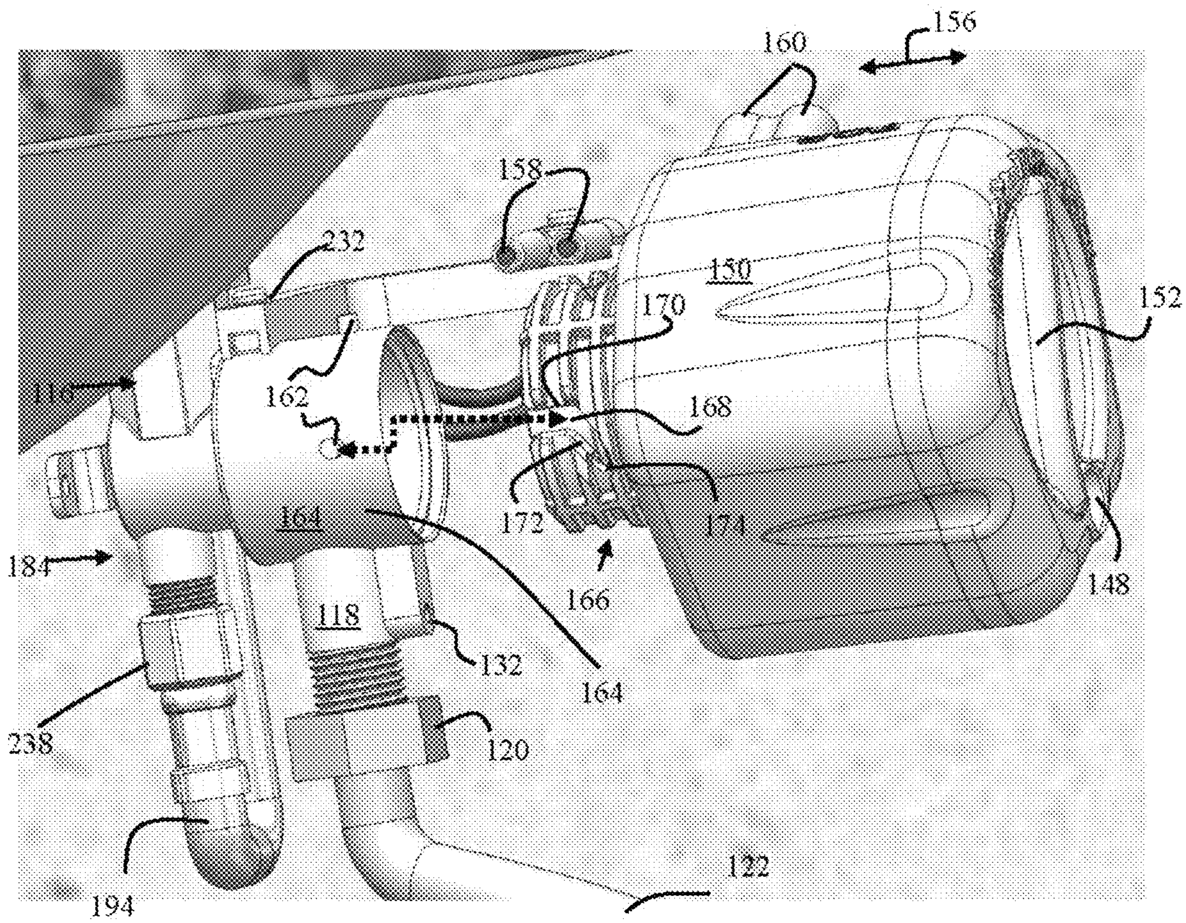
Figure 3I:
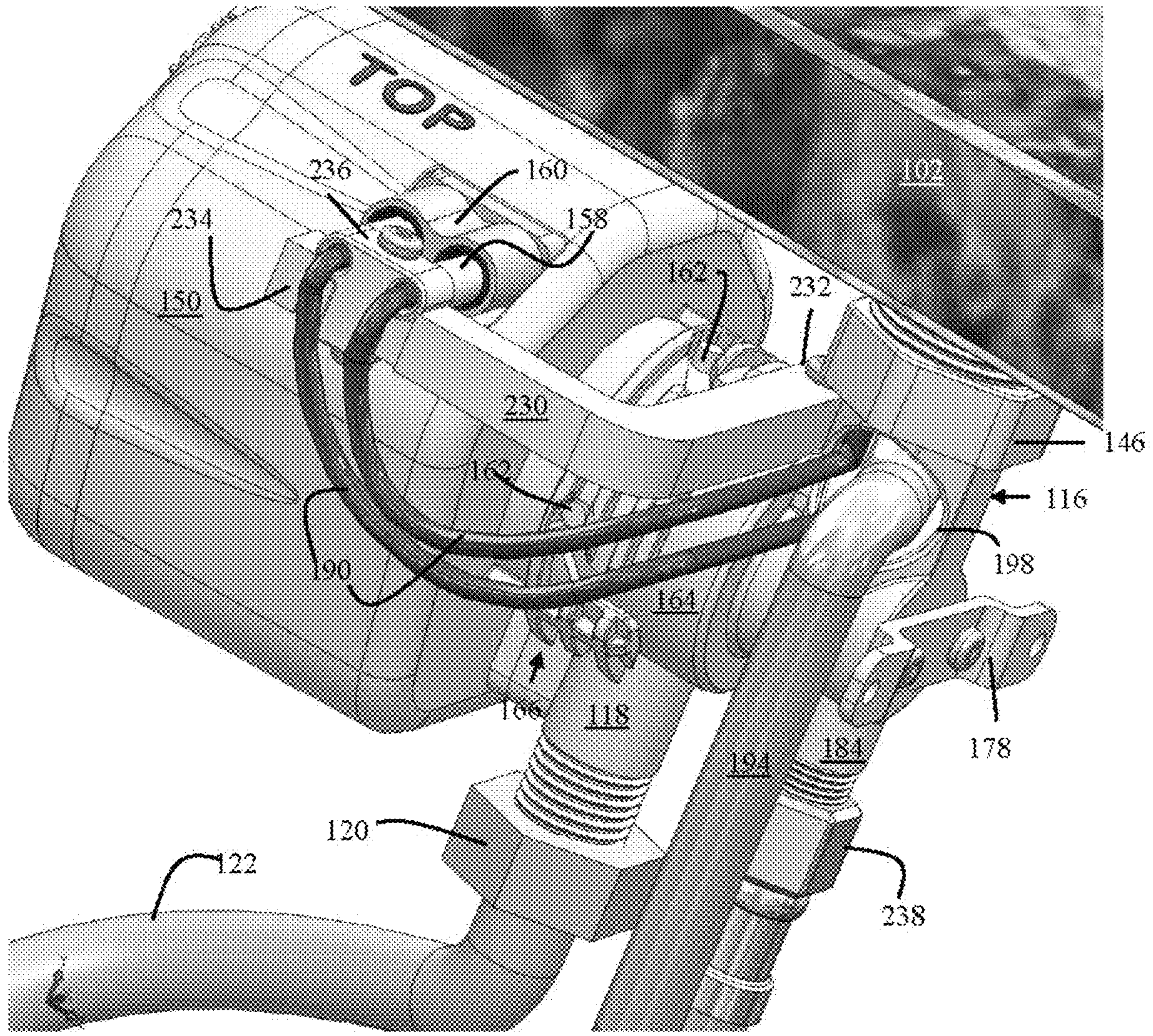
Figure 3J:
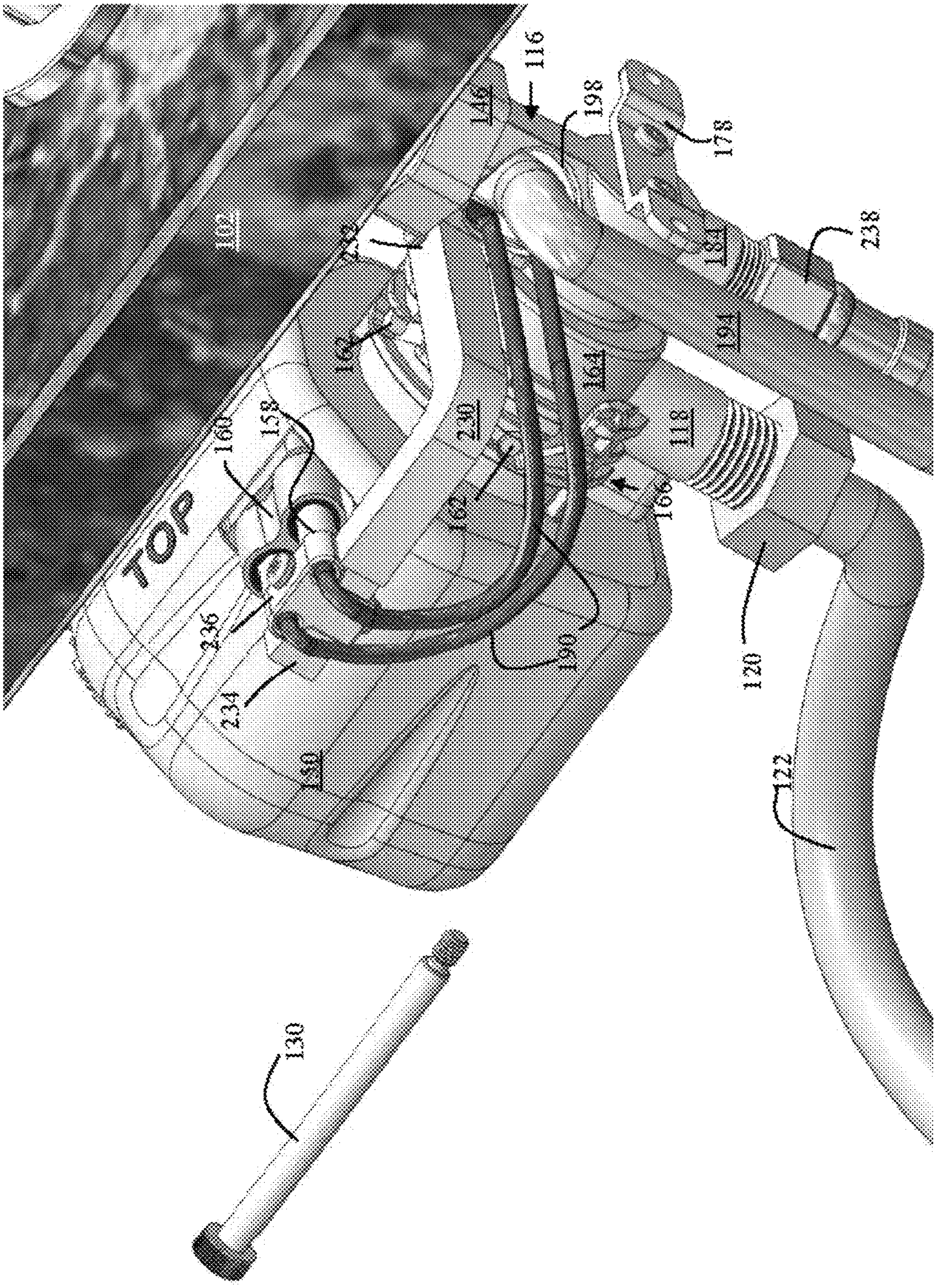
Figure 3K:
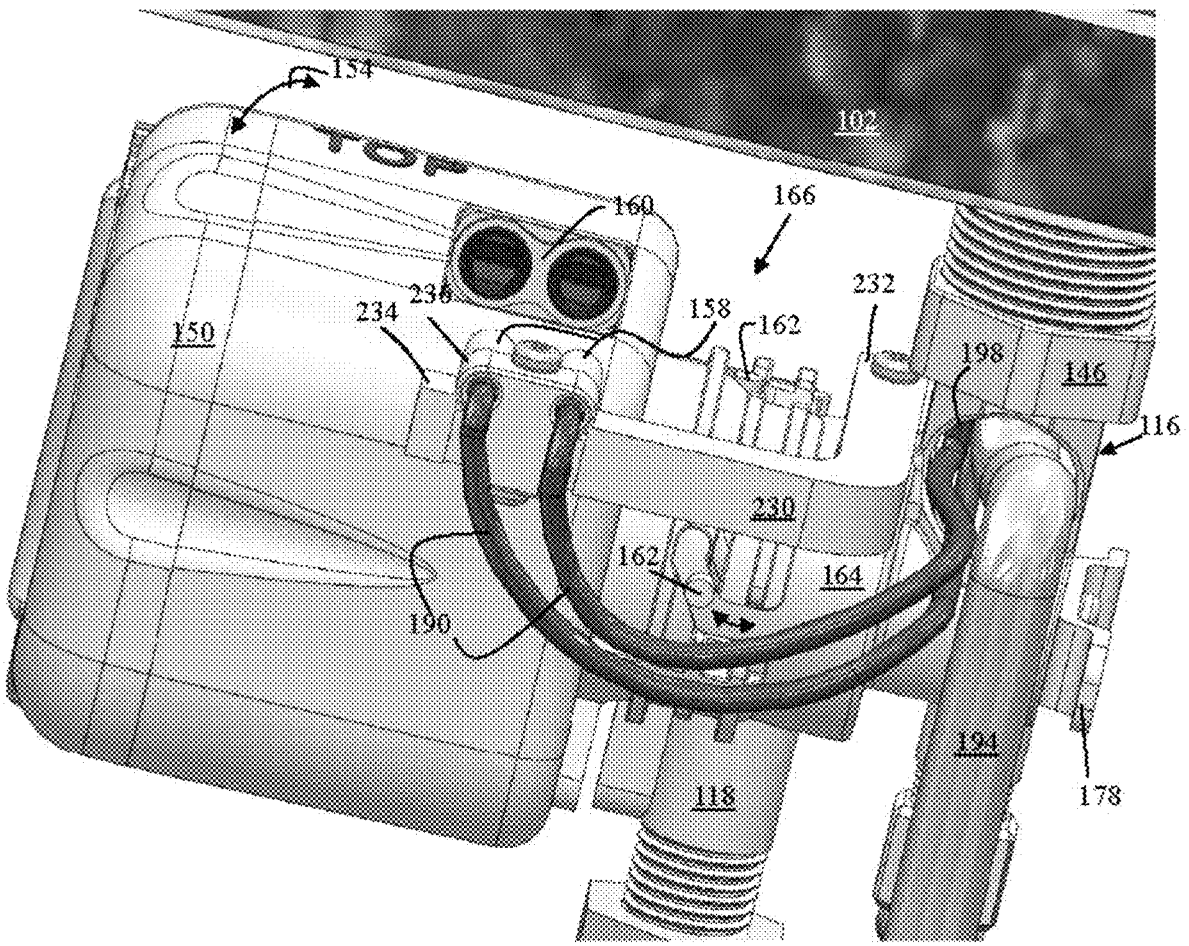
Figure 3L:
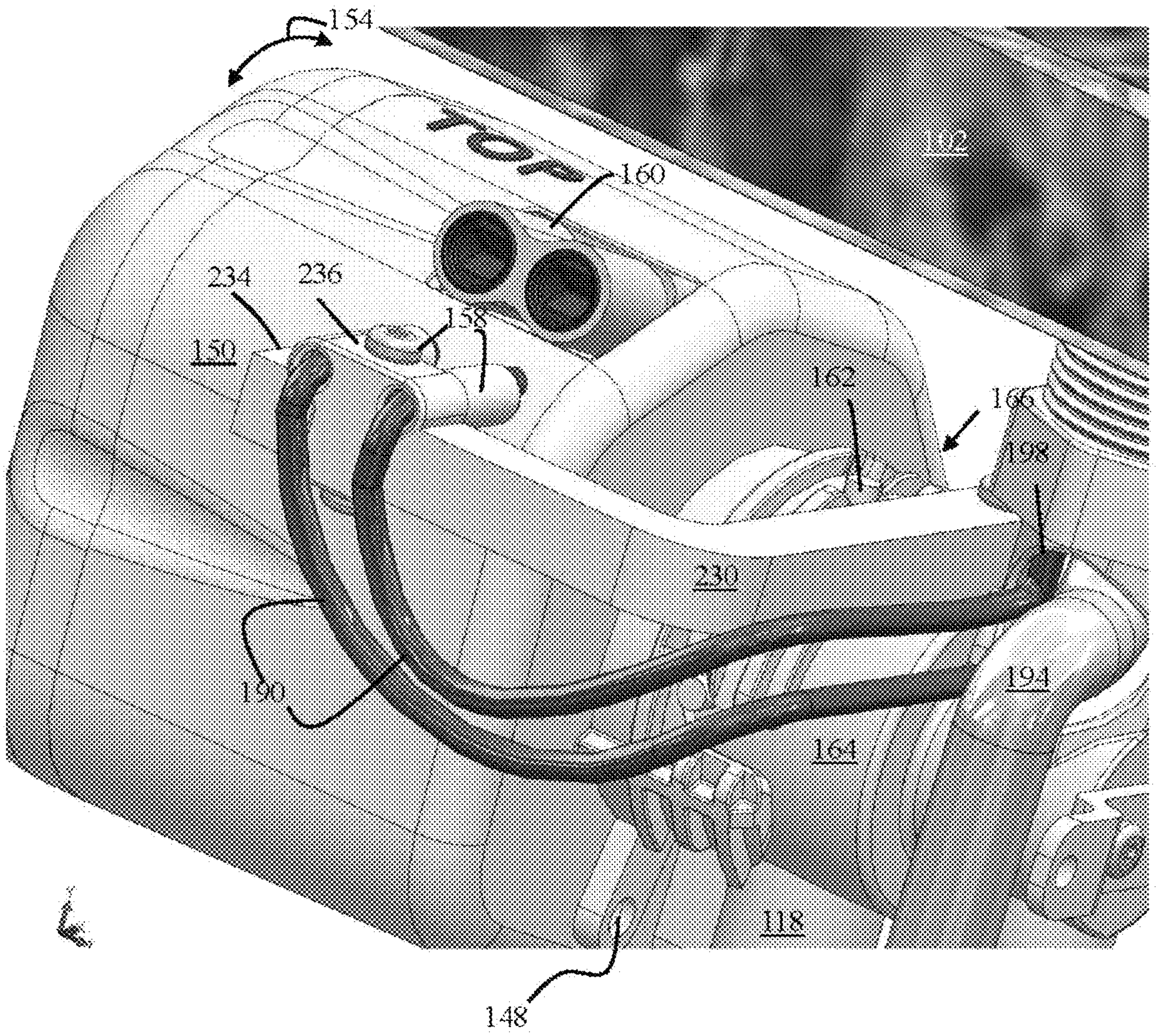
Figure 3M:
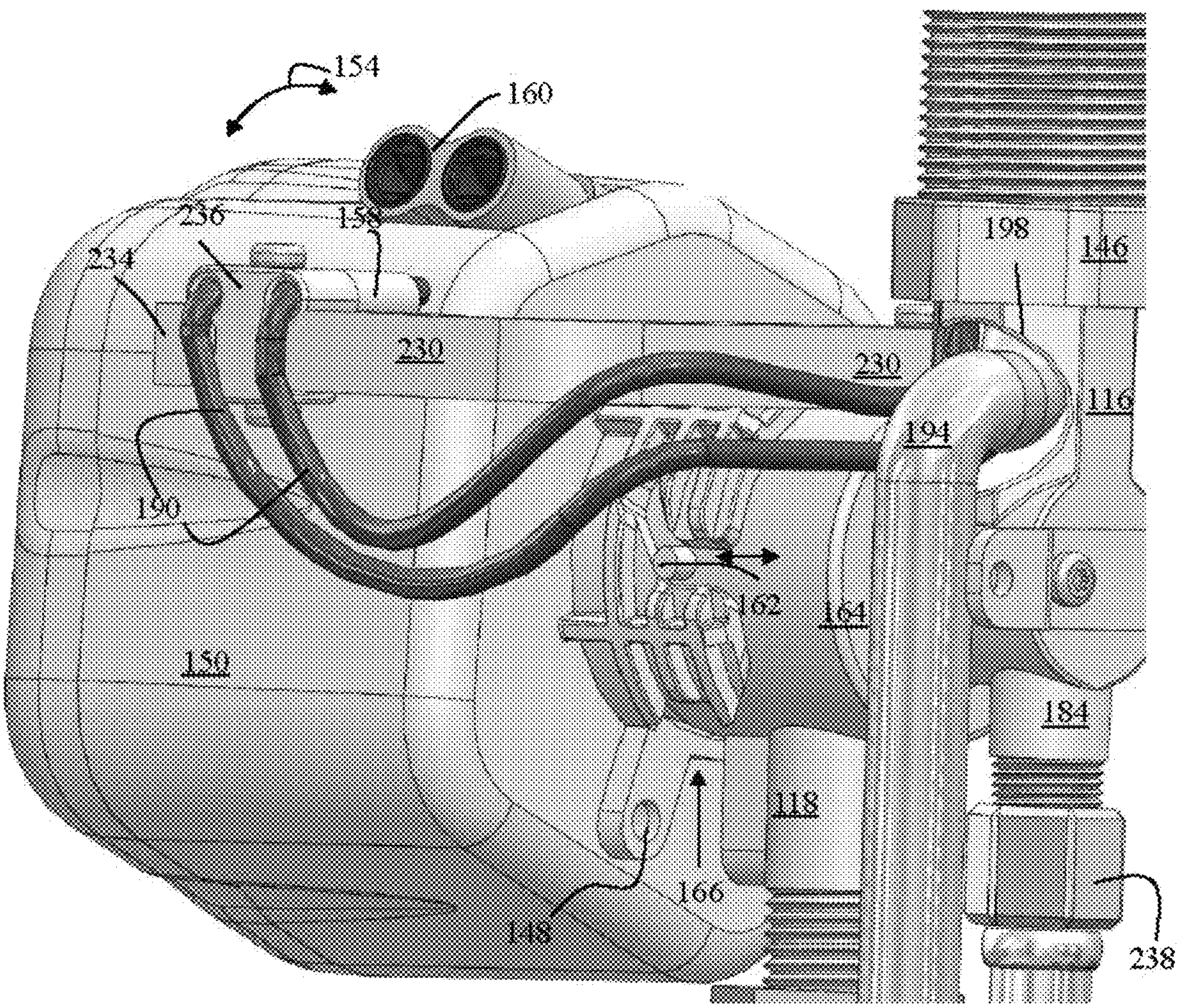
Figure 3N:
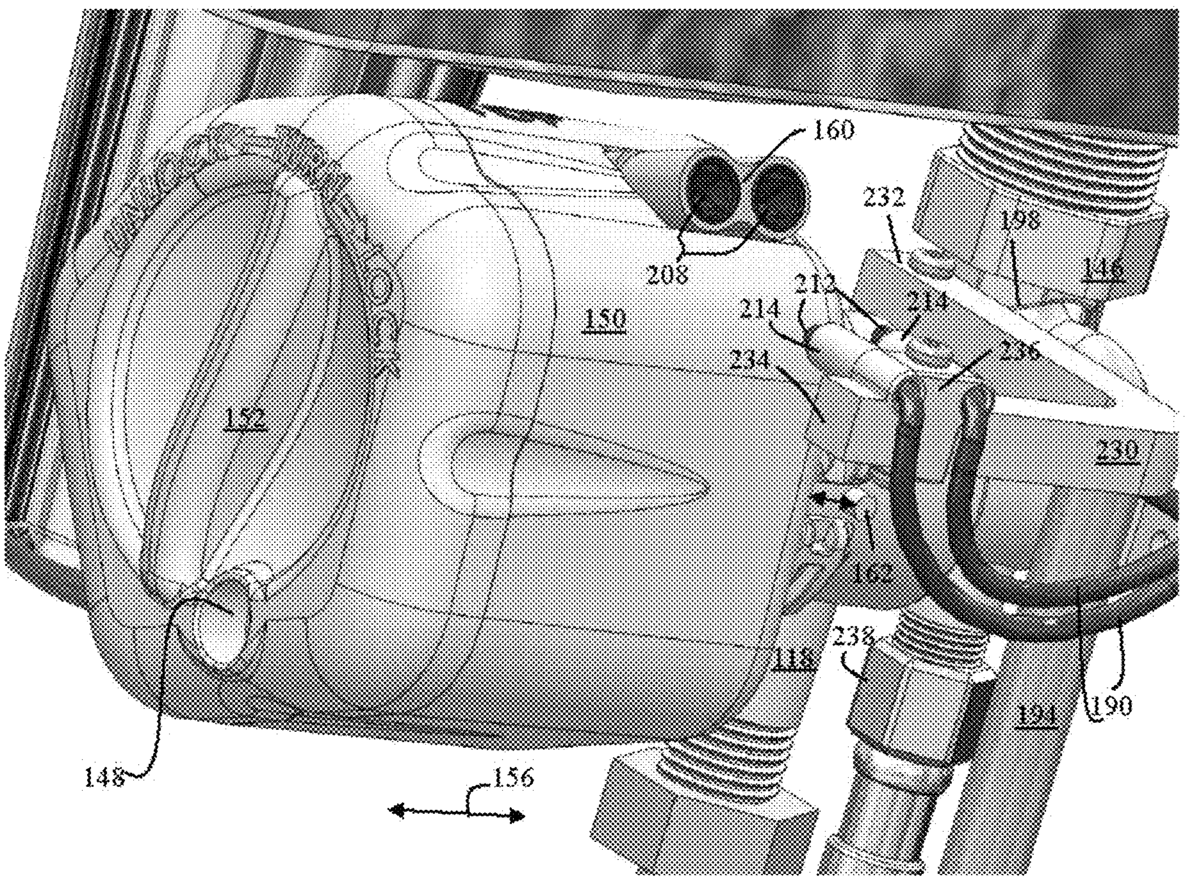
Figure 3O:
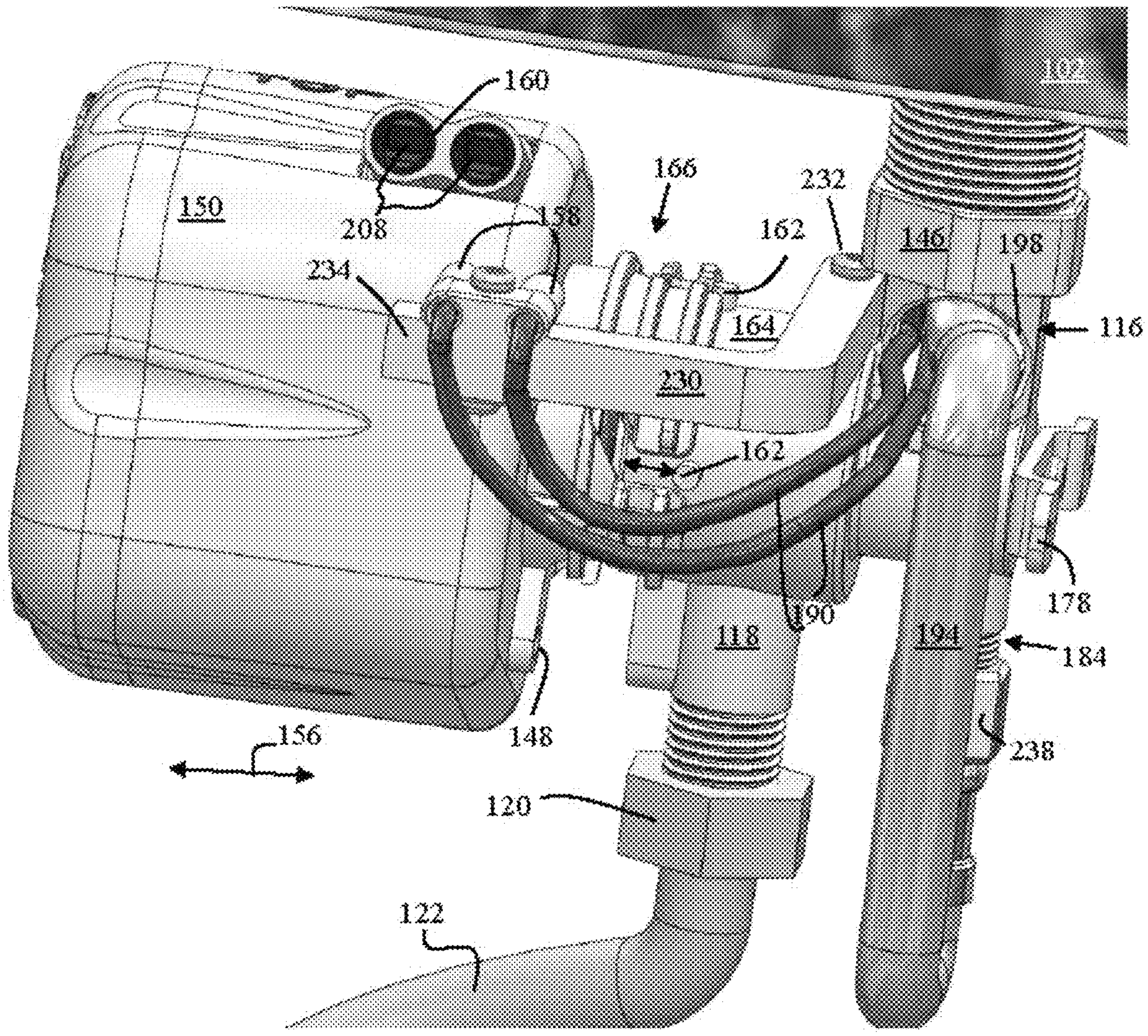
Figure 3P:
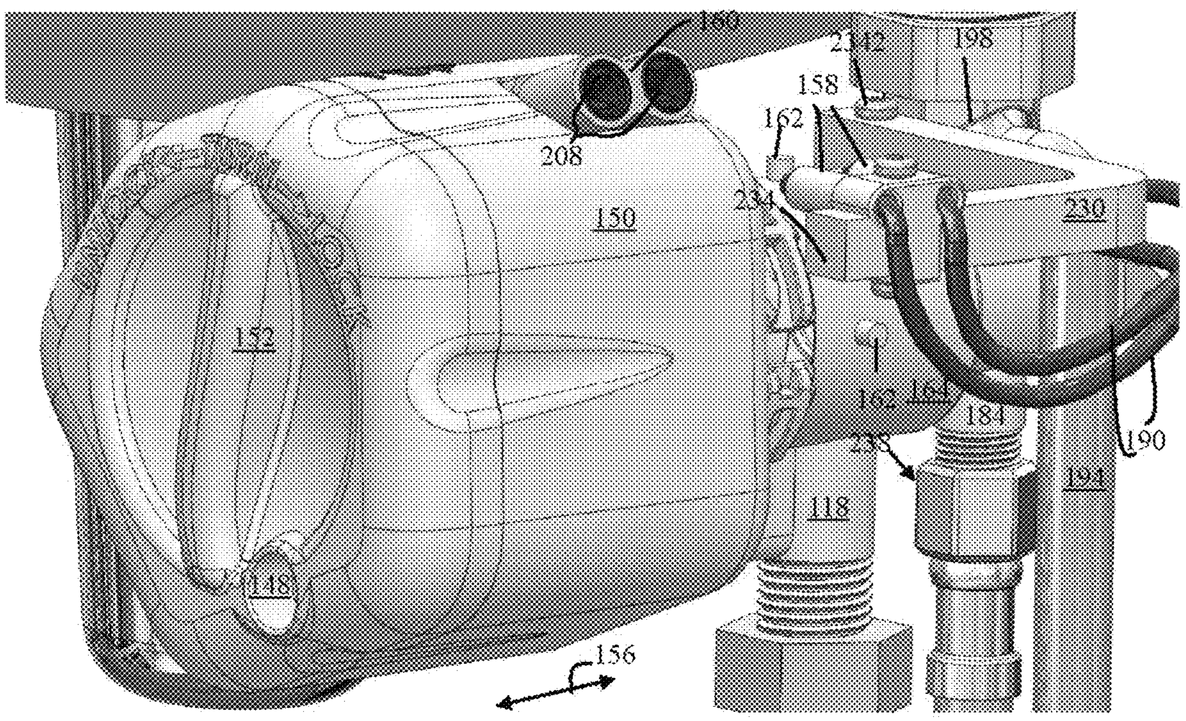
Figure 3Q:
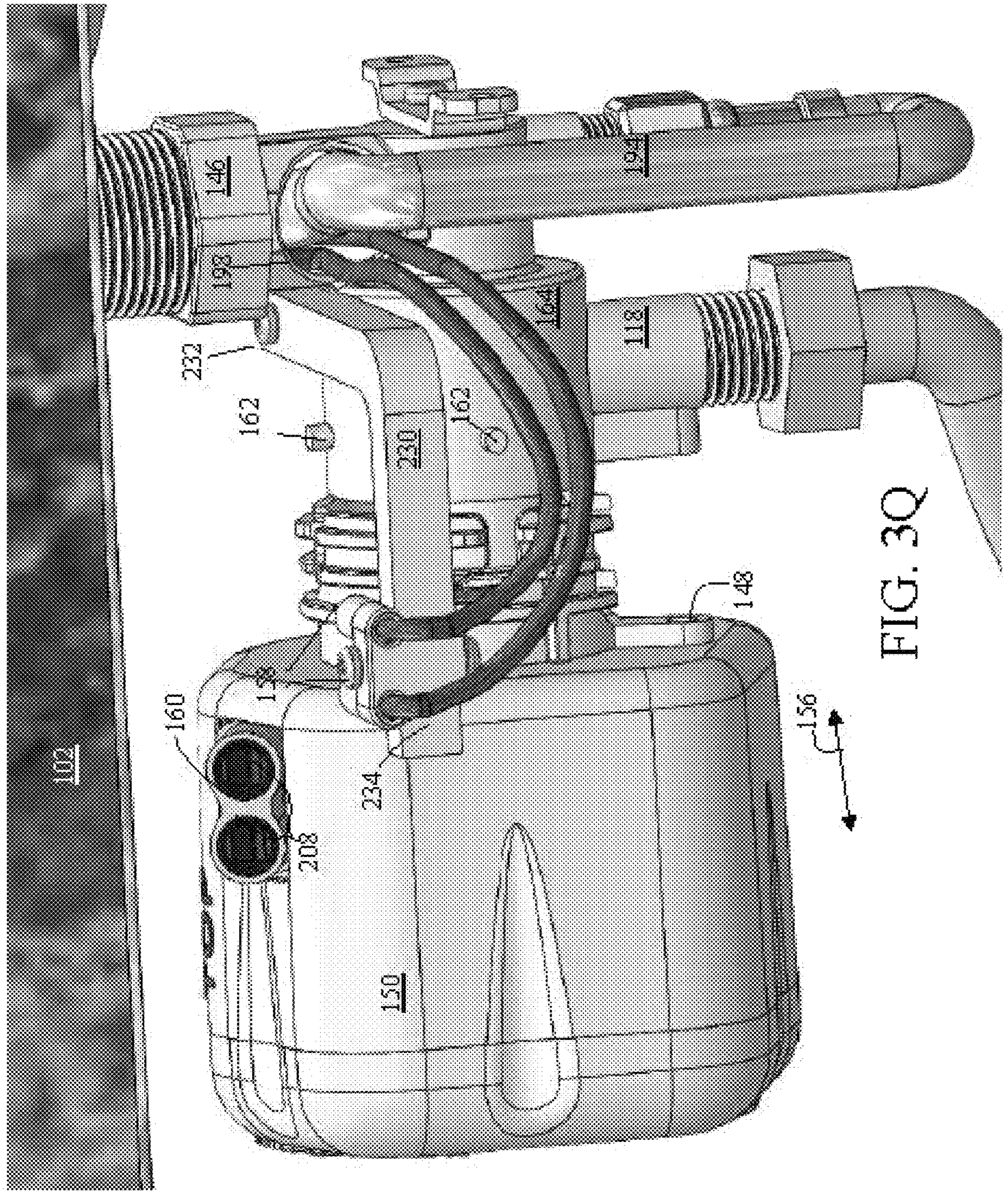
Figure 3R:
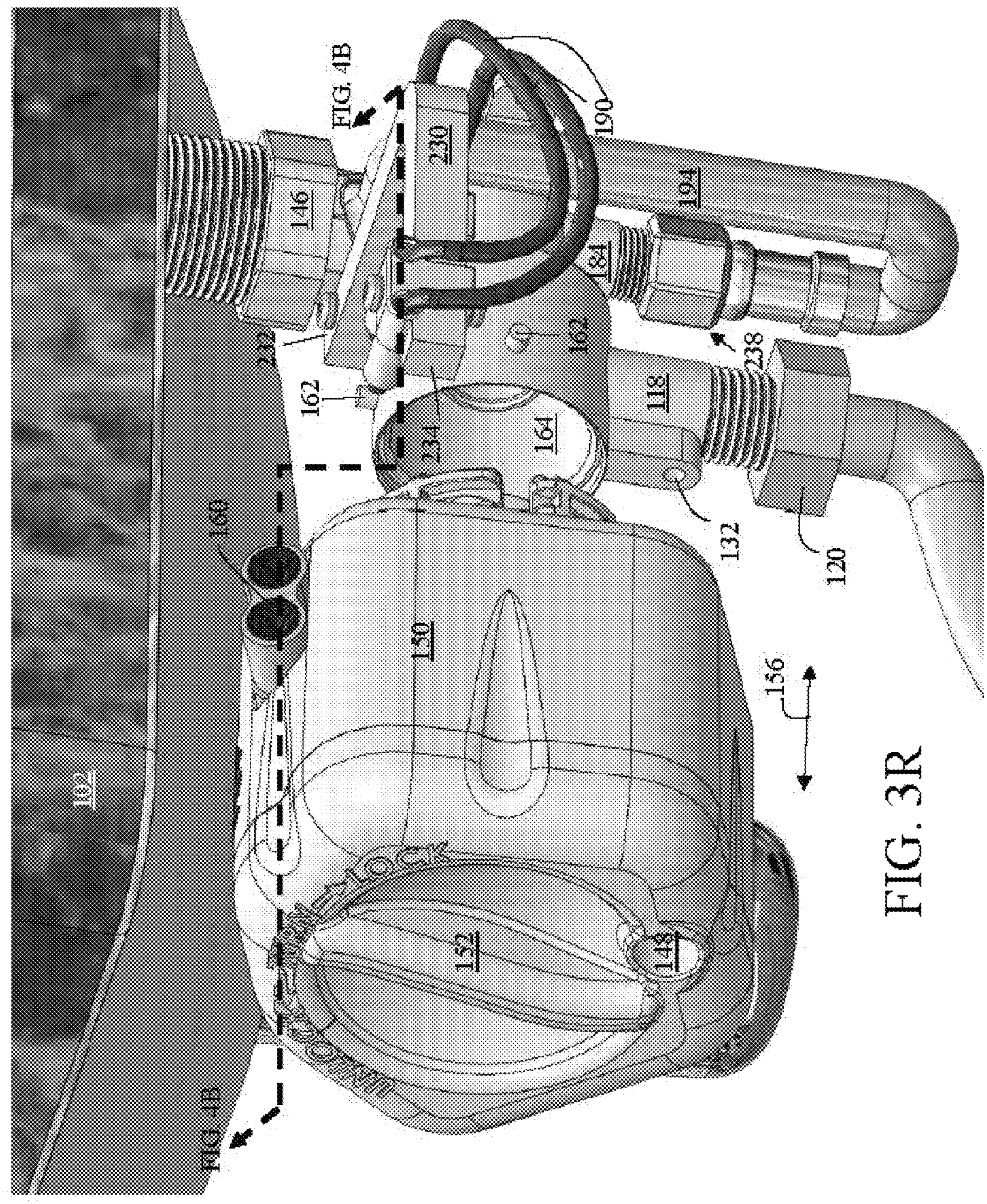
Figure 3S:
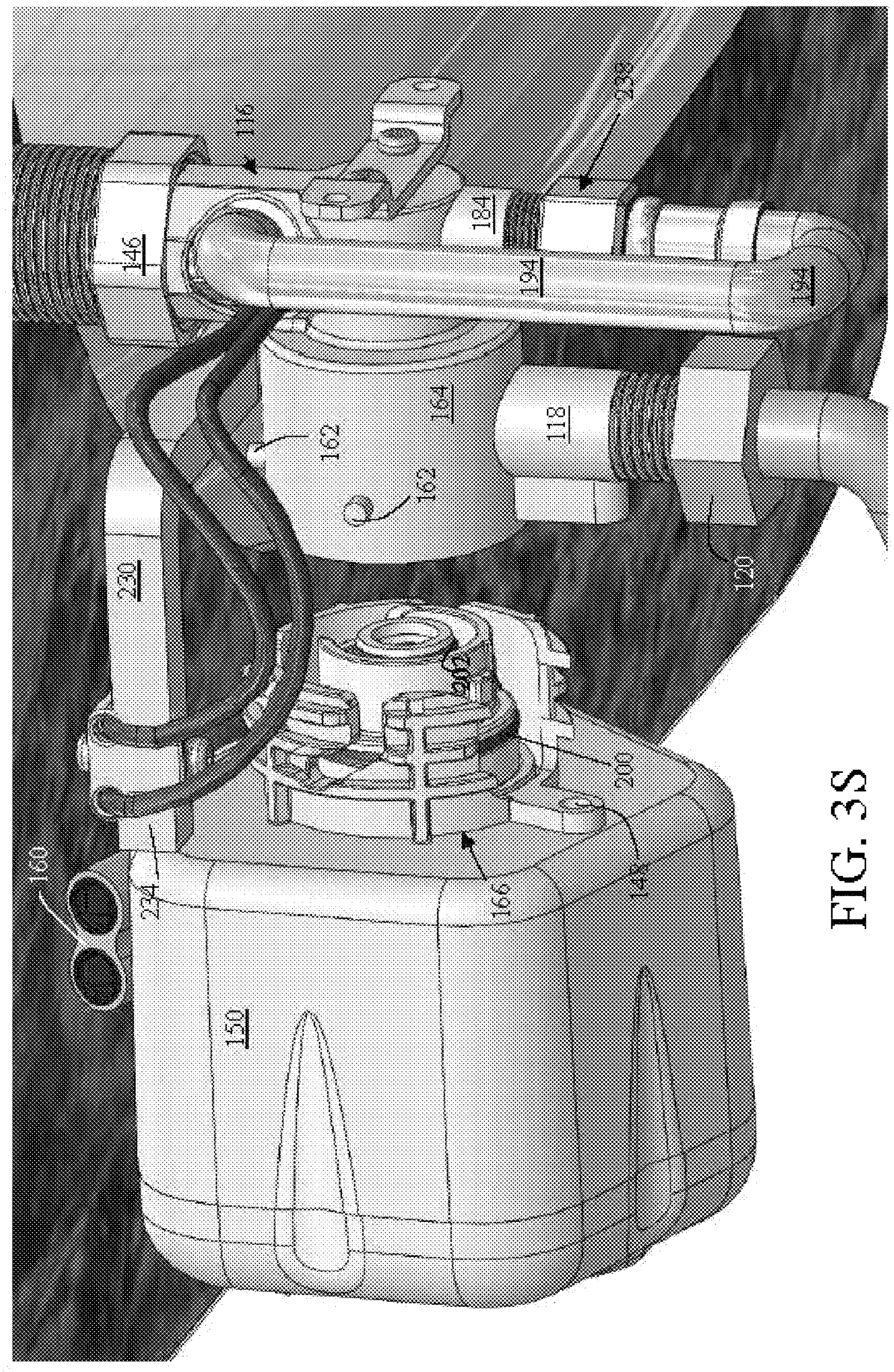

FIGS. 3A to 3S are non-limiting, exemplary illustrations that progressively illustrate from various views a non-limiting, exemplary method of removing and replacing a controller module cartridge of the modularized electronic faucet of FIGS. 1 to 2I in accordance with one or more embodiments of the present invention.

As further detailed below, controller module cartridge 104 is an independent, self-contained, replaceable controller module cartridge 104. In other words, controller module cartridge 104 includes all of the required electronics, switches, batteries, seals, valves, etc., as a single, self-contained modular unit that may be easily replaced.

From an end-user perspective, the maintenance of modularized electronic faucet 100 and in particular replacement of controller module cartridge 104 for just about any reason, is very simple and easy with no need or requirement for diagnoses to determine specific component failure, component replacement, plumbing skills, or specialized plumbing tools. All that is required of a user is to simply remove the old controller module cartridge 104 and replace it with a new controller module cartridge 104 as detailed below.

In this non-limiting, exemplary instance, end-users may use a simple tool such as a screw driver to unfasten an optional security fastener 130 (FIGS. 3C and 3J). Controller module cartridge 104 may be detachably secured onto adapter 108 by optional security fastener 130 to prevent unauthorized removal of the controller module cartridge 104.

Due to the ease by which controller module cartridge 104 may be replaced (detailed further below), it would be very easy for an unauthorized individual to remove controller module cartridge 104 if the optional security fastener 130 is not used to, secure the controller module cartridge 104 to adapter 108.

In this non-limiting, exemplary instance, the optional security fastener 130 is a shoulder screw that passes through a through-opening 148 of housing 150 of controller module cartridge 104, and is directly mechanically, fastened onto an inner diameter (or ID) threaded security opening 132 on exterior of main inlet 118 of adapter 108.

It should be emphasized that the optional security fastener 130 and its accommodating infrastructures on both controller module cartridge 104 and adapter 108 are all optional. It is not required to use the optional security fastener 130 to detachably connected controller module cartridge 104 to adapter 108 for proper operation of modularized electronic faucet 100. Further, the manner of securing controller module cartridge 104 onto adapter 108, regardless of security fastener 130 may also be varied without departing from the scope of the current invention.

Housing 150 of controller module cartridge 104 may be provided with a simple ergonomic knob-like structure 152 to enable easier rotation of controller module cartridge 104 to remove and replace. Housing 150 itself is configured ergonomically for easier grip.

It is important to note that end-users are not required to, have any knowledge of existing downstream fixtures such as spout assembly 106 or upstream fixtures 126 such as the illustrated well known, conventional main valve or any requirement or need to close or shut-off water from main or some upstream or downstream fixture prior to replacement of controller module cartridge 104.

As importantly, end-users are not required, to open any upstream fixtures 126 (or manipulate downstream fixture 126) to enable flow of water when an older controller module cartridge 104 is replaced by a new controller module cartridge 104.

As indicated above, since the present invention is related to electronic faucets, sensors are needed to sense the presence of an object near spout assembly 106 and communicate the sensed signals with controller module cartridge 104 to automatically turn ON or turn OFF water flow. Accordingly, and as further detailed below, the present invention does provide communication links between spout assembly 106 and controller module cartridge 104 and does account for their connectivity when replacing controller module cartridge 104. However, as further detailed below, end-users are not required to have any knowledge of existing optical fibers or any other communications/electronic links between controller module cartridge 104 and spout assembly 106 of modularized electronic faucet 100 to replace controller module cartridge 104.

Referring back to FIGS. 1 to 3S, as controller module cartridge 104 is rotated by an exemplary rotational angle of about 15° (for example, counterclockwise shown by arrow 154), water is automatically shut OFF and optical plugs 158 (FIG. 3H) are also automatically unplugged from optical receptacles 160. All such operations take place without the users having any knowledge of them as the users rotate to remove and replace controller module cartridge 104.

As will be detailed below, due to first and second seal members 200 and 202 (FIGS. 6A and 6B) no remaining water residue between adapter 108 and controller module cartridge 104 leaks as controller module cartridge 104 is pulled away, from adapter 108 due to, residual water pressure.

Additionally, and as also detailed below, the installation of new controller module cartridge 104 is as easy as removal of the old. As a new controller module cartridge 104 is brought near to engage adapter 108 (shown by arrow 156, FIGS. 3F and 3G), it is then rotated (shown by arrow 154)

in opposite direction (clockwise, by a non-limiting, exemplary rotational angle of about 15°) to install new controller module cartridge 104.

During rotation of controller module cartridge 104 to install, water is automatically turned ON and optical plugs 158 are also automatically plugged back into optical receptacles 160. As with removal, all such operations related to installation also take place without the users having any knowledge of them as the users insert and then rotate the new controller module cartridge 104.

Accordingly, one or more embodiments of the present invention provide a modularized electronic faucet 100 that is easy to assemble/disassemble, upgrade (or partially upgrade) to new systems, and that is easy to maintain with no need or requirement for diagnoses to determine specific component failure, component replacement, plumbing/construction skills, or specialized plumbing tools. In fact, no knowledge of any external upstream and or downstream fixtures or internal electronics/communications (e.g., optical) links between any of the components of modularized electronic faucet 100 are needed to replace controller module cartridge 104. Accordingly, truly, the maintenance of modularized electronic faucet 100 of the present invention is very simple and easy with no plumbing knowledge, skills, or end-user supplied tools.

Figure 4A:
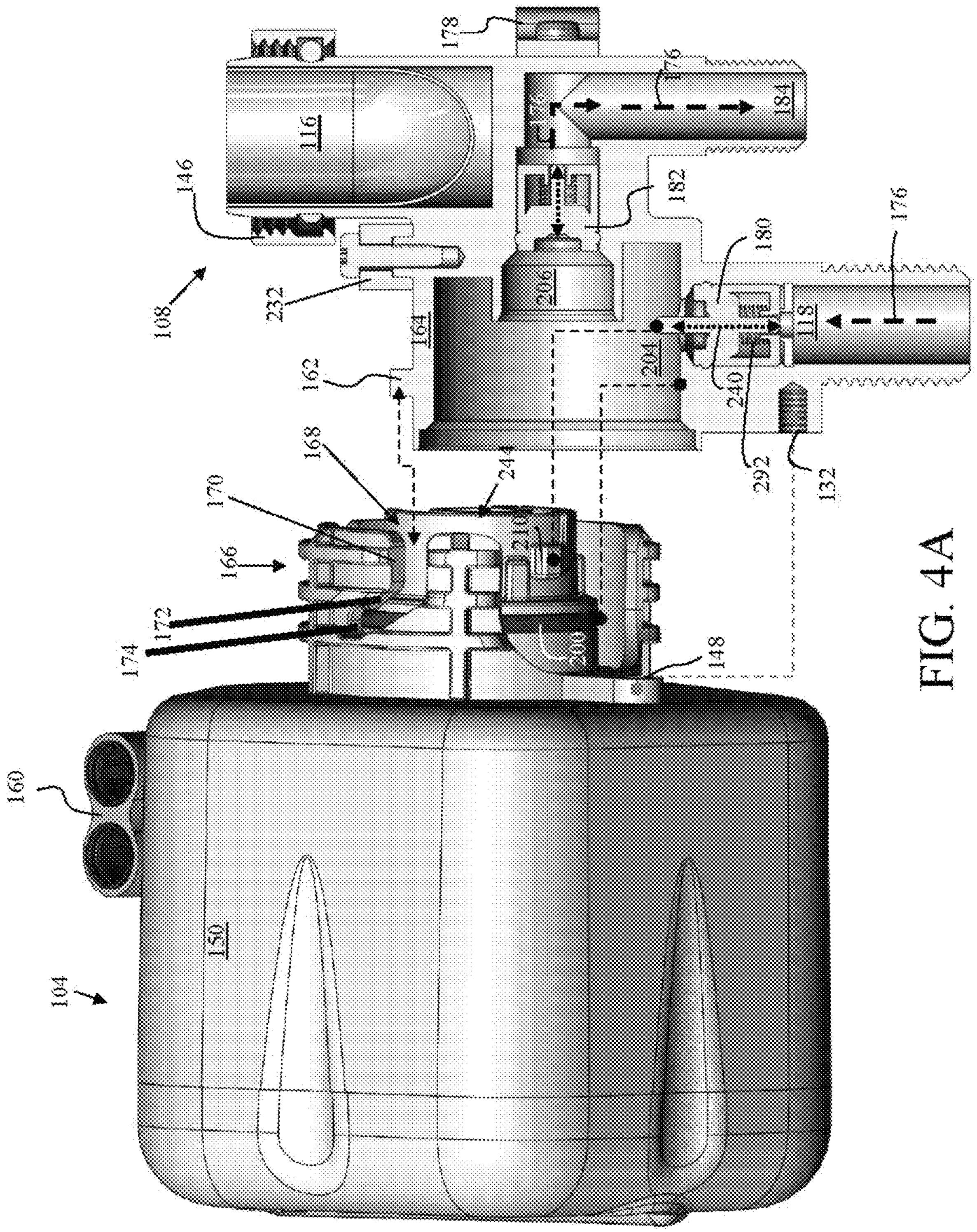
FIGS. 4A and 4B are non-limiting, exemplary illustrations of the modularized electronic faucet shown in FIGS. 1 to 3S, detailing the manner in which water is shut-OFF or turned ON and the manner in which, communication links are severed or reinstated as controller module cartridge is removed or installed in accordance with one or more embodiments of the present, invention.
Figure 4B:
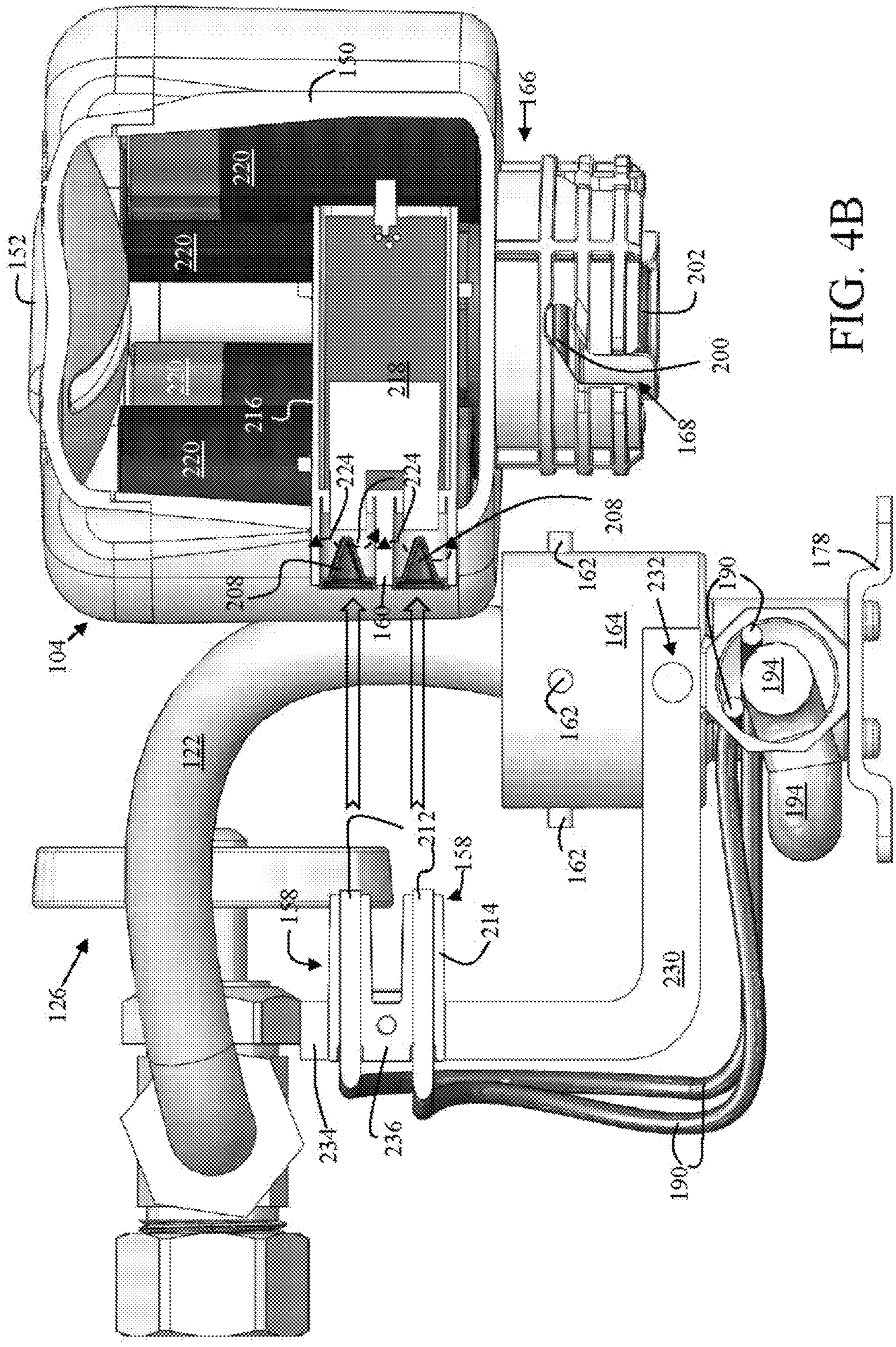

FIGS. 4A and 4B are non-limiting, exemplary illustrations of the modularized electronic faucet shown in FIGS. 1 to 3S, detailing the cooperative working relationship of components in the manner in which water is shut-OFF or ON and the manner in which communication links (e.g., electronic/optical) are severed or reinstated as controller module cartridge is removed or installed in accordance with one or more embodiments of the present invention.

In particular, FIG. 4A details the cooperative working relationship of components in the manner by which water is shut-OFF or ON whereas FIG. 4B details the cooperative working relationship of components in the manner by which optical communication links are severed and reinstated as controller module cartridge 104 is removed or installed.

As illustrated in FIGS. 1 to 4B, adapter 108 includes engagement dowels (or pins) 162 that are positioned on outer surface (or outer diameter—OD) of adapter controller terminal 164. Engagement pins 162 and openings 168 also provide an indexing feature to enable proper mounting of controller module cartridge 104 onto adapter 108.

As illustrated, housing 150 of controller module cartridge 104 includes a connecting end 166 with openings 168 that receive engagement pins 162. Controller module cartridge 104 is properly mounted onto adapter 108 when engagement pins 162 interlock with relief 174 of openings 168.

Openings 168 are comprised of a linear section 170, linear slanted section 172, and a relief end 174. Linear section 170 enables a generally translational movement of controller module cartridge 104 by users whereas slanted section 172 compels both translational and rotational movements of controller module cartridge 104 during removal and installation. Controller module cartridge 104 is deemed fully installed when engagement pins 162 rest within relief ends 174.

Straight sections 170 of openings 168 enable first and second seal members 200 and 202 to continue to engage with respective inner surfaces 204 and 206 of adapter controller terminal 164 to seal and prevent water leakage when removing or, installing controller module cartridge 104.

During removal, second seal member 202 is first disengaged from surface 206 as controller module cartridge 104 is moved away from adapter 108, and then first seal member 200. This way, water or any water residue remaining within adapter controller terminal 164 is prevented from leaking due to residual pressure as controller module cartridge 104 is disconnected. It should be noted that water pressure in adapter 108 is also released through spout assembly 106, and via check valve 182 and through main outlet terminal 184 of adapter 108 until water pressure (PSI) is equal to zero.

During removal, as controller module cartridge 104 is rotated by users and gradually moved away from adapter controller terminal 164 (due to slant sections 172 of openings 168), seal members 200 and 202 continue to prevent water from leaking. Further, controller module cartridge 104 commences to shut-off water as it rotates away from adapter 108.

Figure 6A:
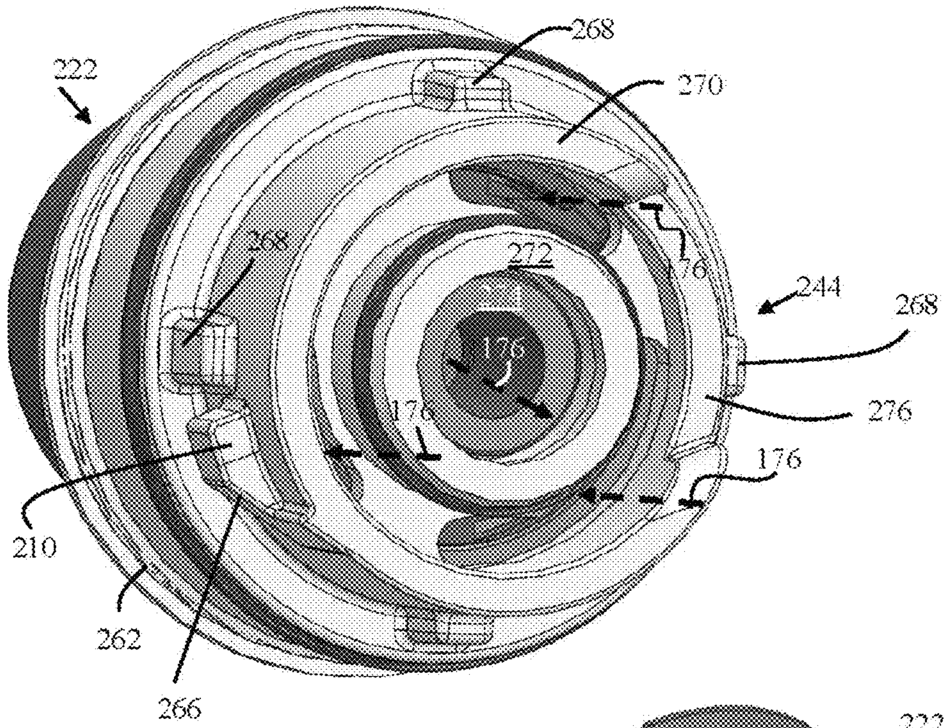
FIGS. 6A and 6B are non-limiting, exemplary illustrations of the various views of the electromechanical device and electromechanical retainer of the modularized electronic faucet shown in FIGS. 1 to 5C in accordance with one or more embodiments of the present invention.
Figure 6B:
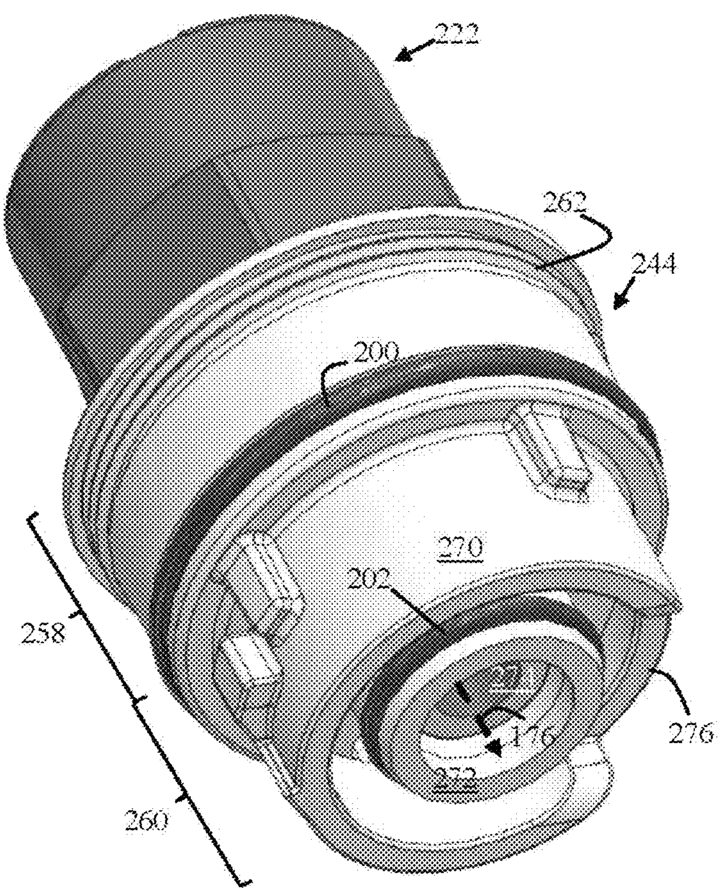

At the stage where engagement pins 162 are positioned within relief ends 174, water may be enabled to flow from main inlet 118 to main outlet 184 of adapter 108. The action of the rotational motion of controller module cartridge 104 by users (as viewed by engagement pins 162 moving out of slanted sections 172), shuts off a main inlet valve 180 by disengagement of a valve operator 210 that is located on retainer housing 244 of electromechanical device 222 (FIGS. 6A and 6B).

Main inlet valve 180 is biased "up" to OFF position by a biasing mechanism 292 and the water pressure in main inlet 118 to shut-OFF water, and is pushed down to open position against the biasing force of the basing mechanism 292 and the water pressure within main inlet 118. That is, valve operator 210 controls main inlet valve 180 by moving it from closed to open (and allowing main inlet valve 180 to closed due to biasing mechanism 292) as shown by arrow 240 to control water flow 176 during removal and installation of controller module cartridge 104.

Simultaneously, as controller module cartridge 104 is rotated by users and while engagement pins 162 are moved along slated section 172, optical plugs 158 (FIG. 4B) are also automatically unplugged from optical receptacles 160. At this stage, optical-valves 208 also close to control flow of optical signals during removal and installation of controller module cartridge 104, thus also powering down the electronics of controller module cartridge 104 (detailed below). FIG. 4B shows optical valves 208 in closed position.

Optical valves 208 have a default closed position and are moved to an open position when controller module cartridge 104 is installed and are closed when controller module cartridge 104 is removed. Due to the default closed position of optical valves 208, well known optical elements of the well-known electronic controller module circuitry 218 (e.g., photodiodes) remain deactivated and hence, maintaining the rest of the well-known electronics of circuitry 218 OFF with no power usage while controller module cartridge 104 is disconnected or a new controller module cartridge 104 is shipped or purchased.

Optical valves 208 functioning as shutters or vales to shut-off light from outside from impinging on well-known optical/transistor elements (e.g., photodiodes, transistors, etc.) that in aggregate function as optical "switches" to maintain the rest of the circuitry 218 OFF and hence, save battery power and increase shelf-life while controller module cartridges 104 is disconnected or being shipped. Optical valves 208 are positioned within optical receptacles 160 mounted on controller module cartridge 104.

Figure 7A:
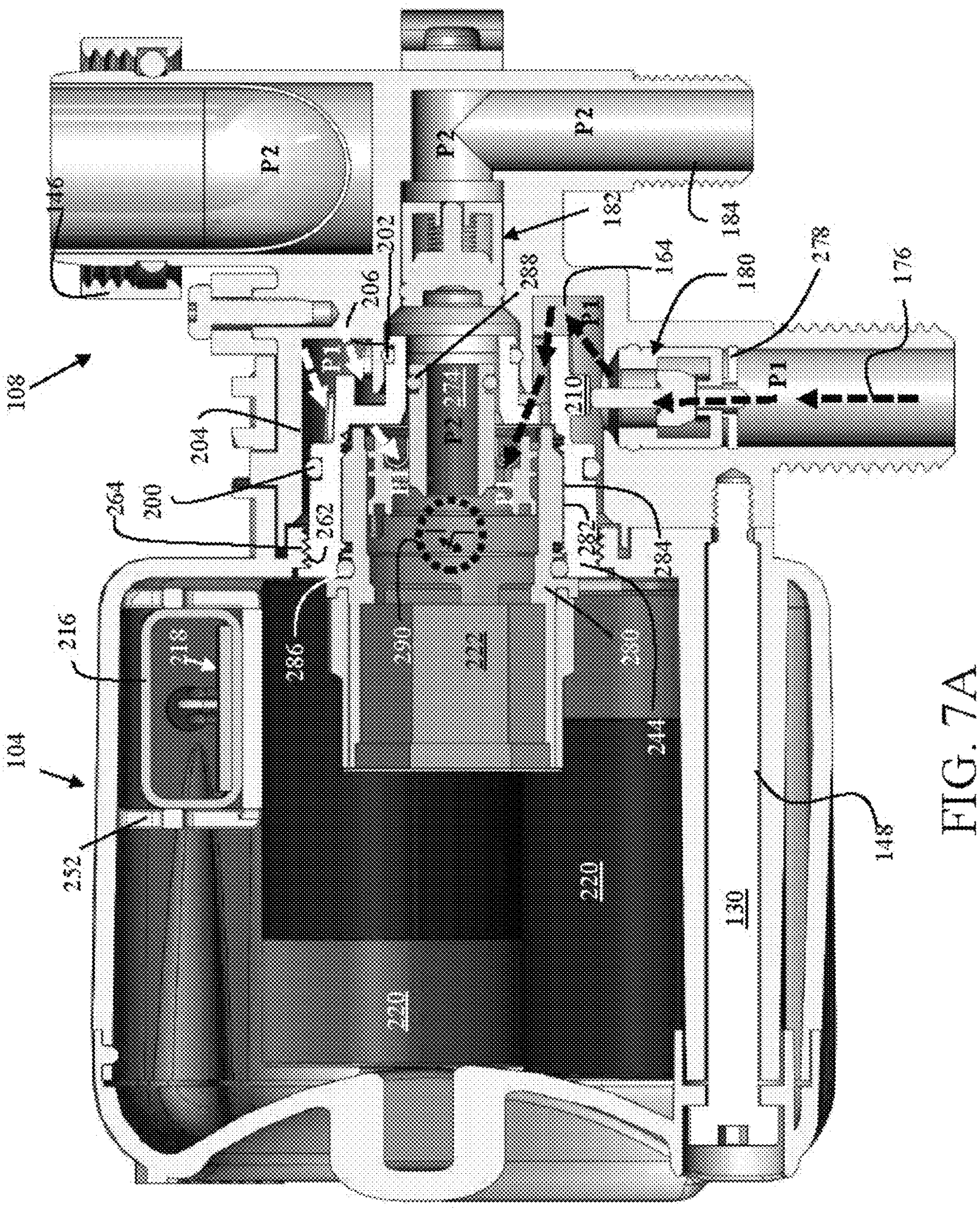
FIGS. 7A and 7B are non-limiting, exemplary sectional view illustrations of the controller module cartridge and adapter of the modularized electronic faucet shown in FIGS. 1 to 6B (but without spout assembly) in accordance with one or more embodiments of the present invention.
Figure 7B:
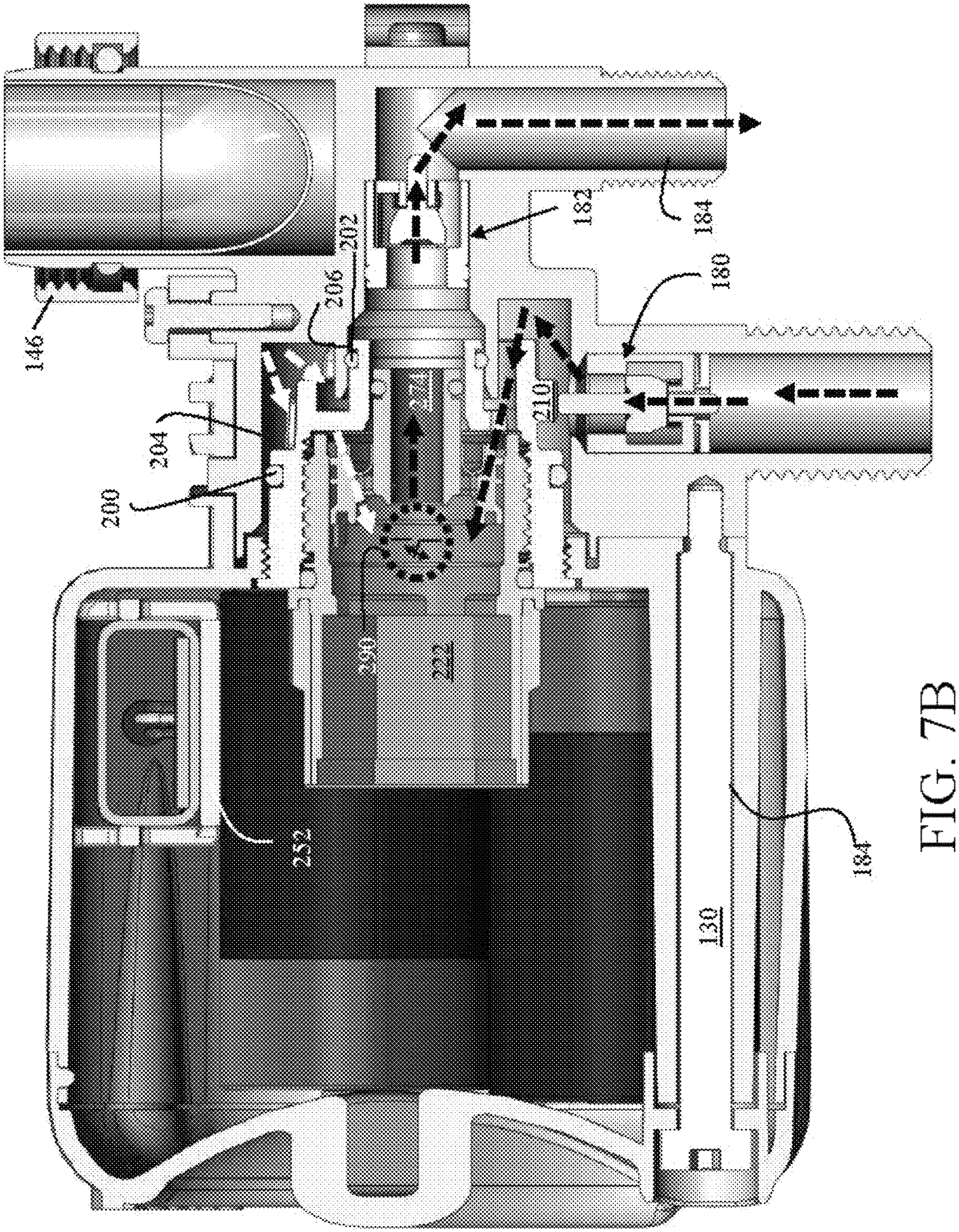

Once engagement pins 162 are out of slanted section 172 and in linear section 170 (where flow of water from main is automatically and fully shut OFF at this stage and optical plugs 158 are unplugged and the electronics are powered down), first and second seal members 200 and 202 continue to prevent any further water residue remaining within adapter controller terminal 164 and controller module cartridge 104 from leaking due to residual water pressure (detailed in FIGS. 7A and 7B).

When installing a new controller module cartridge 104, seal members 200 and 202 engage with respective inner surfaces 204 and 206 of adapter controller terminal 164 to seal and prevent water leakage while engagement pins 162 are in linear sections 170 (where flow 176 of water from main inlet 118 of adapter 108 is shut-OFF at this stage).

During installation, first seal member 200 first engages inner surface 204 of adapter controller terminal 164 as controller module cartridge 104 is pushed into adapter 108, and then second seal member 202 engages inner surface 206. This way, water or any water residue within adapter controller terminal 164 is prevented from leaking as controller module cartridge 104 is connected and main inlet valve 180 is about to be opened.

Once engagement pins 162 move from linear sections 170 by users' push and are in slanted sections 172, controller module cartridge 104 is compelled to be rotated as rotational force is applied by users for installation. At this stage, first and second seal members 200 and 202 continue to prevent water leakage as controller module cartridge 104 is further rotated by users to enable valve operator 210 to engage with main inlet valve 180 to automatically fully open water flow 176 into adapter 108. In this non-limiting, exemplary embodiment, valve operator 210 is an engagement protuberance that is ramped (detailed below).

Simultaneously, when controller module cartridge 104 is rotated (pins 162 in slated section 172), optical receptacles 160 on controller module cartridge 104 are also rotated where they automatically align with optical plugs 158 (FIG. 3L).

As controller module cartridge 104 is further rotated where engagement pins 162 come to a stop within relief ends 174 of openings 168, optical plugs 158 of a set of plastic optical fibers (POFs) 190 engage with and are inserted within optical receptacles 160. Once inserted, optical plugs 158 push open optical valves 208 (shown by arrows 224 in FIG. 4B) to enable flow of optical signals to and from detector-end 192 of plastic optical fibers 190 to activate optical elements of control module cartridge 104.

It should be noted that adapter 108 is comprised of a bracket 230 for maintaining optical plugs 158 aligned with optical receptacles 160 to enable removal and installation of controller module cartridge 104. Bracket 230 is intentionally cantilevered at connecting part 232 to provide slight flexibility. For example, it has sufficient flexibility that may slightly flex when optical plugs 158 are inserted into optical receptacles 160 during installation. This flexibility or slight movement of optical plugs 158 due to cantilevered bracket 230 enables easy plugging and unplugging of optical plugs 158 from optical receptacles 160.

Optical plugs 158 are comprised of free ends 212 of plastic optical fibers 190, with free ends 212 secured within conically configured retainers 214 that when inserted into receptacles 160 push open optical valves 208 as optical plugs 158 are inserted within optical receptacles 160. Conically configured retainers 214 are connected to a free end 234 of cantilevered bracket 230, and may be secured thereto by a connector 236.

Conically configured retainers 214 aid in easier insertion and removal of optical plugs 158 from optical receptacles 160. In this non-limiting, exemplary instance, optical valves 208 may be comprised of duck-bill check valves made of flexible rubber, which further facilitates in easy insertion and removal of, optical plugs 158 due to flexible rubber and also, provide the added advantage of functioning as seal members by preventing water (as well as dust, debris or other contaminants) from entering into electronics housing 216 that house electronics controller module circuitry 218 within controller module cartridge 104.

It should be noted that it is optical receptacles 160 on controller module cartridge 104 that rotate away from optical plugs 158 or rotate towards optical plugs 158 during removal or installation of controller module cartridge 104. Accordingly, optical plugs 158 which have slight movements and optical valves 208 which are comprised of flexible rubber and hence, also move, both aid in easier engagement and maneuvering of optical plugs 158 into and out of optical receptacles 160 as optical receptacles 160 are rotated away from or into fully installed positions.

In general, electronic controller module circuitry 218 may comprise of well-known optical activation/deactivation elements such as photodiodes that activate/deactivate the remaining well-known electronic circuits powered by a set of batteries 220 for controlling electromechanical devices such as a solenoid 222 to control water flow 176 based on detected objects near detector-ends 192.

Figure 5A:
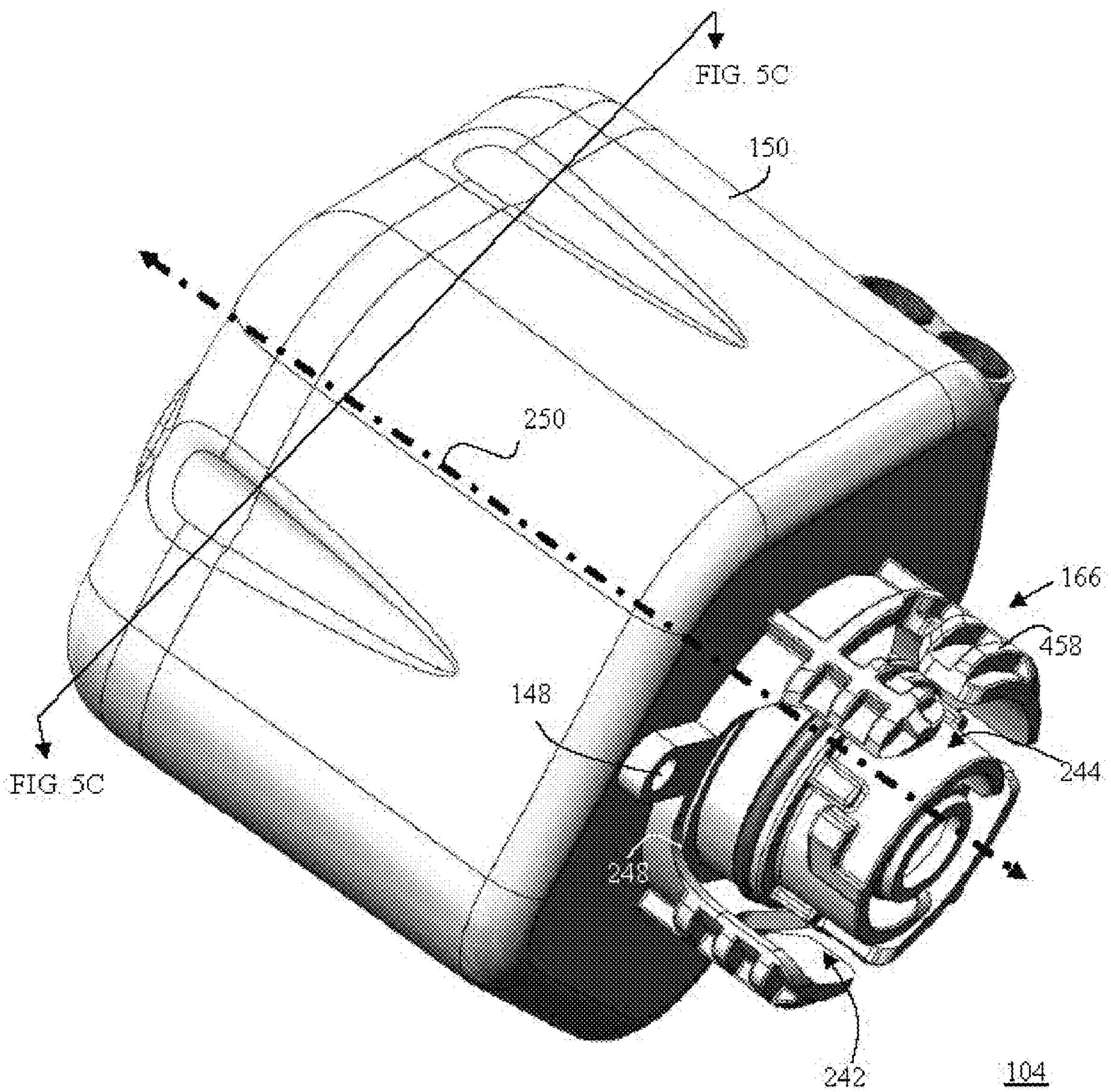
FIGS. 5A to 5C are non-limiting, exemplary illustrations of the various views of the controller module cartridge of the modularized electronic faucet shown in FIGS. 1 to 4B in accordance with one or more embodiments of the present invention.
Figure 5B:
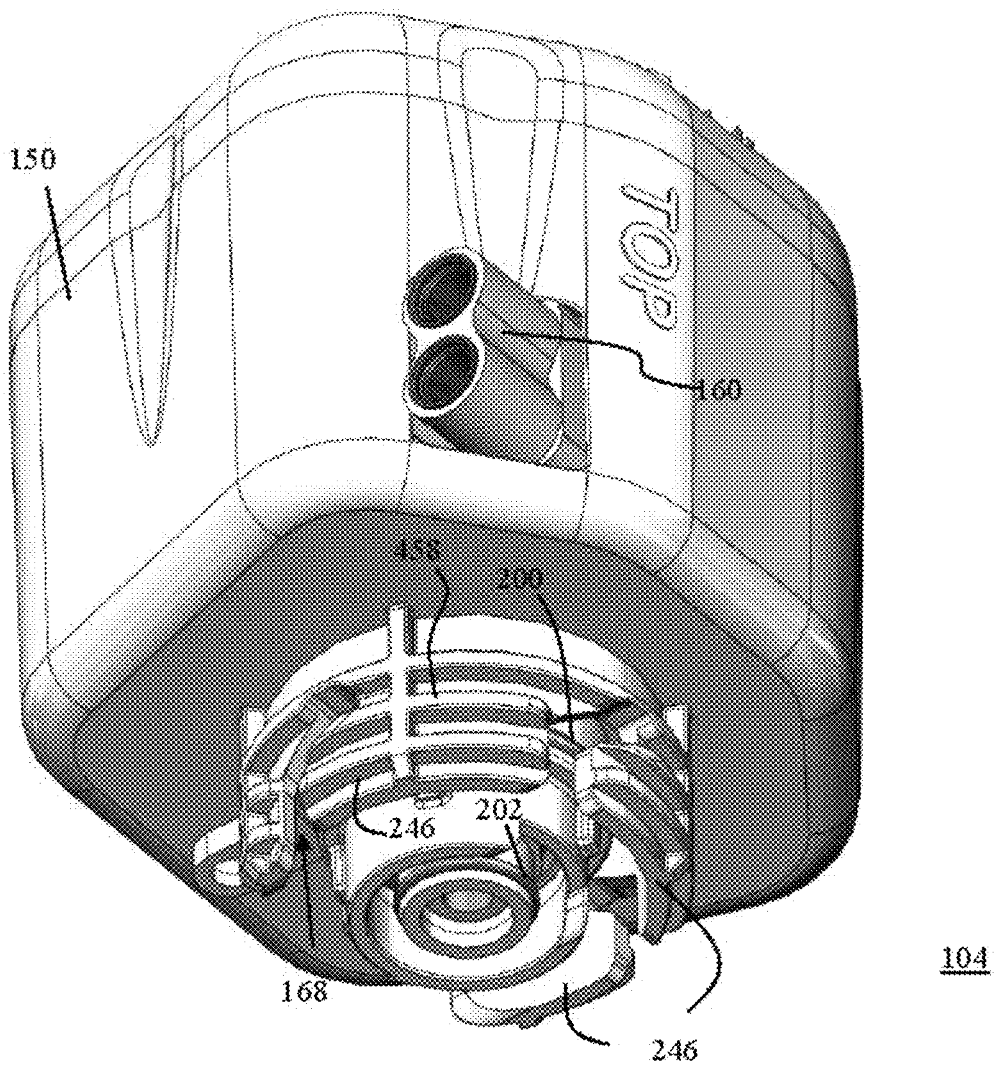
Figure 5C:
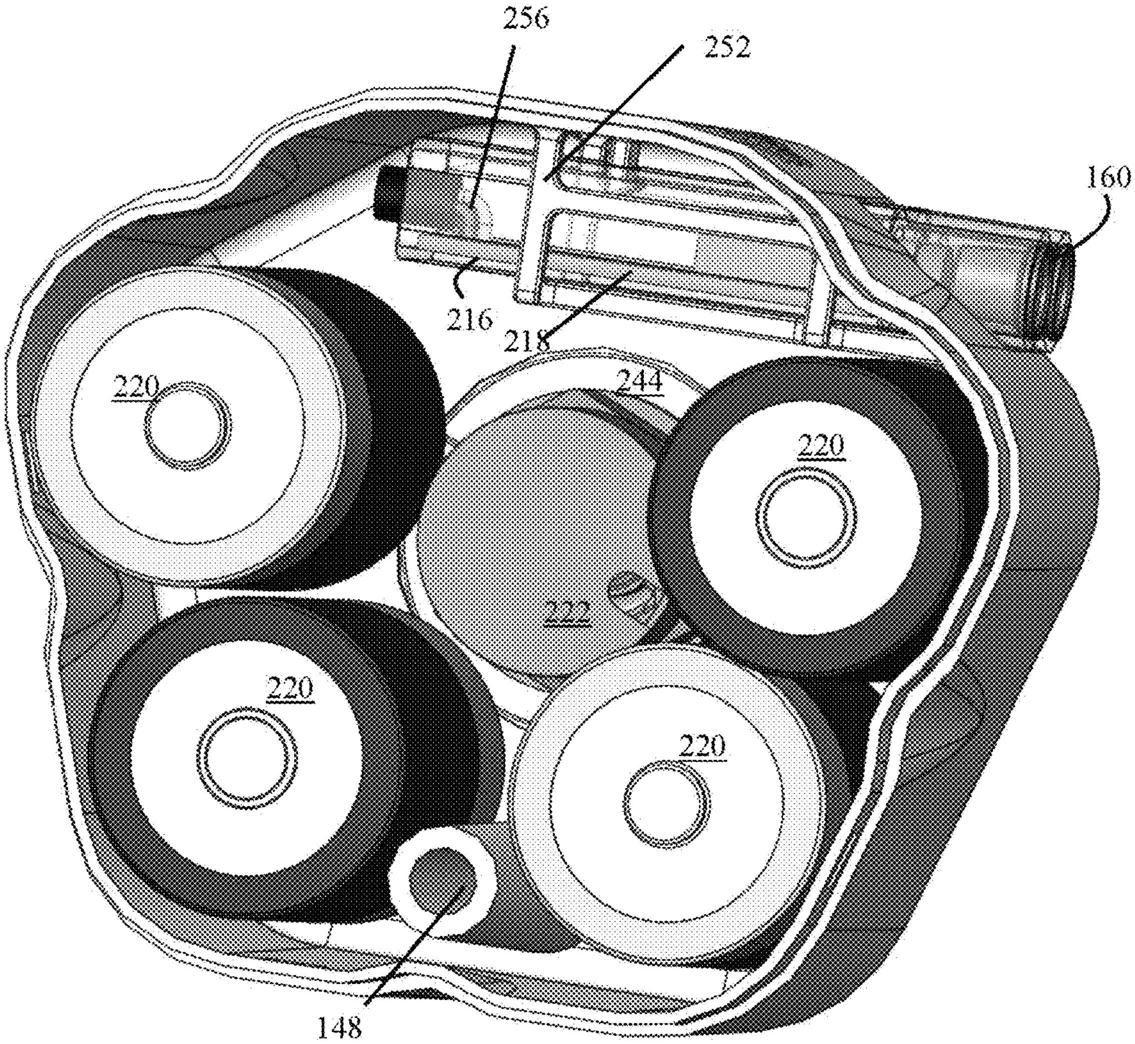

FIGS. 5A to 5C are non-limiting, exemplary illustrations of the various views of the controller module cartridge of the modularized electronic faucet shown in FIGS. 1 to 4B in accordance with one or more embodiments of the present invention. As illustrated, controller module cartridge 104 includes housing 150 having an engagement or connecting end 166 for detachably connecting controller module cartridge 104 to adapter 108.

Connecting end 166 is comprised of a main, opening 242 through which a retainer housing 244 of an electromechanical device 222 extends. Main opening 242 of housing 150 is partially surrounded by curved walls 246, which are separated by three openings 168. It should be noted that the housing 150 only has opening 242 to make sure that the internals of controller module cartridge 104 are not readily accessible thus, discouraging in field maintenance and repairs of controller module cartridge 104.

Curved walls 246 function as a partial shroud to protect retainer housing 244 in addition to providing the engagement structure (such as openings 168) needed to enable controller module cartridge 104 to interlock with adapter 108. Curved walls 246 include openings 168 in between that function as guiding-slots to receive engagement pins 162 of adapter 108, as detailed above.

Exterior side of curved walls 246 includes strengthening structures 458 that provide rigidity to improve the structural integrity of connecting end 166 in a form of the illustrated ribs. A non-shrouded portion of main opening 242 is not surrounded by curved walls 246, forming a relief 248 for receiving a main inlet 118 of adapter 108 when controller module cartridge 104 is fully mounted onto adapter 108.

The formed relief 248 has sufficient, radial width (about 23°) to allow for rotation of controller module cartridge 104 during removal and installation (providing maneuvering room for main inlet 118 and alignment with securing opening 232 with through-opening 148 of controller module cartridge 104.

Controller, module cartridge 104 further includes a security through-opening 148 that extends along a main axis 250 of controller module cartridge 104 through which security fastener 130 is passed to secure controller module cartridge 104 to adapter 108. As indicated above, controller module cartridge 104 is detachably secured onto adapter 108 by a security fastener 130 to prevent unauthorized removal of the controller module cartridge 104.

Controller module cartridge 104 further includes optical receptacles 160 that are positioned on an exterior side of housing 150, with optical receptacles 160 oriented perpendicular to main opening 242 and hence, main axis 250 of controller module cartridge 104.

As shown in FIG. 5C, controller module cartridge 104 interior includes a compartment 252 for holding a housing 216 of electronic controller module circuitry 218 linked with the optical receptacles 160. Electronic controller module circuitry 218 is connected to a set of batteries 220 (via cables 256) housed within the interior of controller module cartridge 104.

Electronic controller module circuitry 218 is further electrically connected to the electromechanical device 222. Electronic controller module circuitry 218, power supplies 220, and the electromechanical device, including their connectivity and operations are well known.

FIGS. 6A and 6B are non-limiting, exemplary illustrations of the various views of the electromechanical device and electromechanical retainer of the modularized electronic faucet shown in FIGS. 1 to 5C in accordance with one or more embodiments of the present invention. As illustrated, retainer housing 244 of electromechanical device 222 is comprised of a connection portion 258 and an engagement end 260.

Connection portion 258 has an external (or Outer Diameter—OD) threading 262 that threads into an internal (Inner Diameter—ID) threading 264 of connecting end 166 of controller module cartridge 104 (best shown in FIGS. 7A and 7B). It should be noted that use of threaded connectivity is a non-limiting example.

Engagement end 260 includes valve operator 210, which is comprised of a protuberance with a gradual ramp 266. As engagement end 260 rotates when controller module cartridge 104 is rotated, main, inlet valve 180 (best shown in FIG. 7A) first engages with a lower portion of ramp 266 of protuberance, with gradual ramping of protuberance continually pushing down main inlet valve 180 against being biasing force of resilient member (e.g., spring) 292 to open main inlet valve 180.

Engagement end 260 further includes strengthening structures 268 that provide rigidity to improve the structural integrity of engagement end 260. Additionally, as shown, engagement end 260 also functions as a partial outer shroud 270 that wraps around an inner shroud 272, which fully wraps around egress chamber 274 of solenoid 222.

As best shown in FIGS. 6B and 7A, partial outer shroud 270 of engagement end 260 provide a space 276 as a relief to enable full engagement of controller module cartridge 104 with adapter 108.

As further shown, connection portion 258 accommodates the first seal member 200 and engagement end 260 accommodate second seal member 202 (on outer surface of inner shroud 272).

FIGS. 7A and 7B are non-limiting, exemplary sectional view illustrations of the controller module cartridge and adapter of the modularized electronic faucet shown in FIGS. 1 to 6B (but without hoses or spout assembly) in accordance with one or more embodiments of the present invention. FIG. 7A illustrates static operations of modularized electronic faucet 100 (in terms of water flows 176), whereas FIG. 7B illustrates non-static operations of modularized electronic faucet 100 (in terms of water flows 176).

As illustrated, when controller module cartridge 104 is fully installed, main inlet valve 180 is in an open position due to the engagement of valve operator 210 of retainer housing 244 with main inlet valve 180. Main inlet valve 180 is supported at its location by a retainer washer 278 so that it does not fall from its location within main inlet 118 of adapter 108. Accordingly, so long as the controller module cartridge 104 is properly installed, main inlet valve 180 will be maintained open.

In this non-limiting, exemplary instance, a solenoid (e.g., a pilot operated solenoid valve) is used as electromechanical device 222 for control of water flow 176 of water. In this non-limiting, exemplary instance, solenoid 222 has a solenoid body 280 that includes an external threading 282 that threads into an internal threading 284 of solenoid retainer housing 244.

Further included are solenoid O-rings 286 and 288 to seal-off gaps between solenoid body 280 and retainer housing 244. It should be noted that the manner of accommodating (or housing) solenoid 222 or other similar electromechanical device within housing 150 of controller module cartridge 104 may be varied and should, not be limited to only those illustrated.

At this static phase (FIG. 7A), main inlet valve 180 is open, solenoid 222 is closed, and check valve 182 is closed. Further, no objects are detected by detector-ends 192 of plastic optical fibers 190 to enable electronic controller module circuitry 218 to generate a signal to open solenoid valve 290 of solenoid 222 to open access to solenoid egress chamber 274 and hence, allow water flow 175 (shown in FIG. 7B).

Since main inlet valve 180 is open, water flows 176 within controller terminal 164 of adapter 108 as shown by dashed arrows, including solenoid 222, but not solenoid egress chamber 274 (since solenoid valve 290 is closed). As detailed below, solenoid egress chamber 274 is closed-off to water when solenoid valve 290 (shown by dashed circle line) is closed and hence, water is prevented from entering into solenoid egress chamber 274.

In the static phase, P1 represents the water pressure and P2 represents the normal atmospheric pressure. As illustrated, main inlet 118, controller terminal 164, and parts of solenoid 222 where water flows 176 are all at the same pressure P1, whereas in the parts where there is no water, pressure is at P2.

In the non-static phase (FIG. 7B), main inlet valve 180 remains open, but solenoid valve 290 is driven from a closed to an open position by electrical controller module circuitry 218 when sensing an object in front of spout 226. Opening solenoid valve 290 opens water flow 176 into solenoid egress chamber 274, with pressure P1 of water pushing open check valve 182 to allow water to flow into spout assembly 106.

Check valve 182 is biased to a closed position by a biasing mechanism such as a spring. Pressure P1 of water from solenoid egress chamber 274 pushes open check valve 182 when the force of the water pressure P1 is greater than the biasing force of the biasing mechanism of check valve 182.

At the non-static phase (FIG. 7B), water continues to run through the system as illustrated in the various FIGS. 1 to 7B until solenoid valve 290 is automatically closed by electronic controller module circuitry 218. The triggering of water flow, duration of water flow, timing schemes, etc. are all well-known and conventional.

Once solenoid 222 closes, pressure P1 at solenoid egress chamber 274 returns back to P2 (e.g., normal atmospheric pressure) and hence, check valve 182 also closes due to its biased closing position. This returns the entire unit back to static phase (FIG. 7A).

It should be noted that the use of check valve 182 is optional. However, the advantage of using a check valve is that when replacing controller module cartridge 104, any residual water remaining within spout assembly 106 (most of which is above vanity 102) may tend to flow back into controller terminal 164 of adapter 108 due to gravity. Check valve 182 simply prevents backflow of the water into controller terminal 164 of adapter 108. This maintains changing controller module cartridge 104 clean and dry.

Figure 8:
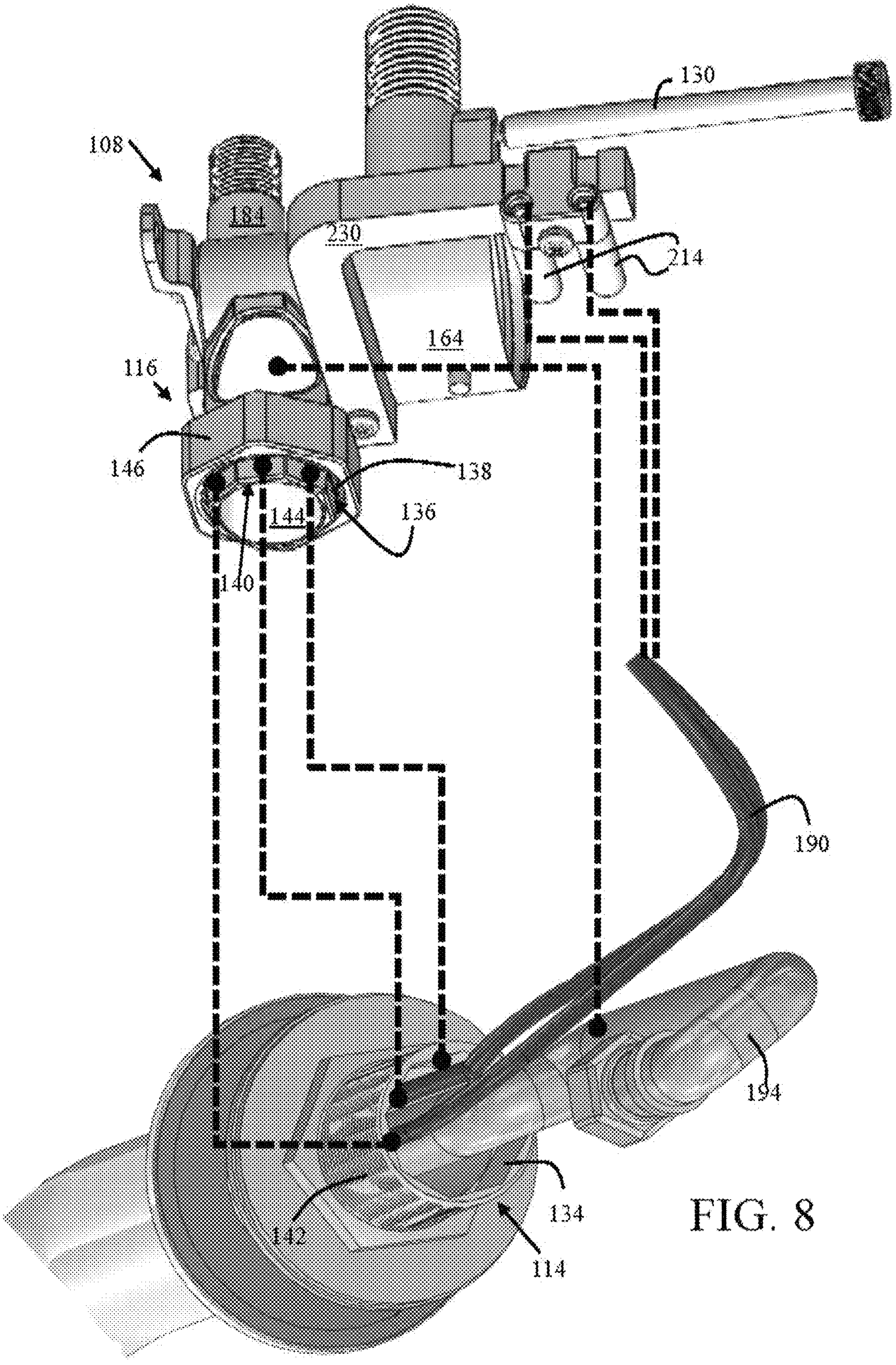
FIG. 8 is anon-limiting, exemplary illustration of the adapter and part of the spout assembly of the modularized electronic faucet shown in FIGS. 1 to 7B, detailing modular connectivity between the adapter and spout assembly in accordance with one or more embodiments of the present invention.

FIG. 8 is a non-limiting, exemplary illustration of the adapter and part of the spout assembly of the modularized electronic faucet shown in FIGS. 1 to 7B, detailing modular connectivity between the adapter and spout assembly in accordance with one or more embodiments of the present invention.

As illustrated in FIGS. 1 to 8, spout assembly 106 is comprised of shank end 114 that is connected to spout-terminal 116 of adapter 108. A spout-terminal end 140 of spout terminal 116 of adapter 108 is detachably press-interlocked-fits within shank end 114.

Shank end 114 is comprised of an inner surface 134 that has a flat (non-tapered) polygonal configuration (e.g., an octagon shape), and an outer circumferential surface 142 that is threaded.

Spout terminal end 140 (a male connecting part) is comprised of an outer surface 136 that has a polygonal configuration (e.g., an octagon shape) with tapered (or beveled) edges 138 to form a chamfer to facilitate engagement of spout-terminal end 140 with an inner surface 134 of shank end 114. It should be noted that the inner surface 134 of spout terminal end 140 is rounded (circular pipe). Tapered edges 138 continue to press against inner surface 134 of shank end 114 as a fastener 146 is tightened onto the threaded outer circumference surface 142 of shank end 114, pulling spout terminal end 140 further into a tighter and deeper engagement with shank end 114.

Outer surface 136 of spout terminal 116 and inner surface 134 of shank end 114 interlock due to polygonal configurations of outer and inner surfaces of respective spout terminal end 140 and shank end 114. This configuration prevents rotational movement of adapter 108 independent of the spout 226 while both are connected to each other. Accordingly, once the polygonal surfaces interlock, the two components cannot move independent of each other. This is beneficial in that when controller module cartridge 104 is removed or installed, it will not move adapter 108 position (as the spout assembly 106 is, already secured to vanity 102).

As illustrated and indicated above, spout assembly 106 is also modular in that it is also detachably connected to adapter 108 and may be removed independent of controller module cartridge 104. To detach and remove only spout assembly 106 from the rest of modularized electronic faucet 100, main water valve 126 may first be shut-OFF. This is due to the fact that controller module cartridge 104 continues to remain attached to adapter 108 and hence, continue to maintain main inlet valve 180 open.

Next, ingress end 238 of hose 194 may be detached from main outlet 184 of adapter 108. Thereafter, optical plugs 158 of plastic optical fibers (POFs) 190 may be unplugged from controller module cartridge 104 and disconnected from adapter 108 by loosening generally conically configured retainers 214 on bracket 230.

Thereafter, shank end 114 of spout assembly 106 may be disconnected from spout-terminal 116 of adapter 108, and finally, spout assembly 106 may be detached from vanity 102 in well-known manner by loosening the well-known shank nut/washer-base combination 112.

The above steps would completely release spout assembly 106 from adapter 108 and controller module cartridge 104. Accordingly, spout assembly 106 may be completely removed and replaced with the newest model by users without having to repurchase an entirely new electronic faucet.

Figure 9A:
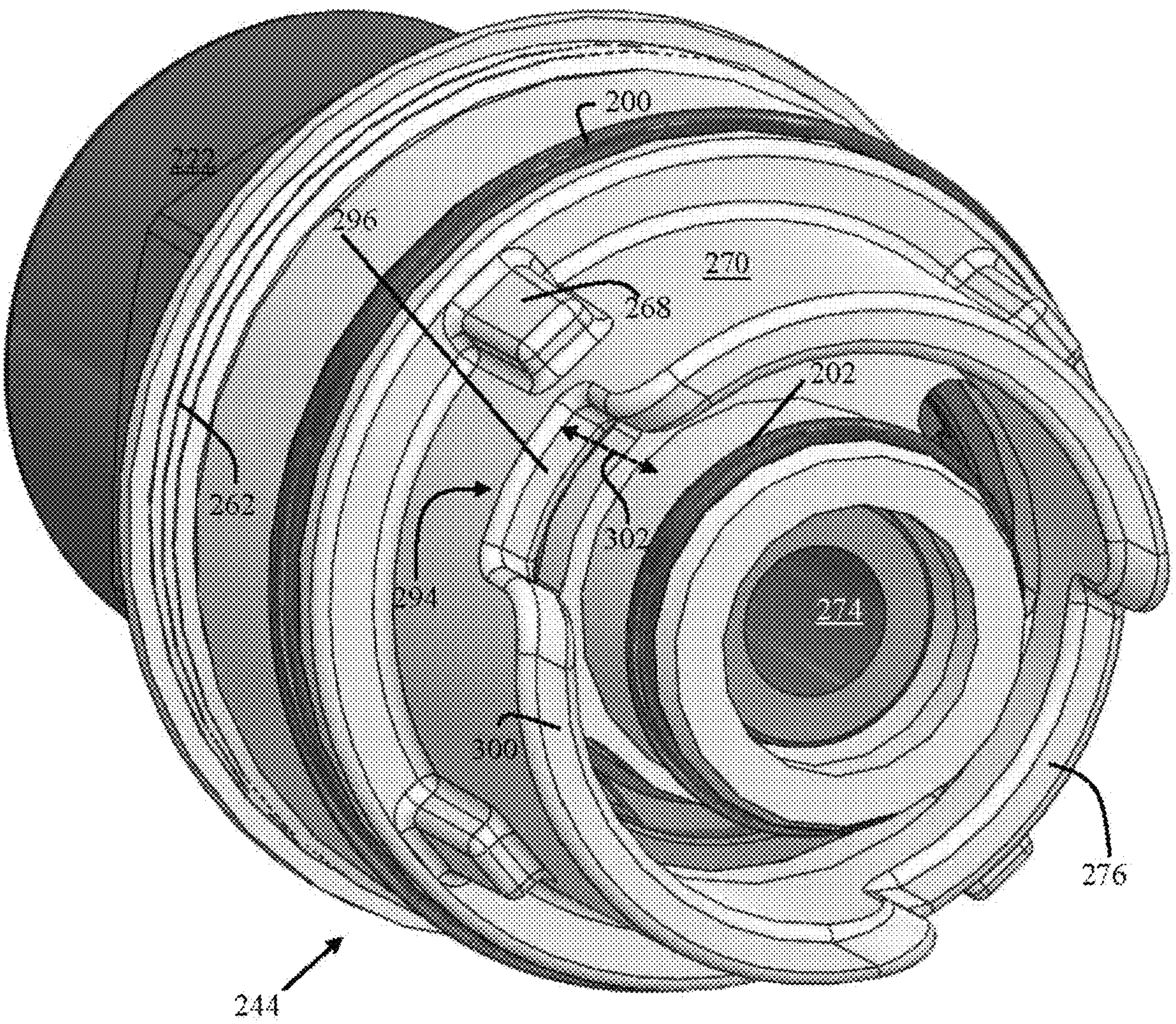
FIGS. 9A to 9C are non-limiting, exemplary illustrations of another embodiment of the modularized electronic faucet in accordance with another embodiment of the present invention.
Figure 9B:
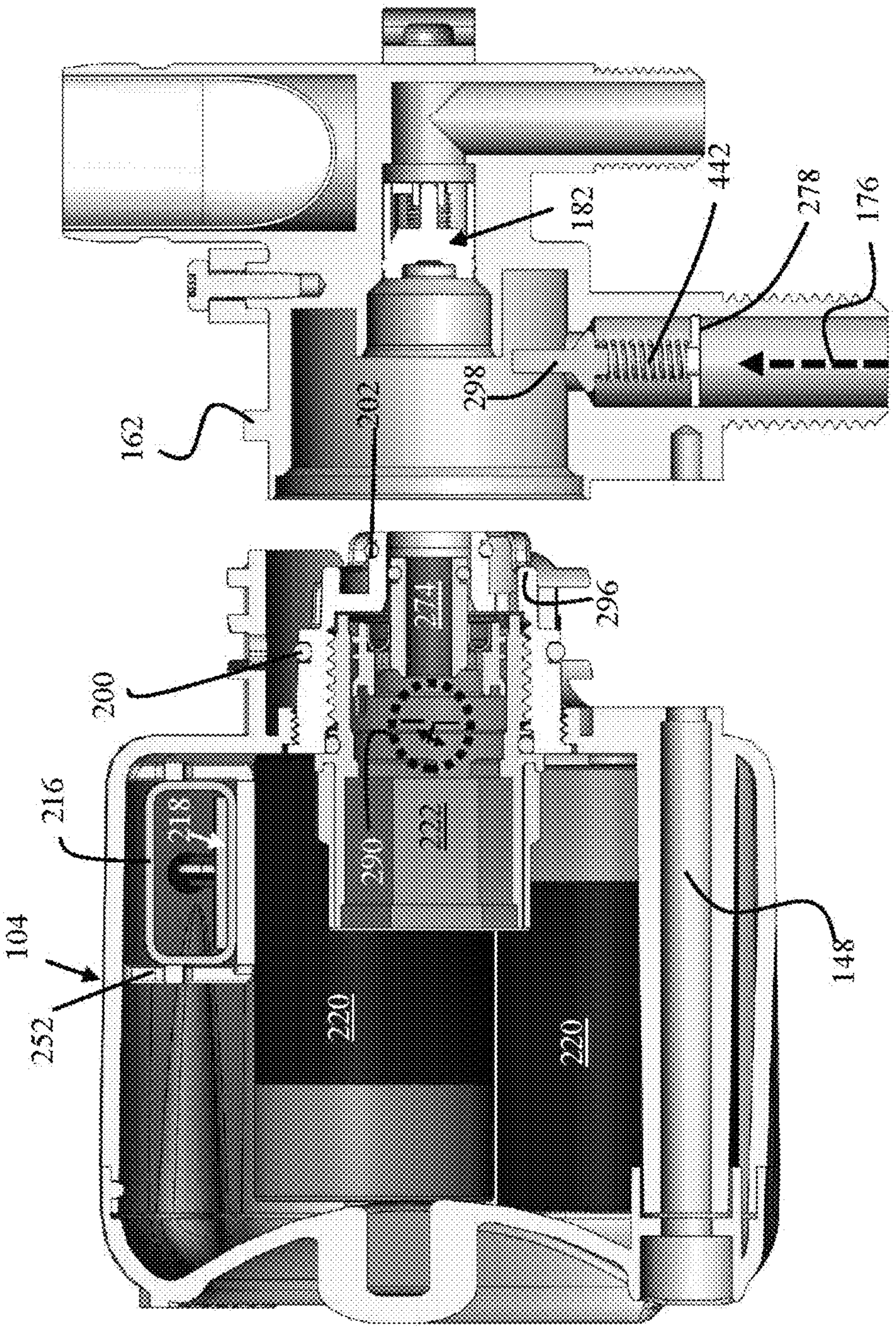
Figure 9C:
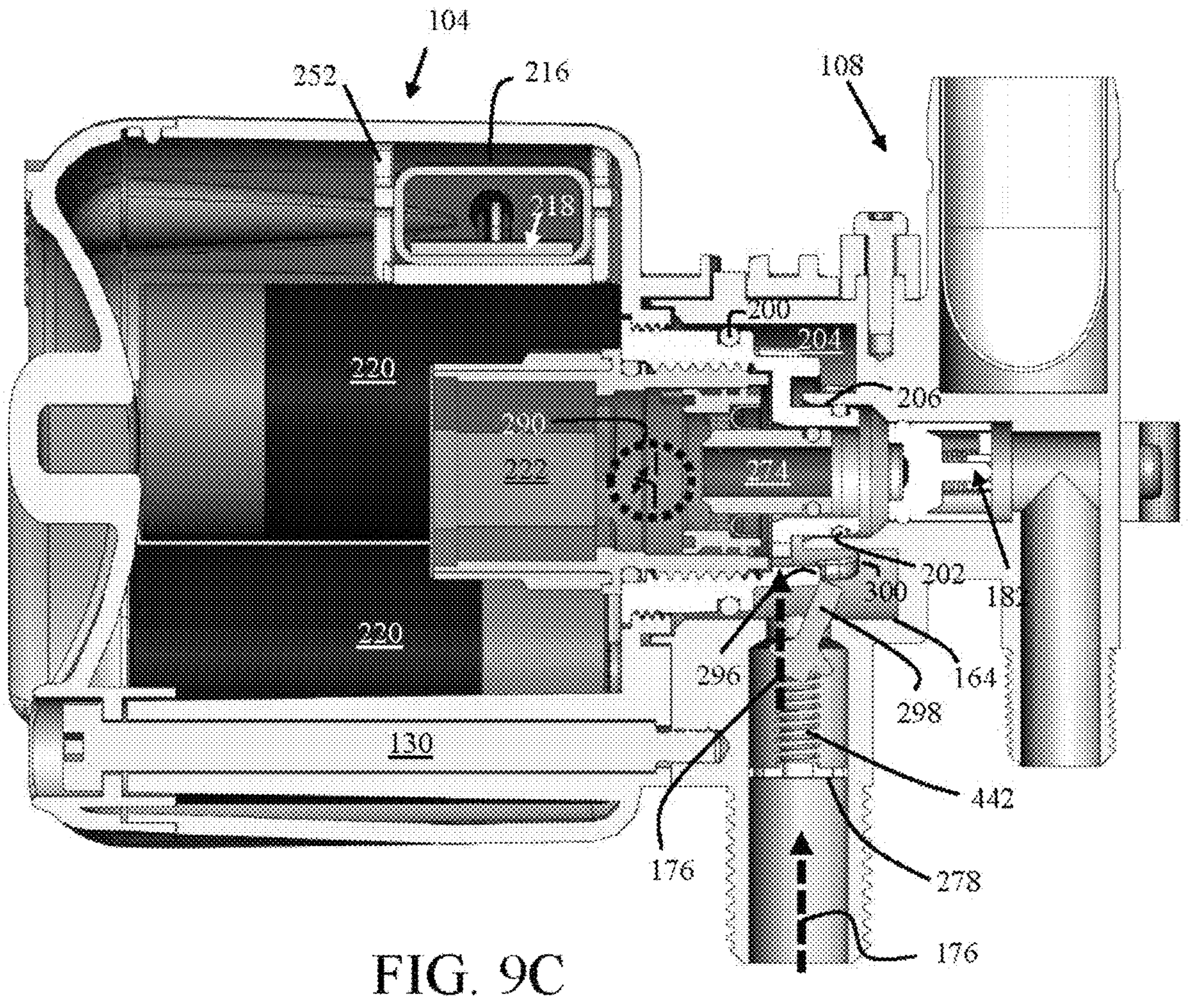

FIGS. 9A to 9C are non-limiting, exemplary illustrations of another embodiment of the modularized electronic faucet in accordance with another embodiment of the present invention. The modularized electronic faucet illustrated in FIGS. 9A to 9C includes similar corresponding or equivalent components interconnections, functional, operational, and or cooperative working relationships as the modularized electronic faucet that is shown in FIGS. 1 to 8, and described above. Therefore, for the sake of brevity, clarity, convenience, and to avoid duplication, the general description of FIGS. 9A to 9C will not repeat every corresponding or equivalent component, interconnections, functional, operational, and or cooperative working relationships that has already been described above in relation to the modularized electronic faucet that is shown in FIGS. 1 to 8 but instead, are incorporated by reference in their entirety herein.

As illustrated in FIGS. 9A to 9C, in this non-limiting, exemplary embodiment valve operator is comprised of retainer housing 244 of electromechanical device 222 that includes an outer shroud 270 with a small opening 294, forming an engagement base 296 which engages a well-known rocker main, inlet valve 298 when controller module cartridge 104 is fully installed.

FIG. 9B illustrates main inlet valve 298 in a biased normally closed position whereas FIG. 9C illustrates main inlet valve 298 tilted to an open position by the push of valve opener engagement base 296. Accordingly, once controller module cartridge 104 is fully installed, it automatically opens main inlet valve 298 and, when controller module cartridge 104 is removed (e.g., as detailed above, by engagement pins 162 gradually move along slanted sections 172 of opening 168), main inlet valve 298 is gradually biased back into its normally closed position (FIG. 9C).

It should be noted that engagement base 296 is at a lower elevation (or at an offset) than top, surface 300 of outer shroud 270. This lower elevation or offset provides for sufficient relief (or space) 302 to enable controller module cartridge 104 to be inserted to a location (within openings 168 where pins 162 are at the ends of straight (or linear) sections 170) within controller terminal 164 where both seal members 200 and 202 fully engage inner surfaces 204 and 206 before main inlet valve 298 is opened. Additionally, relief or space 302 also allows main inlet valve 298 to close first before seal members 200 and 202 disengage inner surfaces 204 and 206.

FIGS. 10A to 10H are non-limiting, exemplary illustrations of another embodiment of the modularized electronic faucet in accordance with another embodiment of the present invention. The modularized electronic faucet illustrated in FIGS. 10A to 10H includes similar corresponding or equivalent components, interconnections, functional, operational, and or cooperative working relationships as the modularized electronic faucet that is shown in FIGS. 1 to 9C, and described above. Therefore, for the sake of brevity, clarity, convenience, and to avoid duplication, the general description of FIGS. 10 to 10H will not repeat every corresponding or equivalent component, interconnections, functional, operational, and or cooperative working relationships that has already been described above in relation to the modularized electronic faucet that is shown in FIGS. 1 to 9C but instead, are incorporated by reference in their entirety herein.

As illustrated in FIGS. 10A to 10H, in this non-limiting, exemplary embodiment, adapter 108 is comprised of a valve operator 304 that is actuated by electromechanical device retainer housing 244 to close or open a main inlet valve 306 to control water flow 176.

Figure 10A:
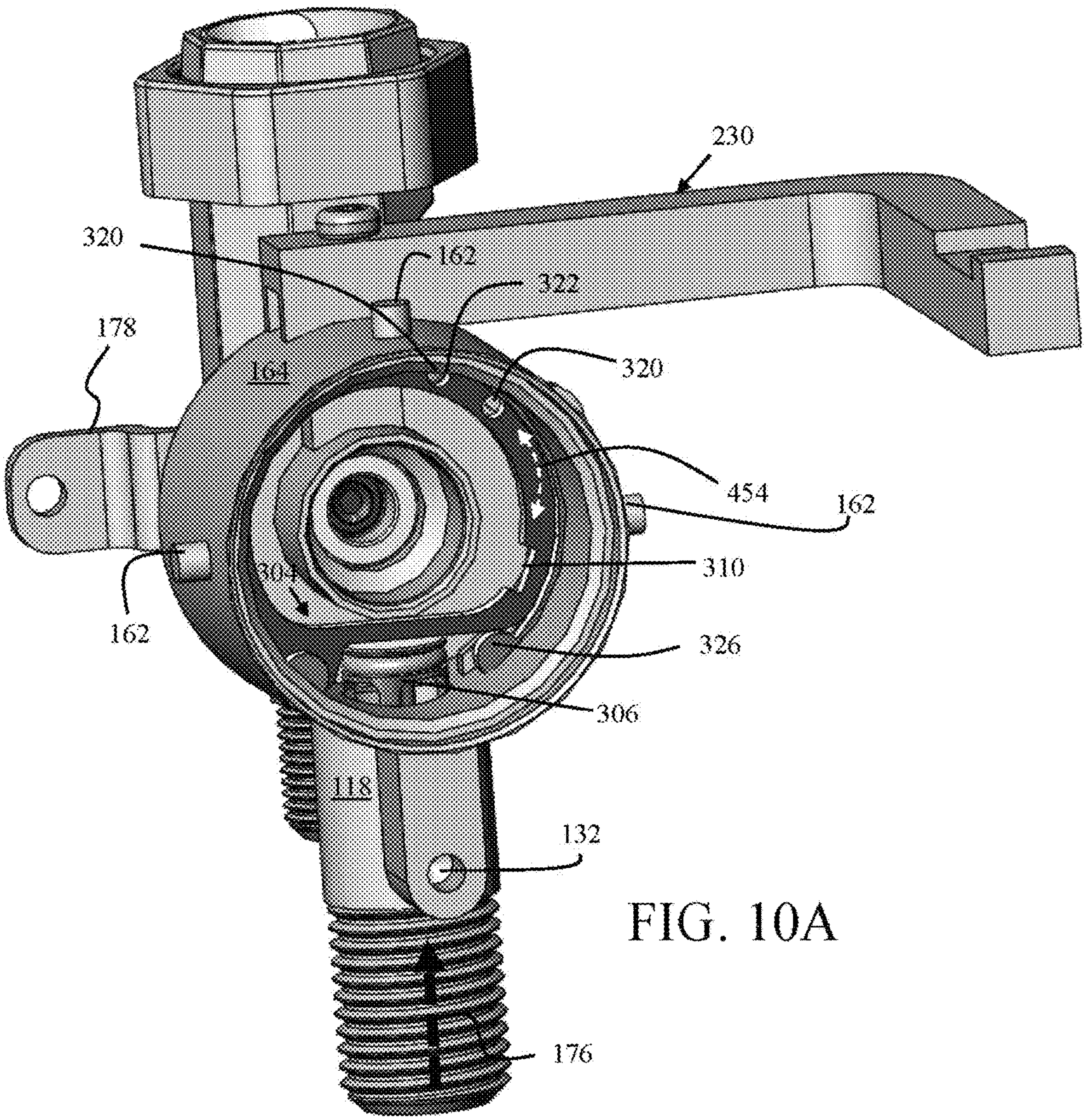
FIGS. 10A to 10H are non-limiting, exemplary illustrations of yet another embodiment of the modularized electronic faucet in accordance with another embodiment of the present invention.
Figure 10B:
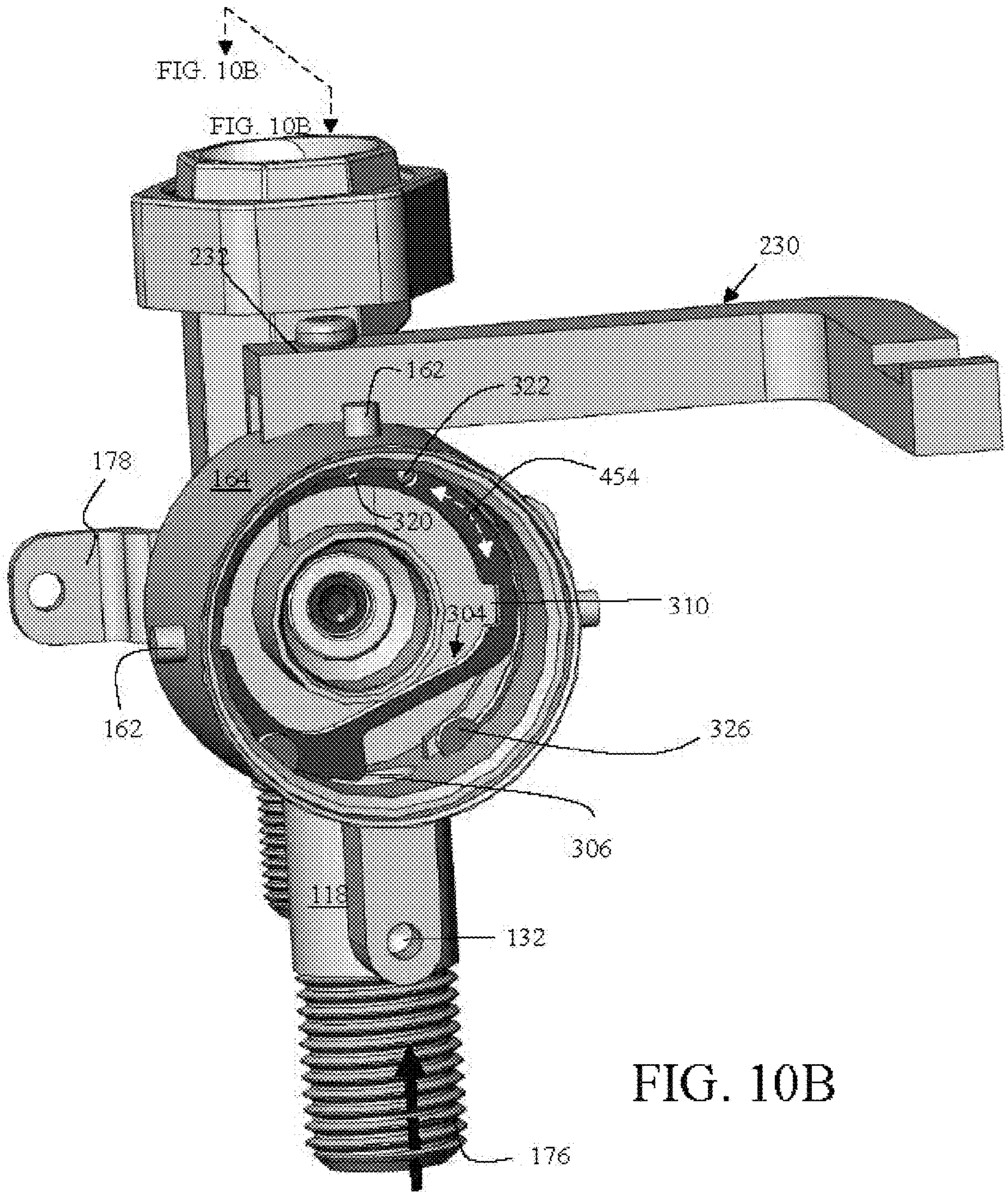
Figure 10C:
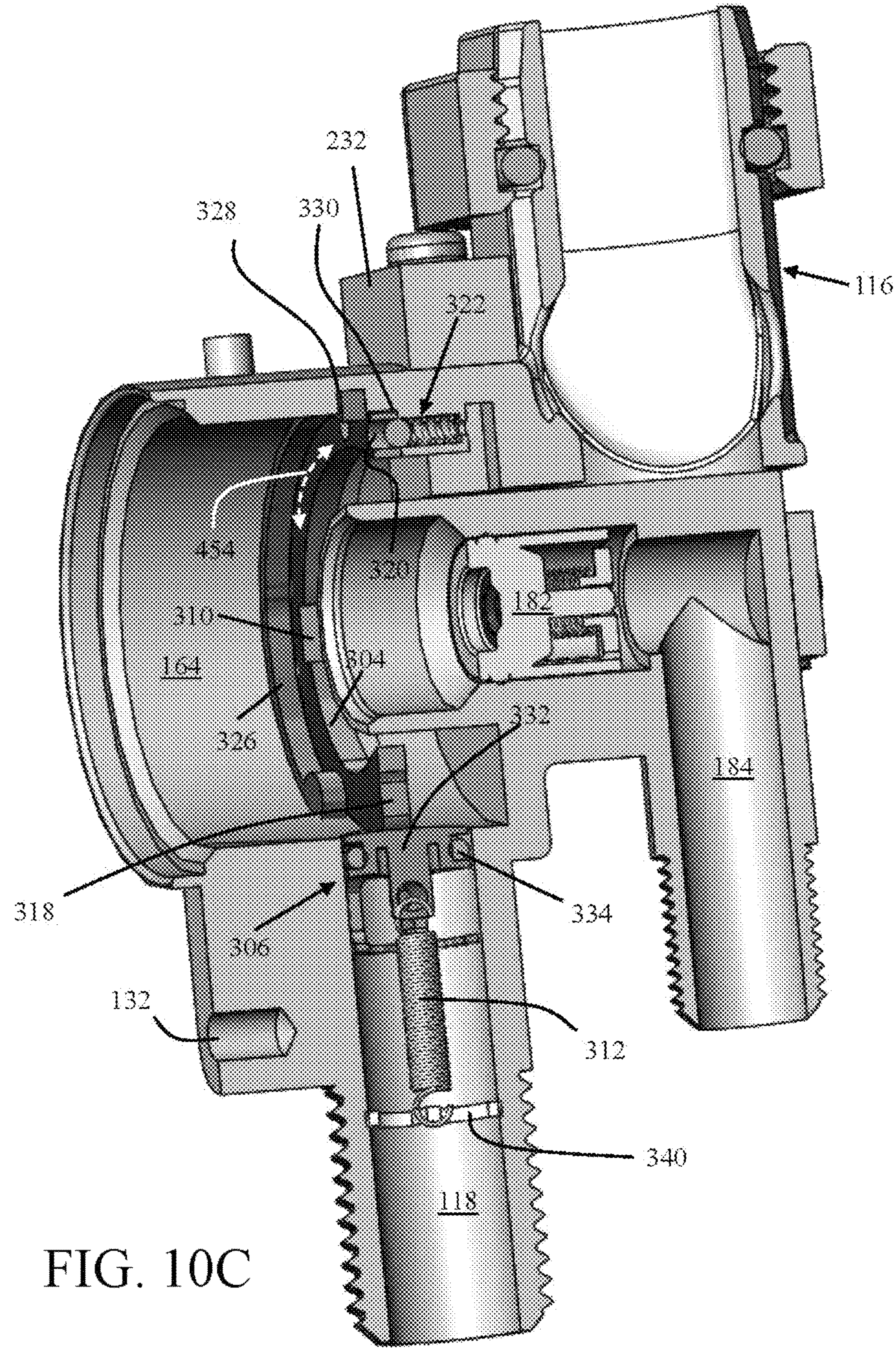
Figure 10D:
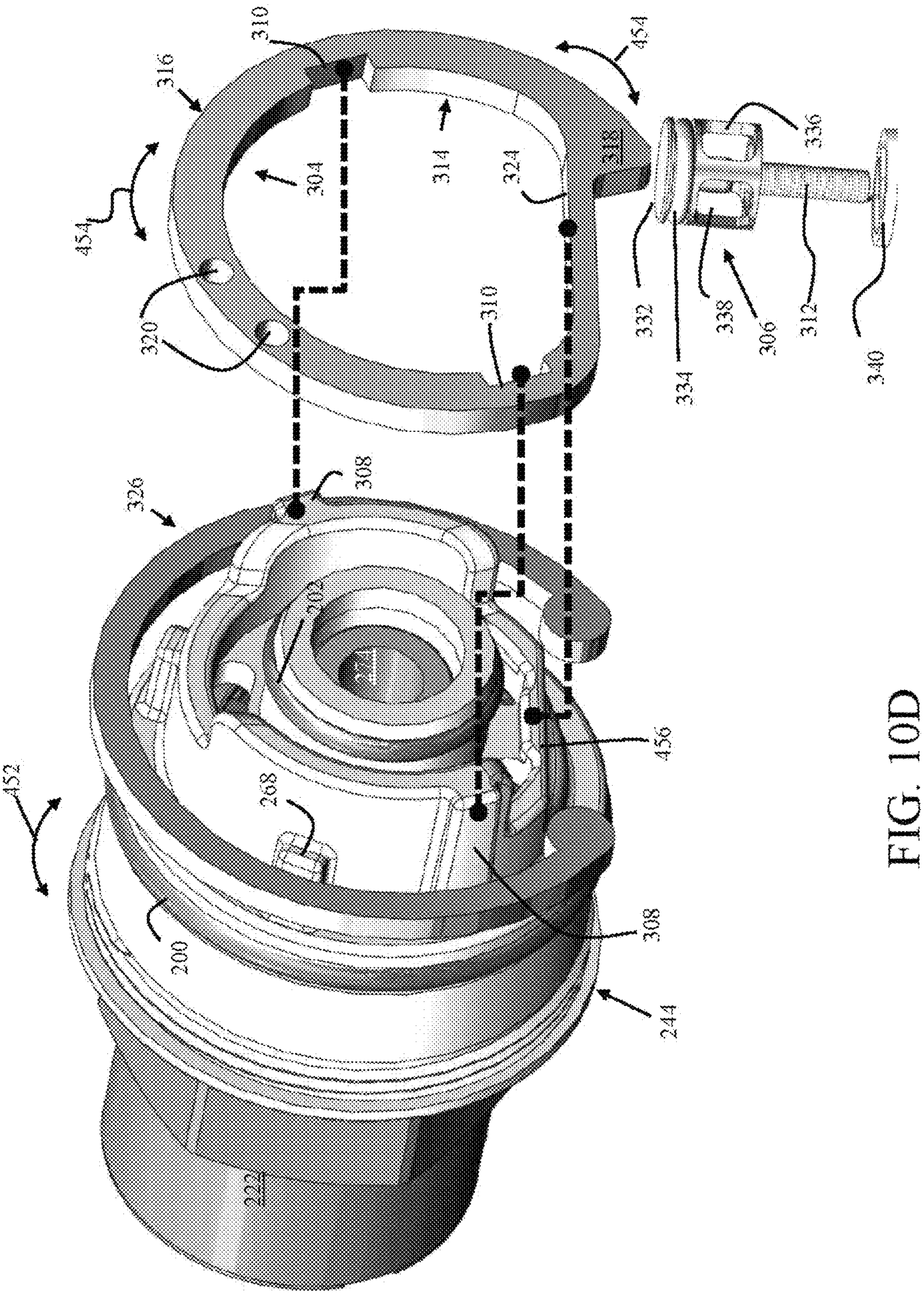
Figure 10E:
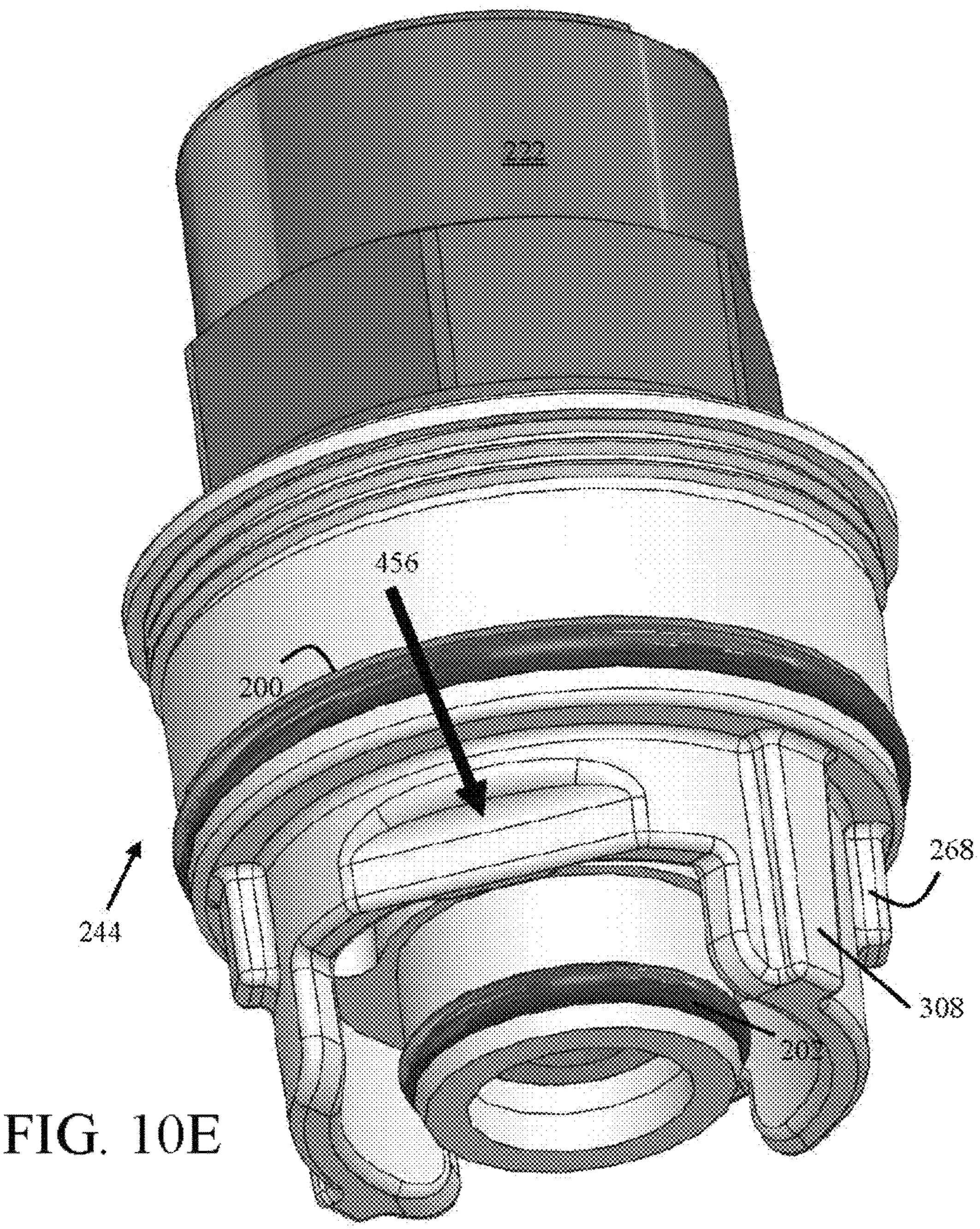
Figure 10F:
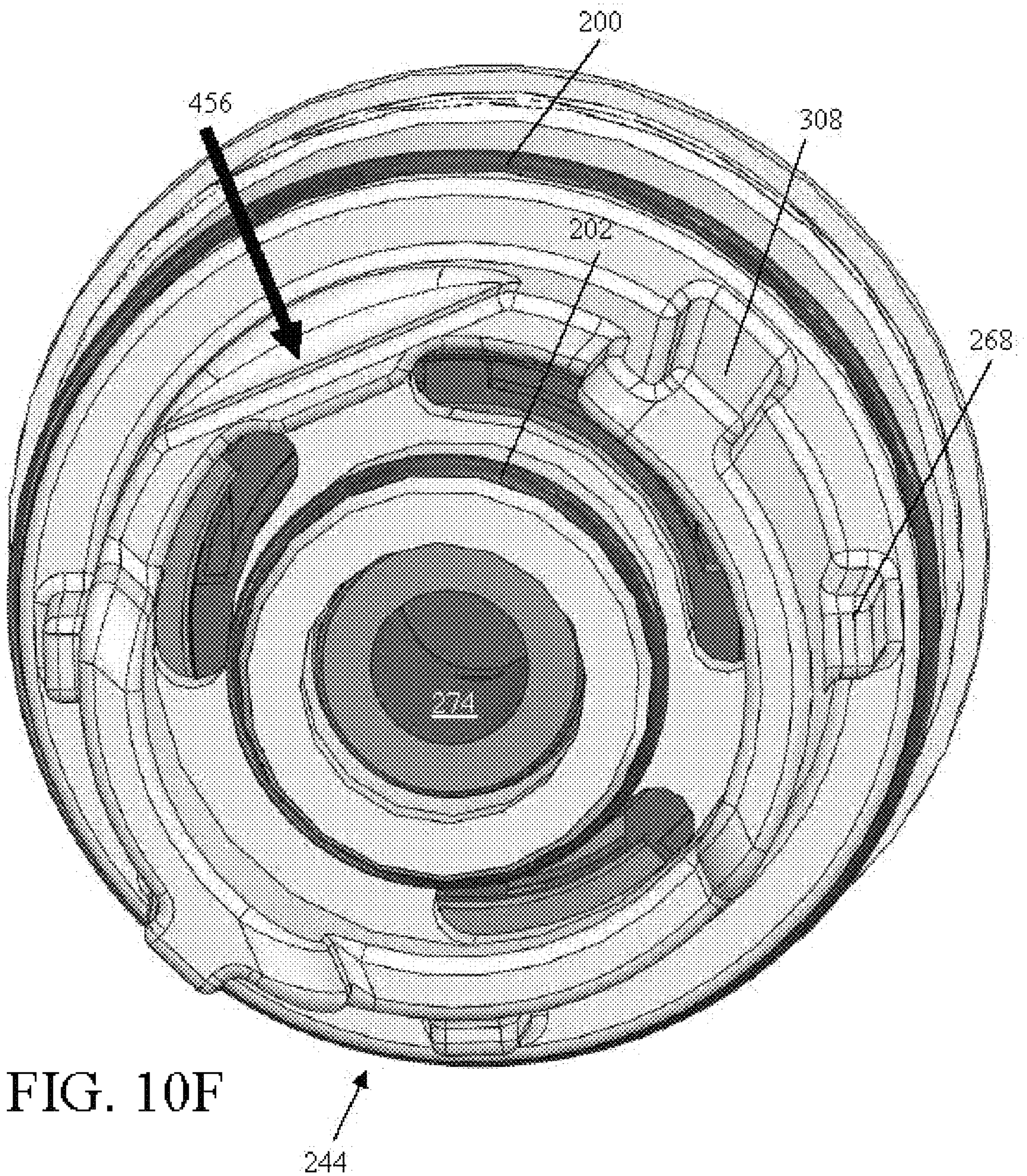
Figure 10G:
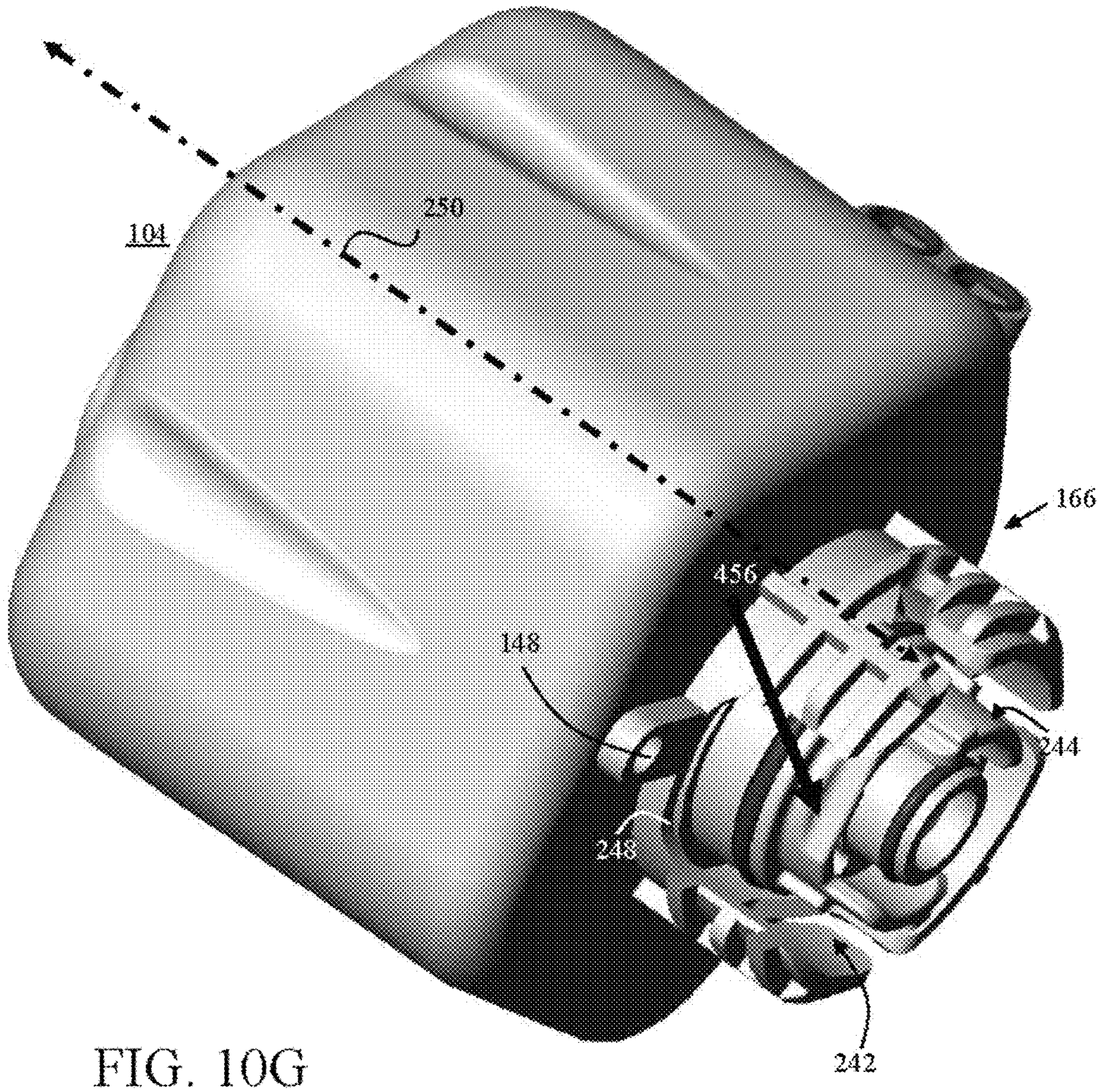

As shown in FIG. 10E, retainer housing 244 acts as a key that turns valve operator 304. When rotating retainer 244 (shown by arrow 452), valve operator 304 is also rotated 454 from an open position (FIG. 10A) to a closed position (FIGS. 10B and 10C) where valve operator 304 maintains a main inlet valve 306 at its closed position (FIG. 10B).

As further detailed below, valve operator 304 remains at the closed position (FIG. 10B) within interior of controller terminal 164 of adapter 108 as the old controller module cartridge 104 is twisted open and removed.

When a new replacement controller module cartridge 104 is inserted into controller terminal 164, interlocking projections 308 (FIG. 10E) of retainer 244 controller module cartridge 104 engage with interlocking recesses 310 of valve operator 304 to rotate it from its closed position (FIG. 10B) to open position (FIG. 10A).

Main inlet valve 306 would remain in the closed position were it not for the upstream water pressure within main inlet 118 being greater than biasing mechanism 312 of main inlet valve 306 that maintains main inlet valve 306 in a biased closed position.

As further illustrated, in addition to residing within controller terminal 164 of adapter 108, valve operator 304 also engages (interlocks with) retainer housing 244 of electromechanically device 222 when controller module cartridge 104 is fully installed.

Valve operator 304 is to maintain and close shut main inlet valve 306 prior to extraction and removal of controller module cartridge 104 to block and prevent water flow 176 from upstream fixture 126. In the non-limiting, exemplary instance, valve operator 306 is comprise of a generally annular disc that includes an inner circumference 314 (FIG. 10E) having first and second notches (interlocking recesses) 310 recessed into the generally annular disc positioned generally across from each other.

Notches 310 receive projections 308 of retainer housing 244 (FIG. 10E), which enables controller module cartridge 104 to move (or rotate) valve operator 304 from one of closed to open or open to closed positions as controller module cartridge 104 is rotated during insertion or removal.

The generally annular disc configuration of valve operator 306 further comprises an outer perimeter surface 316 having an engagement projection 318 extending from outer perimeter surface 316. Engagement projection 318 operates as a cam to engage and, close shut main inlet valve 306 when valve operator 304 is in the closed position. That is, engagement projection 314 engages main inlet valve 306, maintaining main inlet valve 306 at the biased closed position to thereby ultimately maintain closed main inlet 118 of adapter 108.

Engagement portion 318 of valve operator 304 disengages main inlet valve 306 when the removable controller module cartridge 104 is fully installed, with upstream water pressure from upstream fixture 126 pushing main inlet valve 306 from closed to open position.

Valve operator 304 further includes securing-openings 320 for engagement with a securing mechanism 322 (FIG. 10C) that facilitate in maintaining valve operator 306 at one of an open-latched or closed-latched position.

Securing mechanism 322 also ensures that valve operator 304 remains at a closed position. For example, once controller module cartridge 104 is removed, a user may wish to clean the interior of controller terminal 164 of adapter 108 prior to inserting a new replacement controller module cartridge 104. Securing mechanism 322 ensures that valve operator 304 stays in the closed position with engagement projection 318 preventing main inlet valve 306 from opening during cleaning and that valve operator 304 would not open accidentally.

Securing mechanism 322 is housed within a securing housing that is an integral part of adapter 108. Securing mechanism 322 is well known and is comprised of securing member in a form of a ball that is biased (pushed) into engagement with securing-openings 320 by biasing mechanism, which is a resilient member in a form of a non-limiting exemplary spring. Therefore, sufficient rotational force must be applied to rotate controller module cartridge 104 out of its latched-closed or latched-open position. That is, the force applied to rotate controller module cartridge 104 to remove it or to replaced it must be greater than the force of biasing mechanism of securing mechanism 322 that latched-opened or latched-closed valve operator 304. It should be noted that in addition to securing the position of valve operator 304, openings 320 also allow the ball and spring of securing mechanism 322 to extend while controller module cartridge 104 is inserted. This prolongs the life expectancy of biasing spring.

When inserting a new controller module cartridge 104, projections 308 of retainer housing 244 engage with recesses 310 of valve operator 304. In other words, while being inserted (where pins 162 are at straight sections 172 of openings 168), a set of engagement projections 308 of retainer housing 244 of solenoid 222 interlock with notches 310 of valve operator 304 (similar to a key-lock combination).

It should be noted that engagement projections 308 are slanted (or beveled) and hence, function as chamfered surface to facilitate ease of insertion of the entire controller module cartridge 104 into controller terminal 164 of adapter 108 and engagement with recesses 310.

A narrow portion 324 (FIGS. 11E, 10G, and 10H) of the generally annular disc valve operator 304, near engagement portion 318 has a smaller expanse than a remaining portion of the generally annular disc. The narrow portion 324 engages with indentation 456 (FIG. 10H) on retainer housing 244.

Figure 10H:
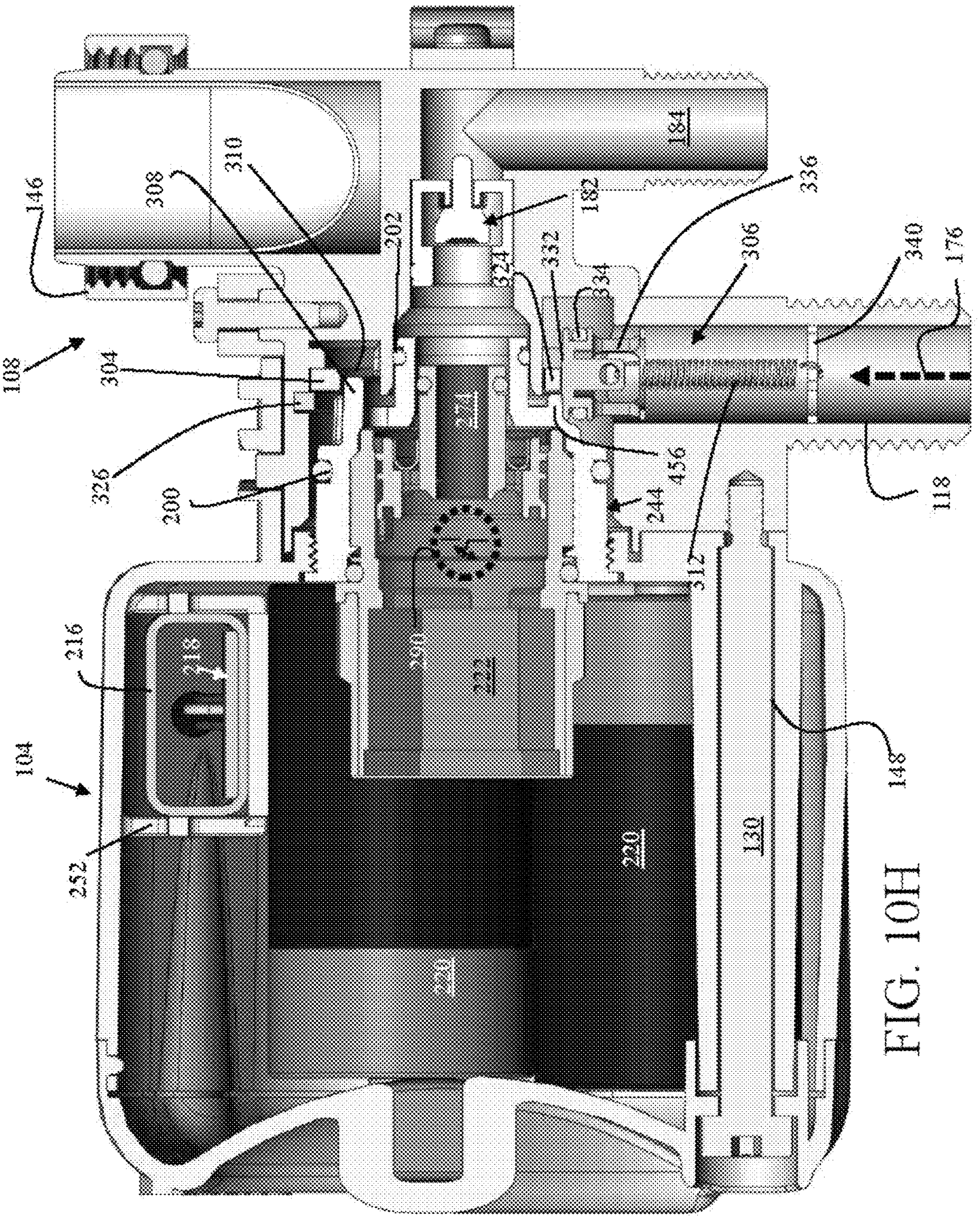
Figure 11A:
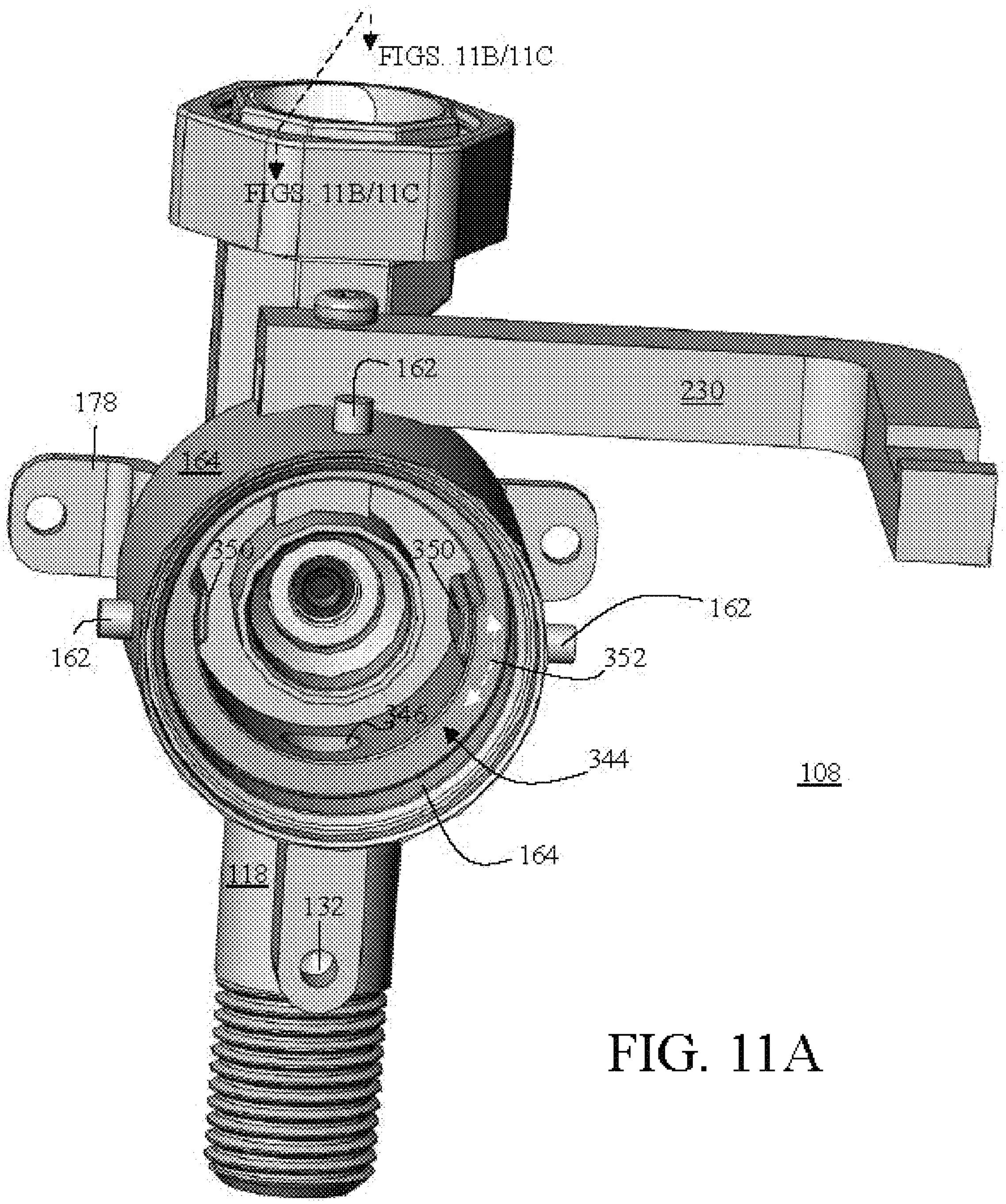
FIGS. 11A to 11K are non-limiting, exemplary illustrations of still another embodiment of the modularized electronic faucet in accordance with another embodiment of the present invention.
Figure 11B:
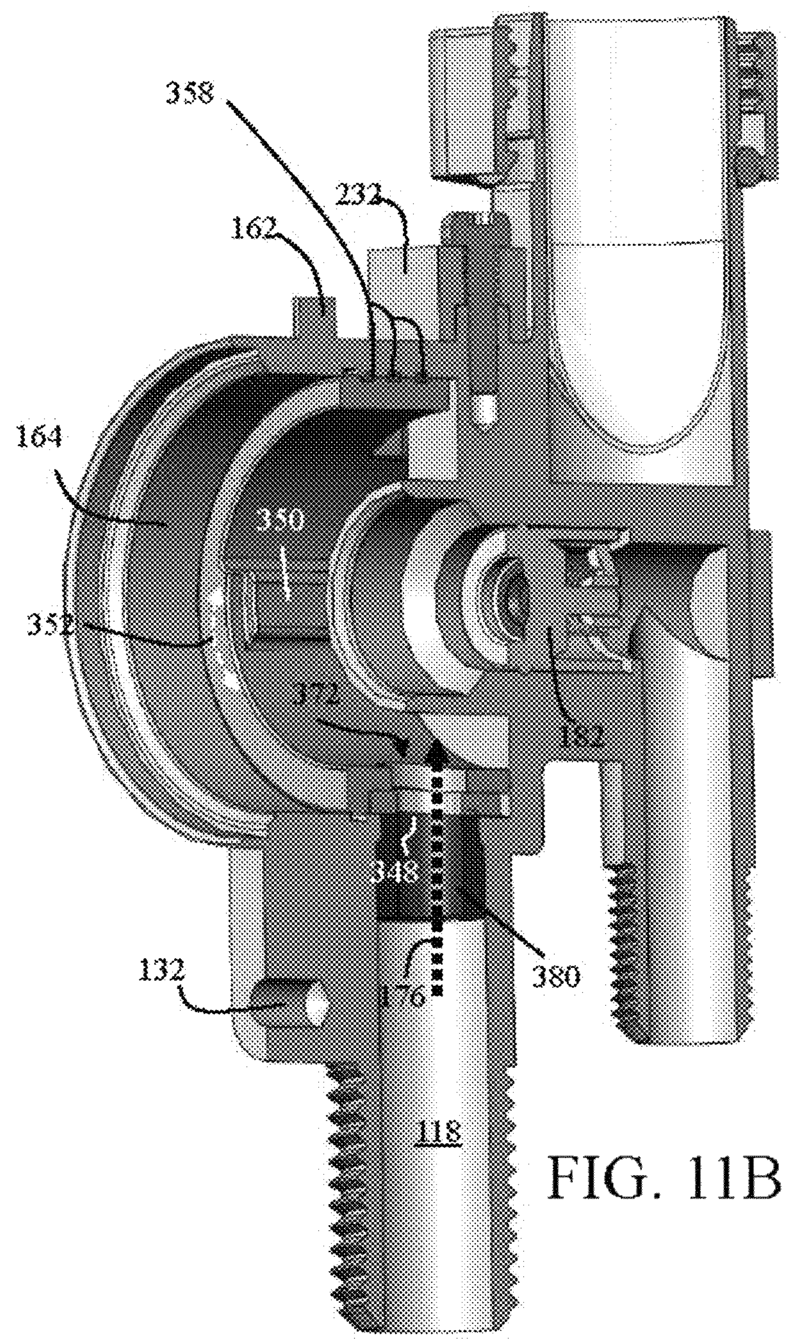
Figure 11C:
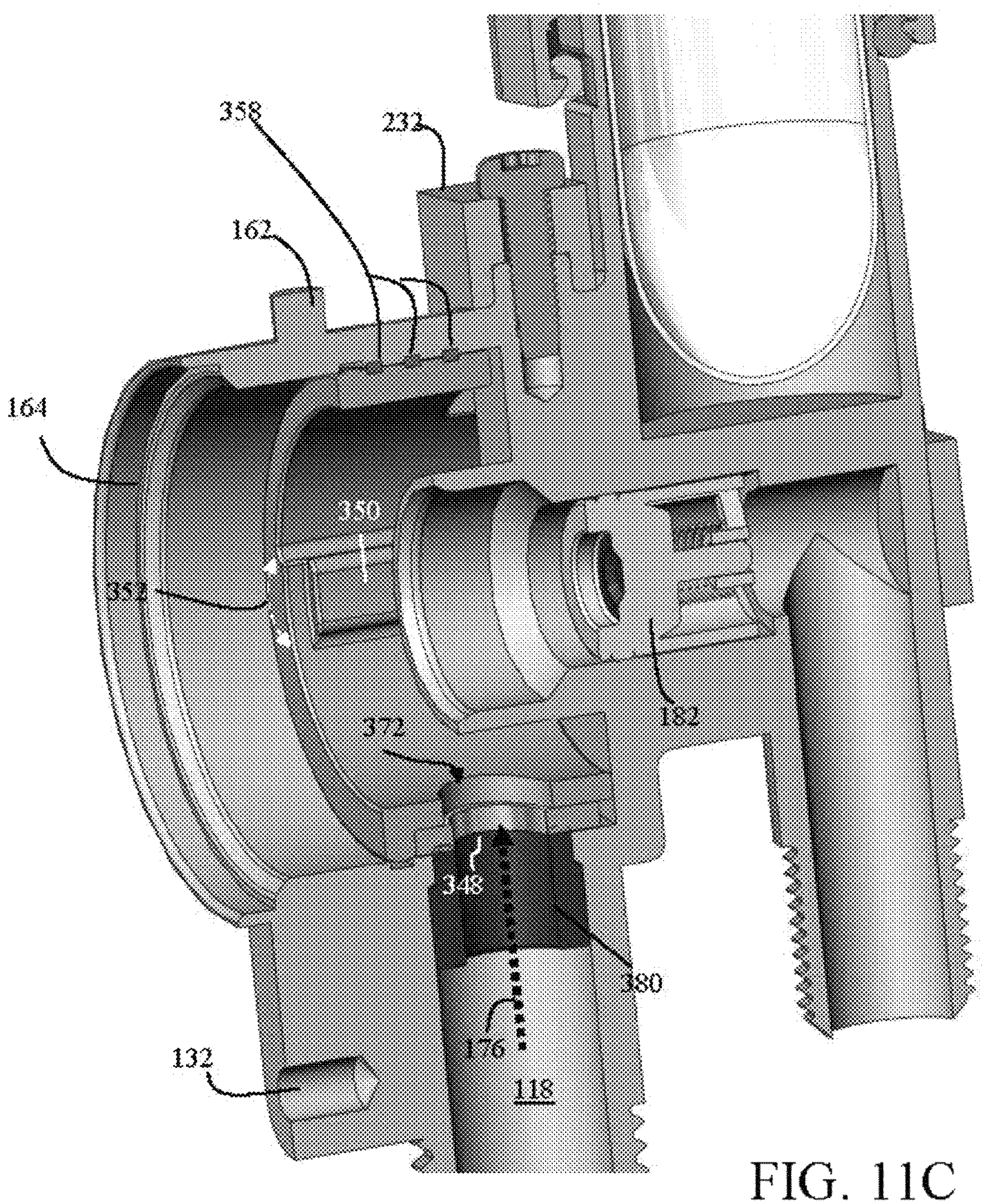
Figure 11D:
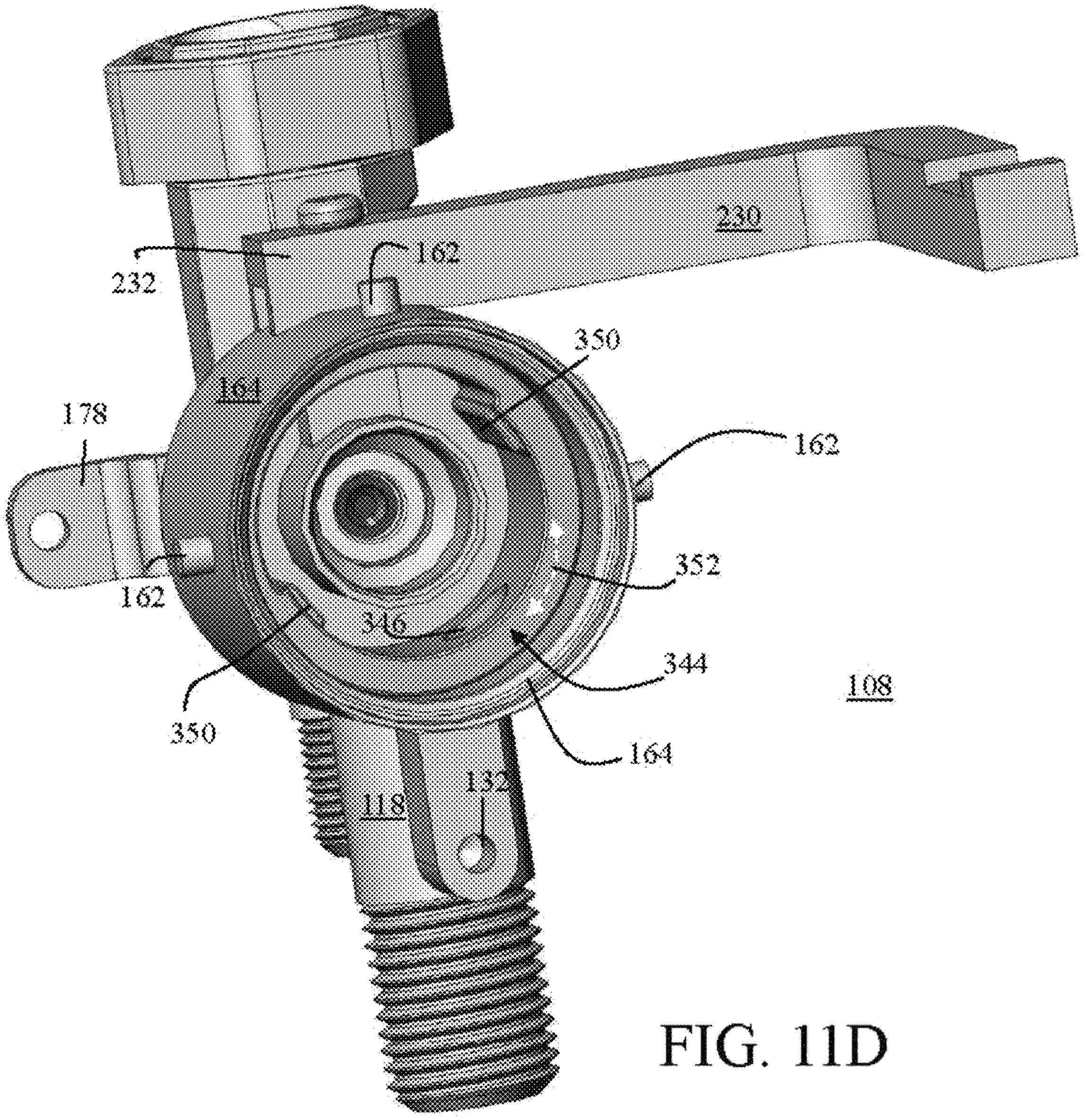
Figure 11E:
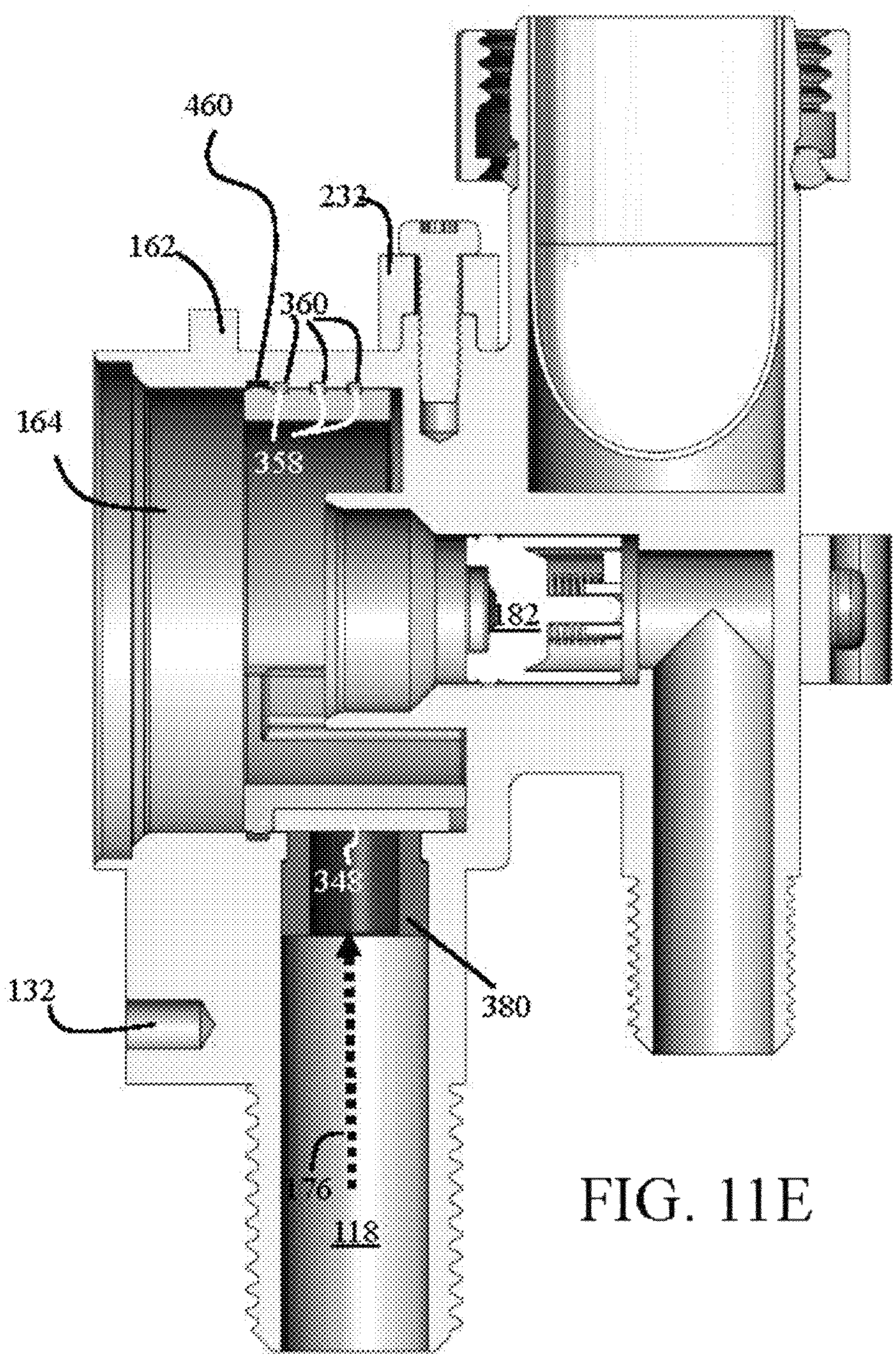
Figure 11F:
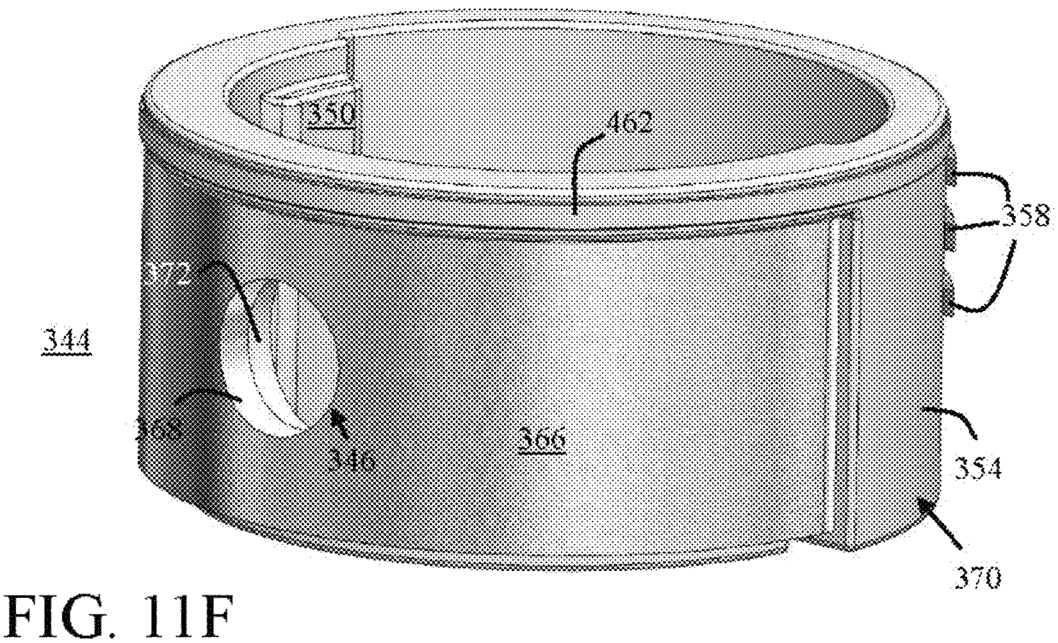
Figure 11G:
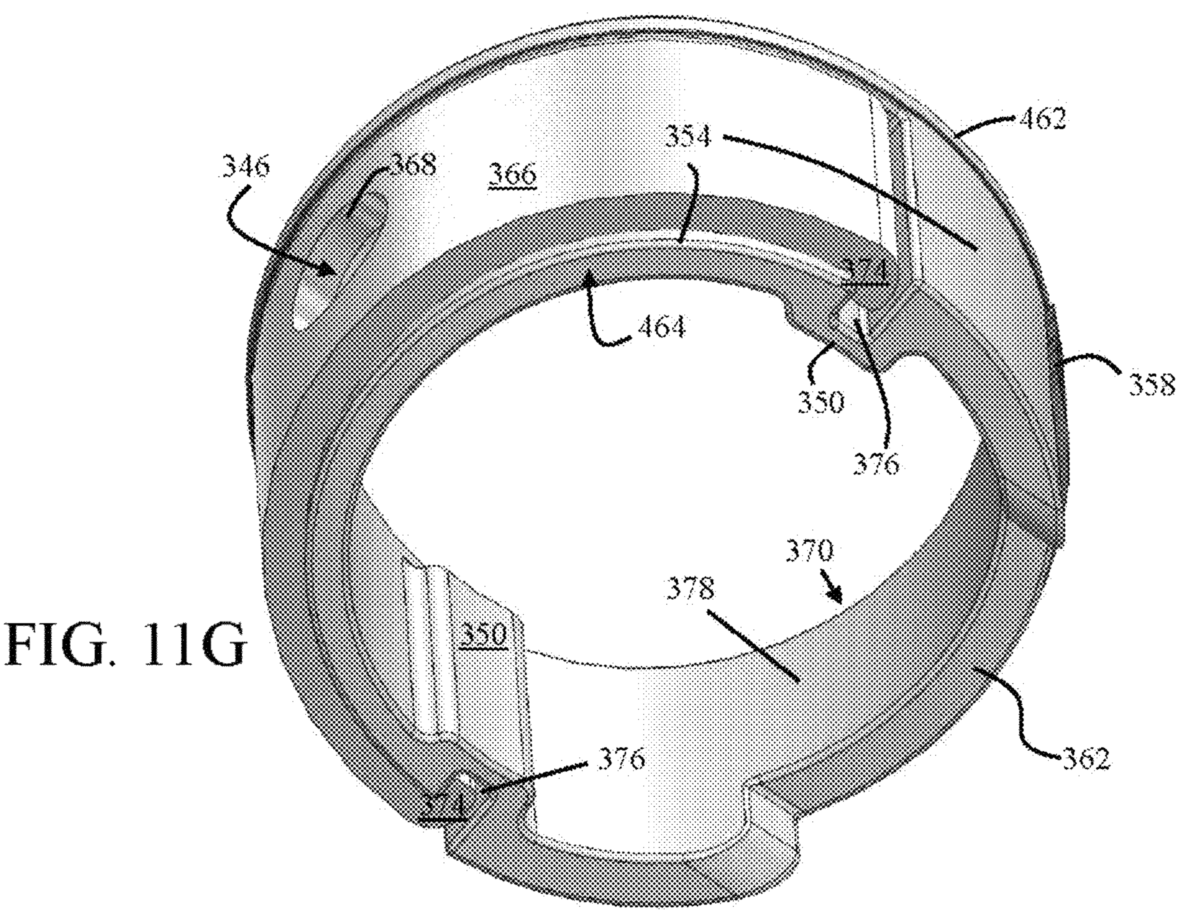
Figure 11H:
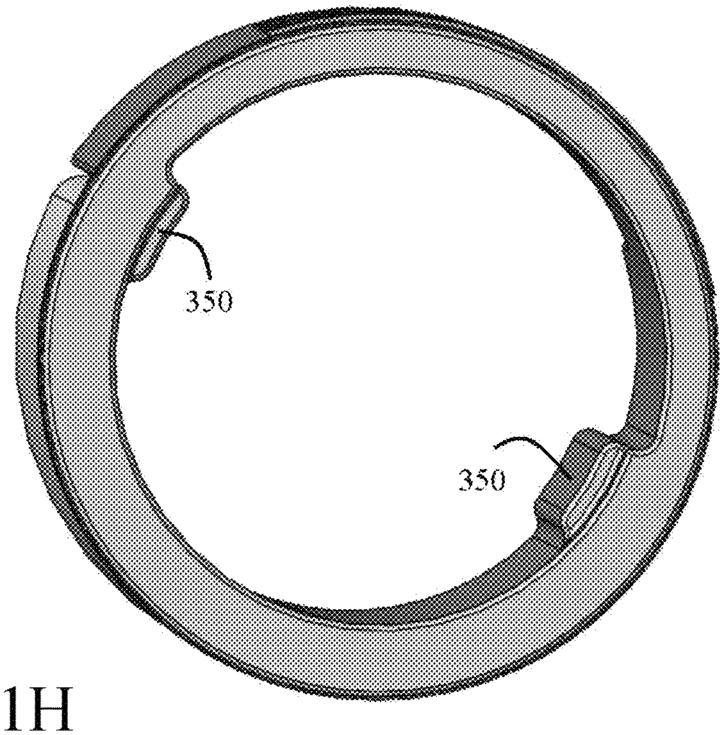

The combination of narrow portion 324 and indentation 456 provide sufficient space for main inlet valve 306 to move to a fully open position (FIG. 10H). In other words, narrow portion 324 and indentation 456 provide sufficient space for main inlet valve 306 to fully open. This way, main inlet valve 306 extends into controller terminal 164 in open position as shown in FIGS. 10A and 10H.

The specific location of valve operator 304 in relation to the interior of controller terminal 164 of adapter 108 is maintained by a retainer washer 326. As illustrated, interior of controller terminal 164 includes a first groove 328 (FIG. 10C) within which a well-known retainer washer 326 resides.

Controller terminal 164 further includes a second groove 330 that functions as a track to moveably retain valve operator 304, with retainer washer 326 maintaining valve operator 304 in its position.

Main inlet valve 306 is comprised of barrier portion 332 that opens and closes water flow 176 (FIG. 10H), with upstream side of barrier portion 332 having a groove for receiving a sealing member 334 in a form of an O-ring that engages inner diameter of main inlet 118.

Top surface of barrier portion 332 (FIG. 10E) engages engagement portion 318 of valve operator 304 for moving main inlet valve 306 from the open to the closed position (or maintaining main inlet valve 306 at closed position).

Main inlet valve 306 further includes alignment (or centering) members 336 extending from the upstream side of barrier portion 332 that slide over inner circumference of main inlet 118 to prevent tilting or wobbling of barrier portion 332 while moving from open to close or close to open positions. Openings 338 of barrier portion 332 enable passage of water from main inlet 118 and into controller terminal 164 when main inlet valve 306 is at an open position.

As shown in FIG. 10C, barrier portion 332 is connected to a retainer washer 340 by biasing mechanism 312, which biases barrier portion 306 (and hence, main inlet valve 306) to a closed position. Further details of valve operator 304 and main inlet valve 306 are fully disclosed in U.S. Patent Application Publication 2019/0234058 to Shakkour et al., the entire disclosure of which is incorporated by reference in its entirety herein.

FIGS. 11A to 11K are non-limiting, exemplary illustrations of another embodiment of the modularized electronic faucet in accordance with another embodiment of the present invention. The modularized electronic faucet illustrated in FIGS. 11A to 11K includes similar corresponding or equivalent components, interconnections, functional, operational, and or cooperative working relationships as the modularized electronic faucet that is shown in FIGS. 1 to 10I, and described above. Therefore, for the sake of brevity, clarity, convenience, and to avoid duplication, the general description of FIGS. 11A to 11K will not repeat every corresponding or equivalent component, interconnections, functional, operational, and or cooperative working relationships that has already been described above in relation to the modularized electronic faucet that is shown in FIGS. 1 to 10I but instead, are incorporated by reference in their entirety herein.

As detailed below, in this non-limiting, exemplary embodiment shown in FIGS. 11A to 11K, main inlet valve 344 is positioned outside main inlet 118 and within controller terminal 164 of adapter 108, and is comprised of a cylindrical annular disc with a through-opening 346 that when aligned with main inlet opening 348 (FIG. 11B), enables water flow 176.

As further detailed below, in this non-limiting, exemplary embodiment valve operator 466 (FIG. 11J) is comprised of key-engagement members (recesses) on retainer housing 244 of electromechanical device 222 which interlock with key-projections 350 of main inlet valve 344 to enable rotation (shown by arrow 352) of main inlet valve 344 from an open position (FIGS. 11A to 11C) to a closed position (FIGS. 11D and 11E) for replacement of controller module cartridge 104.

As illustrated in FIGS. 11A to 11K, main inlet valve 344 is comprised of a main body 370 and a cover 366. Main body 370 of main inlet valve 344 is comprised of an annular cylindrical disc having an outer circumferential surface 354 (FIGS. 11F to 11I) that has a first section 356 (FIG. 11I) that includes a set of parallel oriented, partially extending projection guides 358. Projection guides 358 move within a commensurate set of parallel oriented recesses or grooves 360 (FIG. 11E) that are recessed within interior surface of controller terminal 164 of adapter 108. Grooves 360 of interior surface of controller terminal 164 of adapter 108 function as tracks to enable projection guides 358 of main inlet valve 344 to move within, limiting potential translation motions of main inlet valve 344. It should be noted that slot 460 is to allow projection located at edge 462 of the diameter of main inlet valve 344 to drop in slot 460 to prevent main inlet valve 344 from being pulled and removed.

Figure 11I:
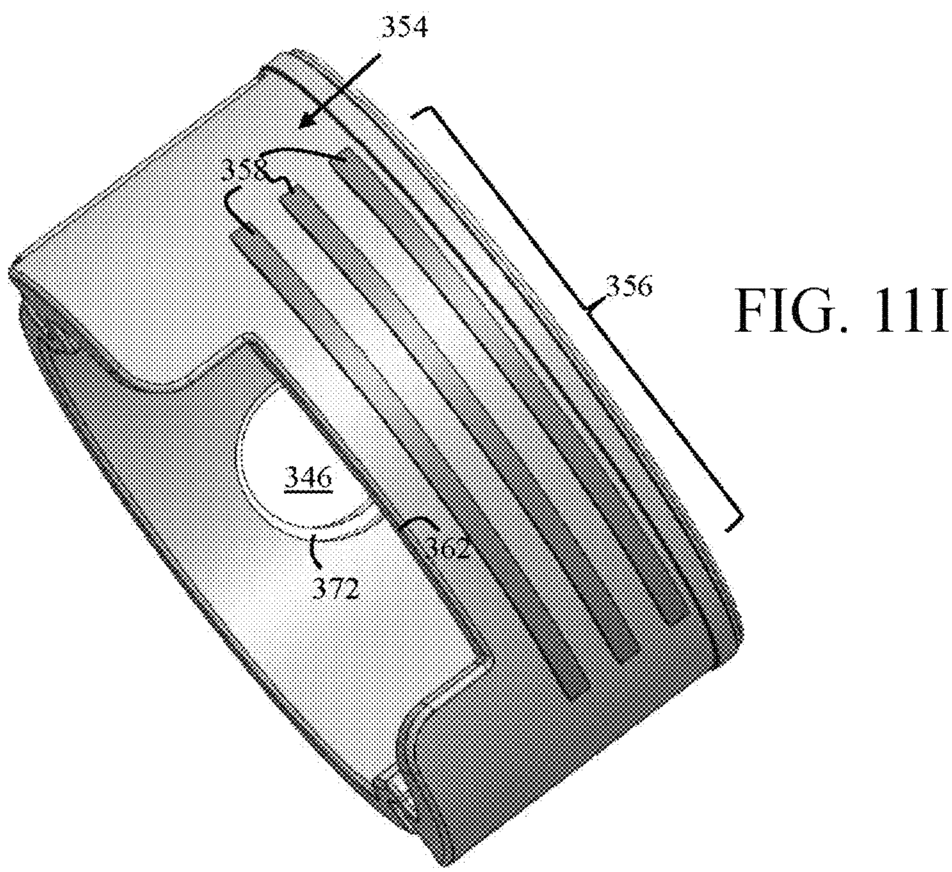
Figure 11J:
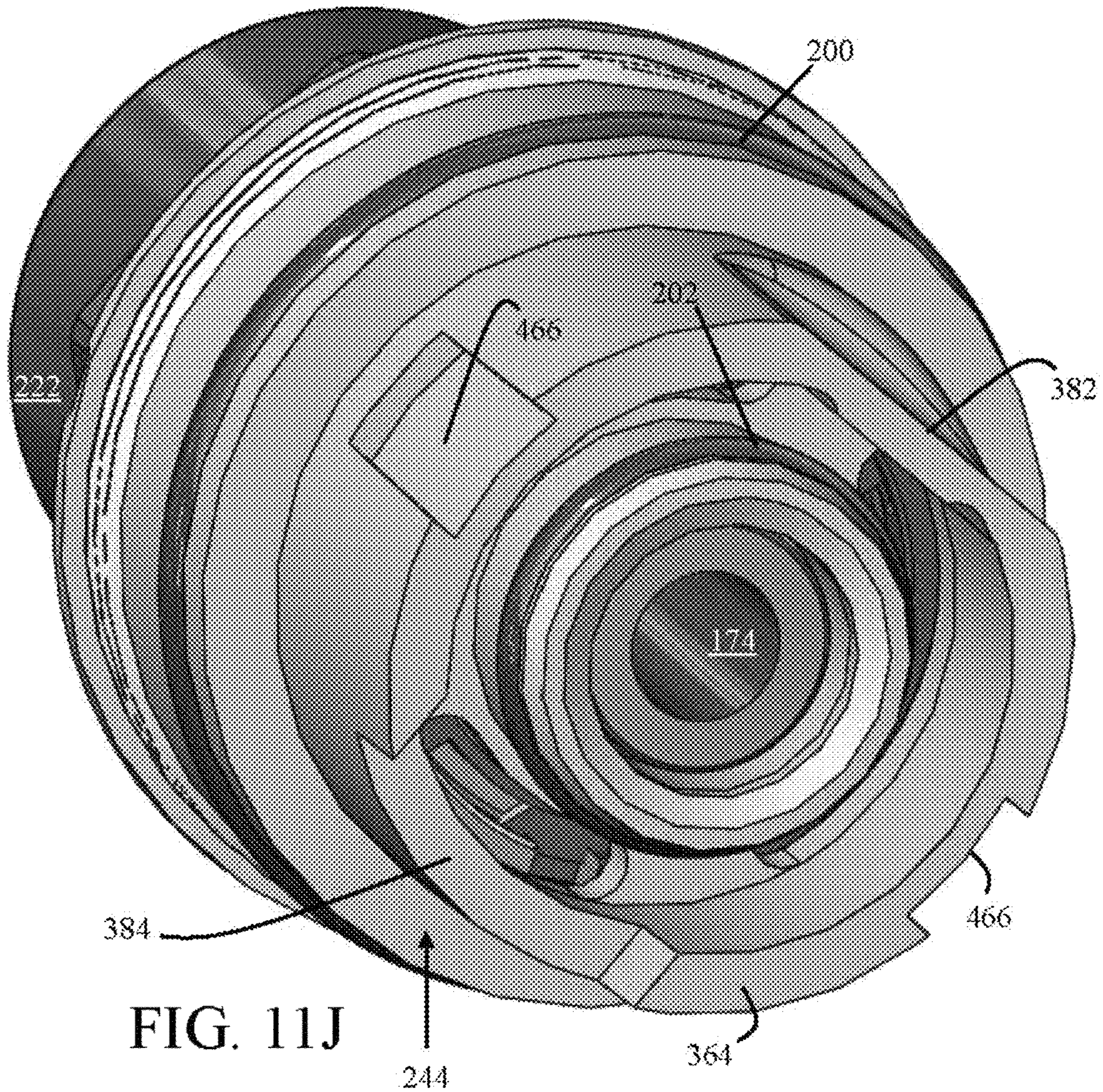
Figure 11K:
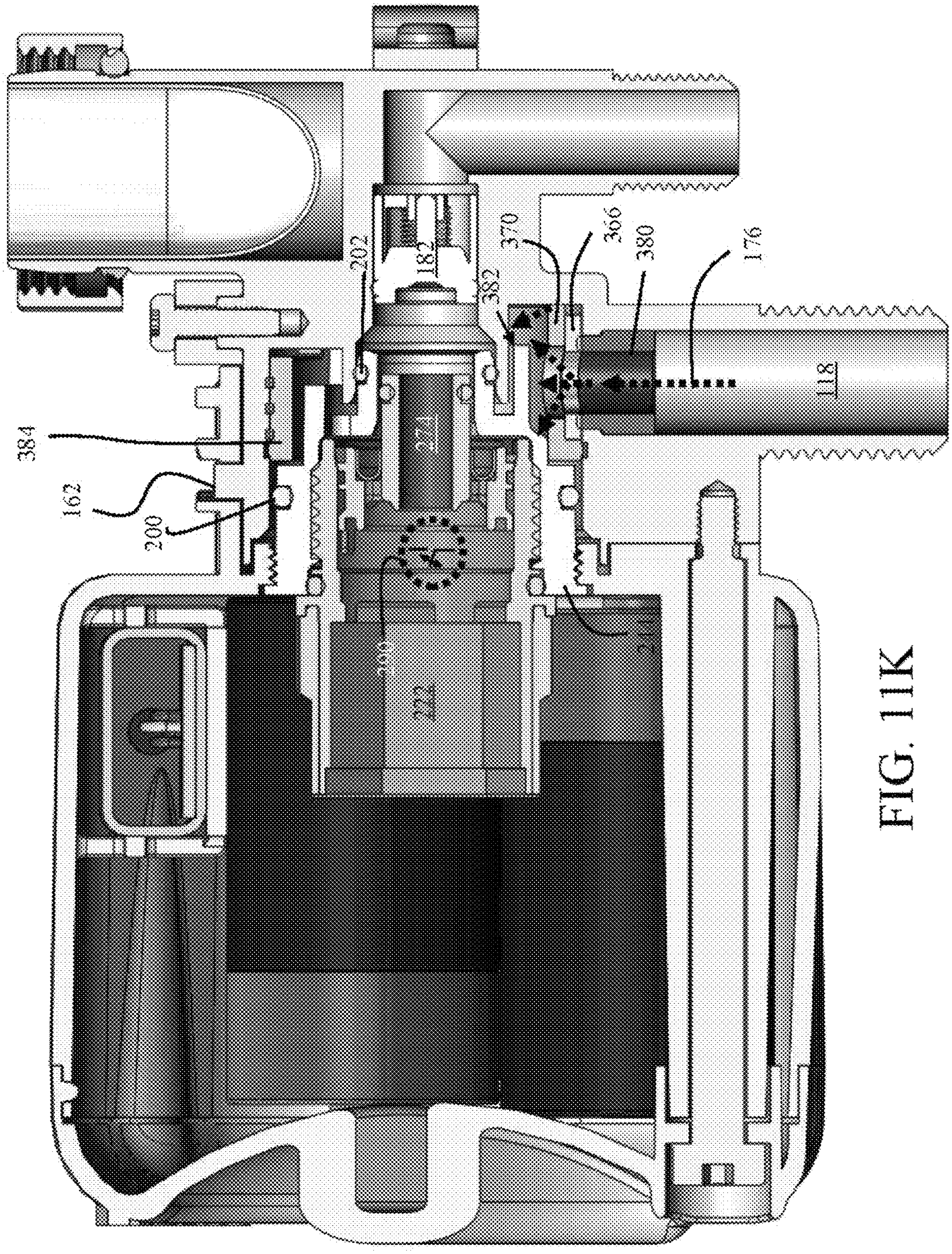

As best shown in FIGS. 11I and 11K, first section 356 of outer circumferential surface 354 of main body 370 of main inlet valve 344 has a relief 362 to enable main inlet valve 344 to be properly mounted within controller terminal of adapter 108.

Outer circumferential surface 354 of main body 370 further includes a second section 364 that has through-opening 346, generally positioned opposite projection guides 358, which when aligned with opening 348 of main inlet 118 of adapter 108, enable water flow 176 otherwise, water flow 176 is blocked by cover 366. Openings 372 and 368 (FIG. 11F) form the through-opening 346 of main inlet valve 344.

Second section 364 of outer circumferential surface 354 is covered over by a generally water-resistant cover 366 (e.g., highly polished stainless steel) for added strength and proper seal with annular seal member 380; the cover 366 also has opening 368 that is aligned with opening 372 of outer circumferential surface 354 to form through-opening 346. Water-resistant cover 366 is mounted onto second section 364 by a set of lateral projections 374 that snap into a set of recessed ends 376 of second section 364.

Main inlet valve 344 further includes an inner circumferential surface 378 with key projections 350 that function to interlock with recesses 466 of retainer housing 244 of electromechanical device 222. When rotating controller module cartridge 104, retainer housing 244 rotates which, in turn, rotates main inlet valve 344 at key projections 350.

Main inlet 118 has an annular seal member 380 that is flexible (for example, may be comprise of flexible rubber) so that when main inlet valve 344 is rotated to a closed position, proper seal is achieved between rubber seal 380 and main inlet valve 344 (especially between cover 366 and rubber seal 380 where cover 366 may comprise of high polished stainless steel or chrome plated brass).

As illustrated in FIGS. 11J and 11K, in this non-limiting, exemplary instance, retainer housing 244 also has flat (or thinner or slightly indented) portion 382 to enable water flow 176; otherwise, a larger sized portion 382 would cover over main inlet opening 348. Retainer housing 244 (opposite flat portion 382) has a relief 384 enables electromechanical device 222 to be fully inserted into controller terminal 164 of adapter 108.

FIGS. 12A to 15B are non-limiting, exemplary illustrations of another embodiment of the modularized electronic faucet in accordance with another embodiment of the present invention. The modularized electronic faucet illustrated in FIGS. 12A to 15B includes similar corresponding or equivalent components, interconnections, functional, operational, and or cooperative working relationships as the modularized electronic faucet that is shown in FIGS. 1 to 11K, and described above. Therefore, for the sake of brevity, clarity, convenience, and to avoid duplication, the general description of FIGS. 12A to 15B will not repeat every corresponding or equivalent component, interconnections, functional, operational, and or cooperative working relationships that has already been described above in relation to the modularized electronic faucet that is shown in FIGS. 1 to 11K but instead, are incorporated by reference in their entirety herein.

Figure 12A:
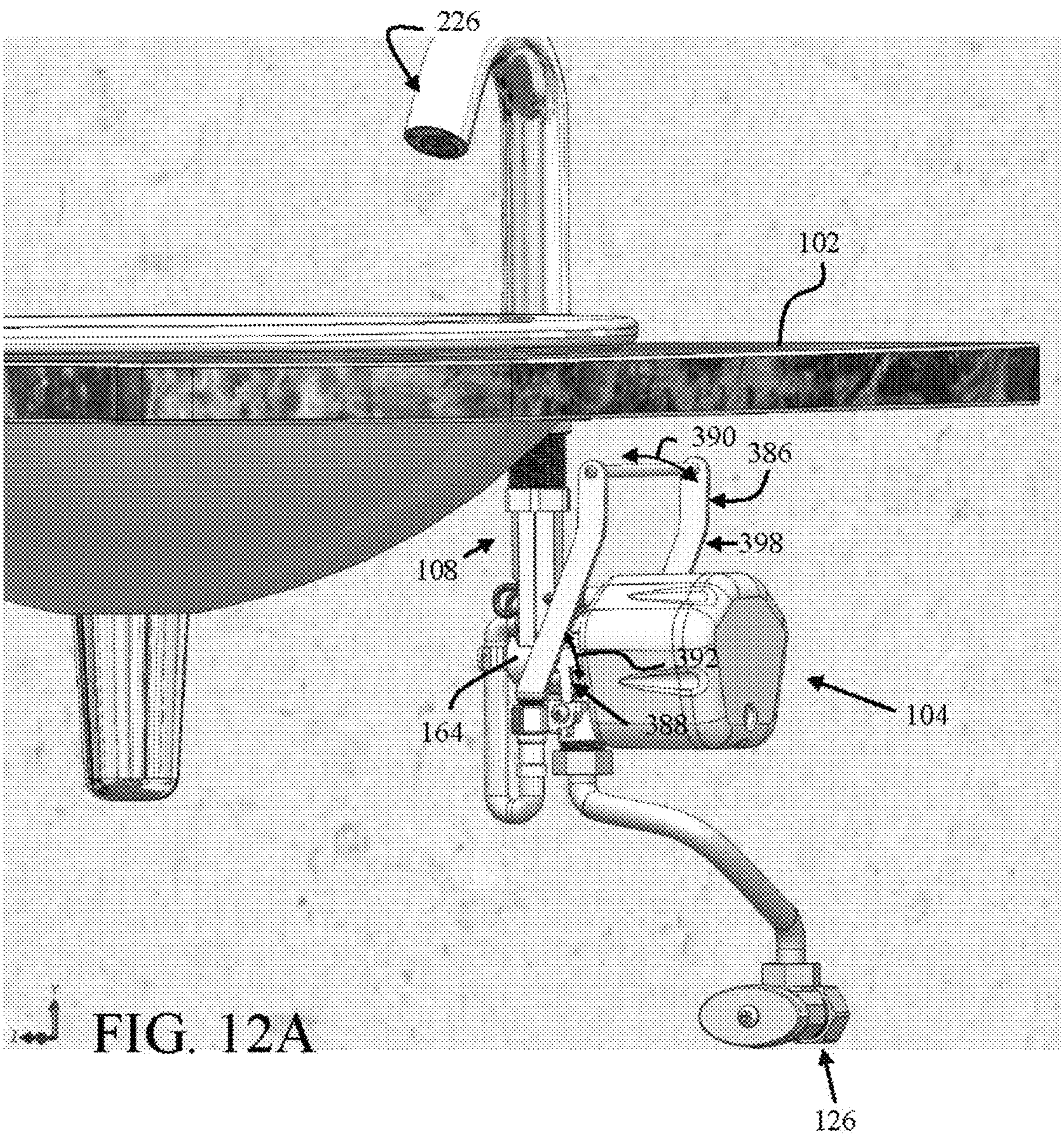
FIGS. 12A to 15B are non-limiting, exemplary illustrations of another embodiment of the modularized electronic faucet in accordance with another embodiment of the present invention.
Figure 12B:
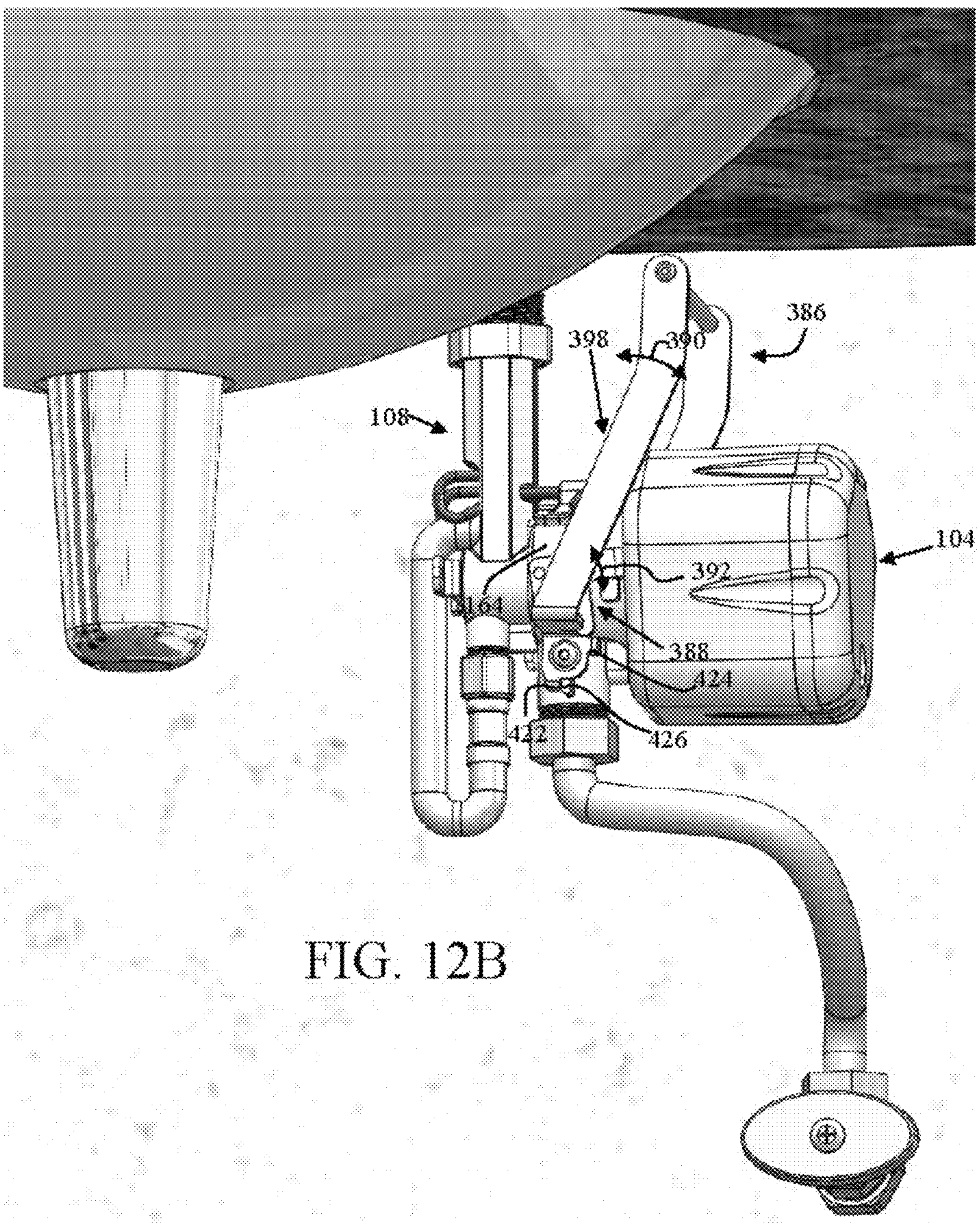
Figure 12C:
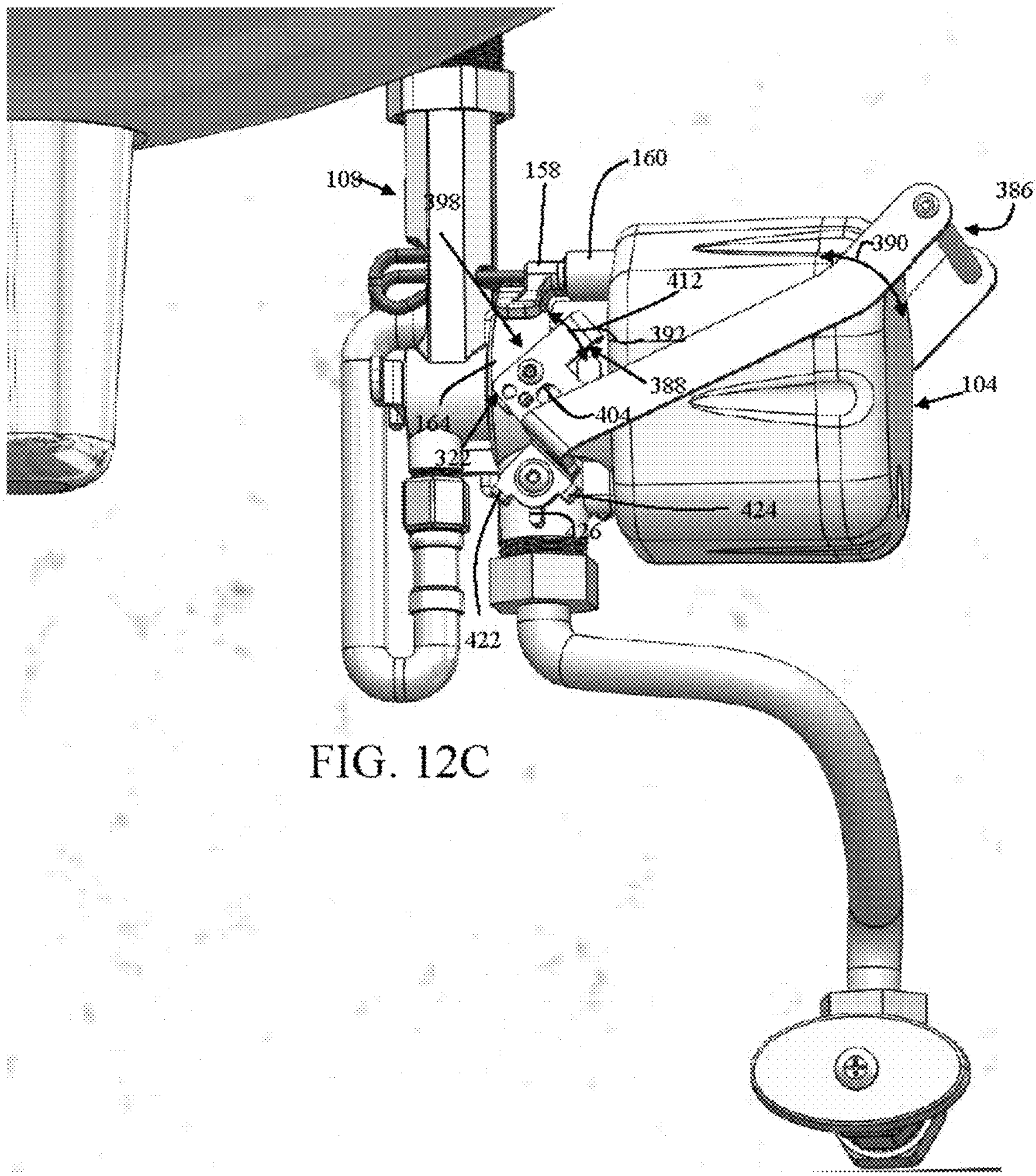
Figure 12D:
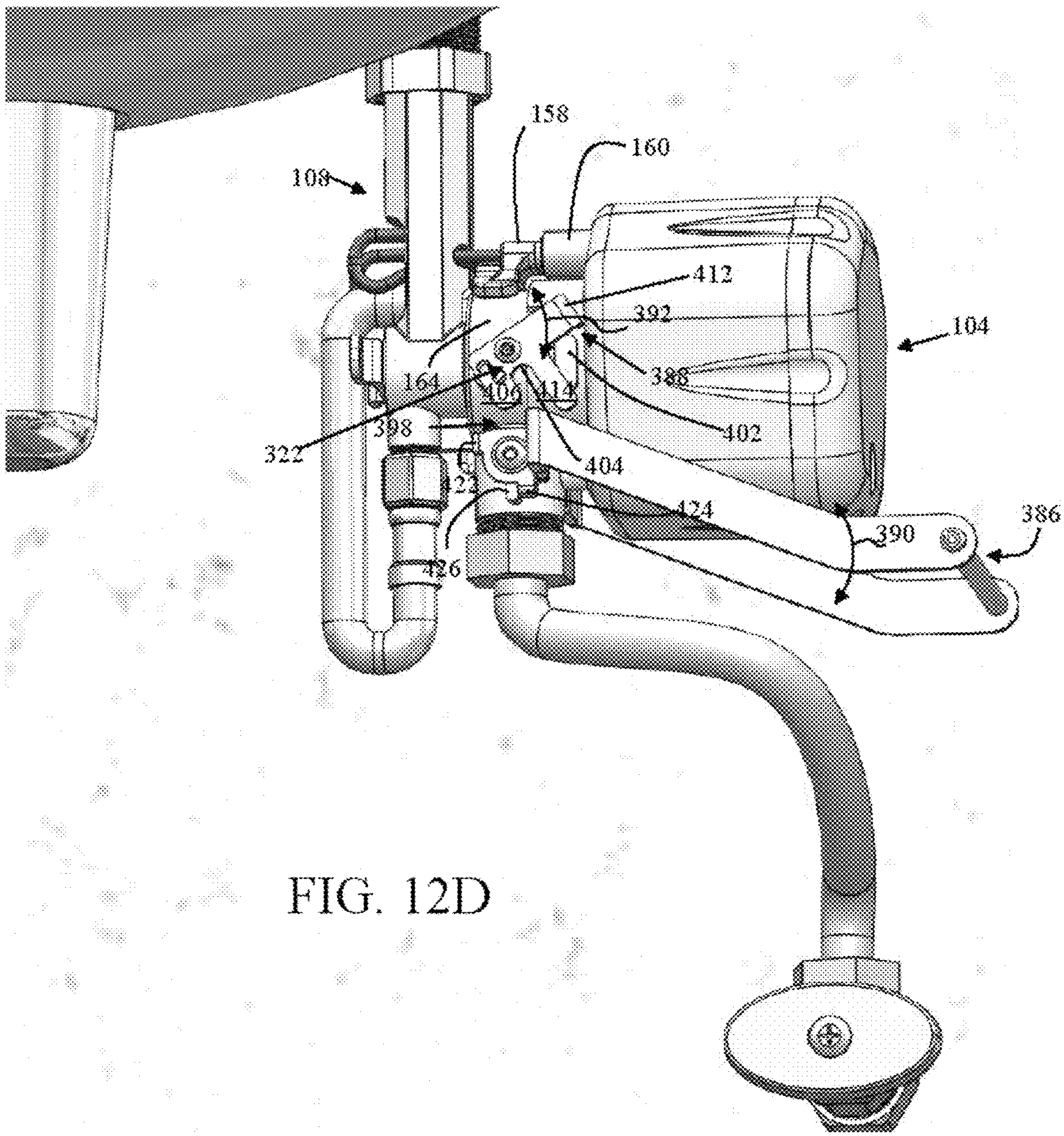
Figure 12E:
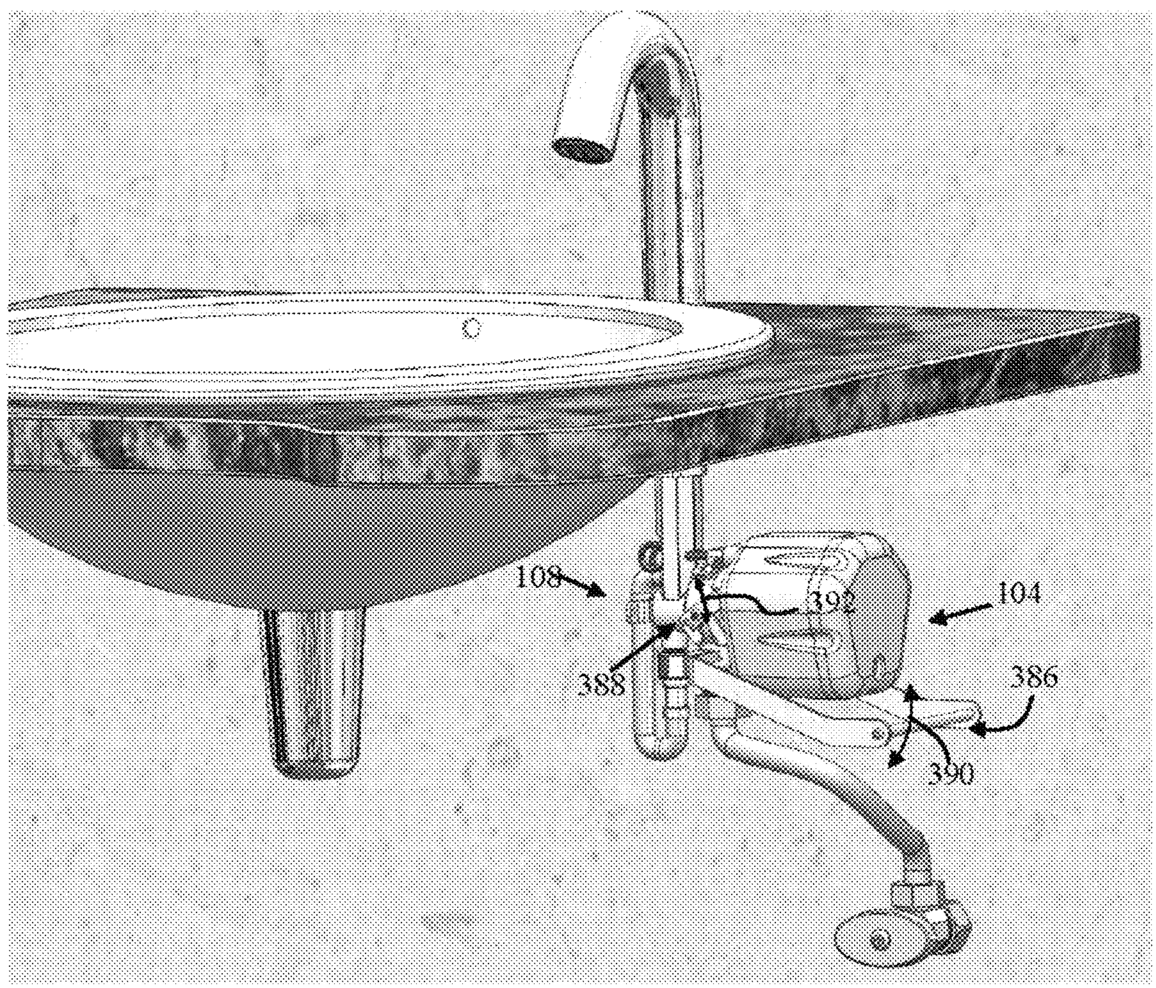
Figure 12F:
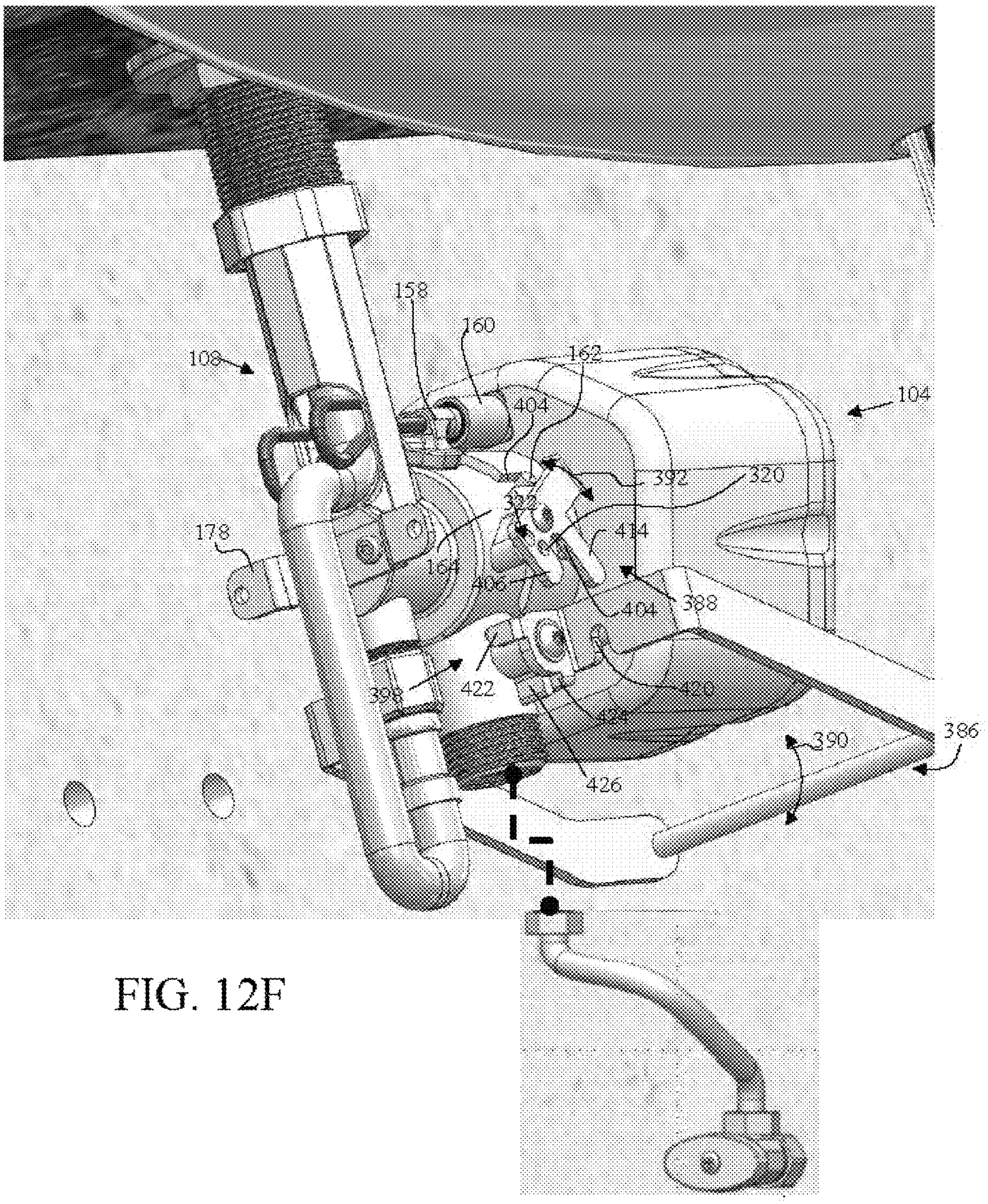
Figure 12G:
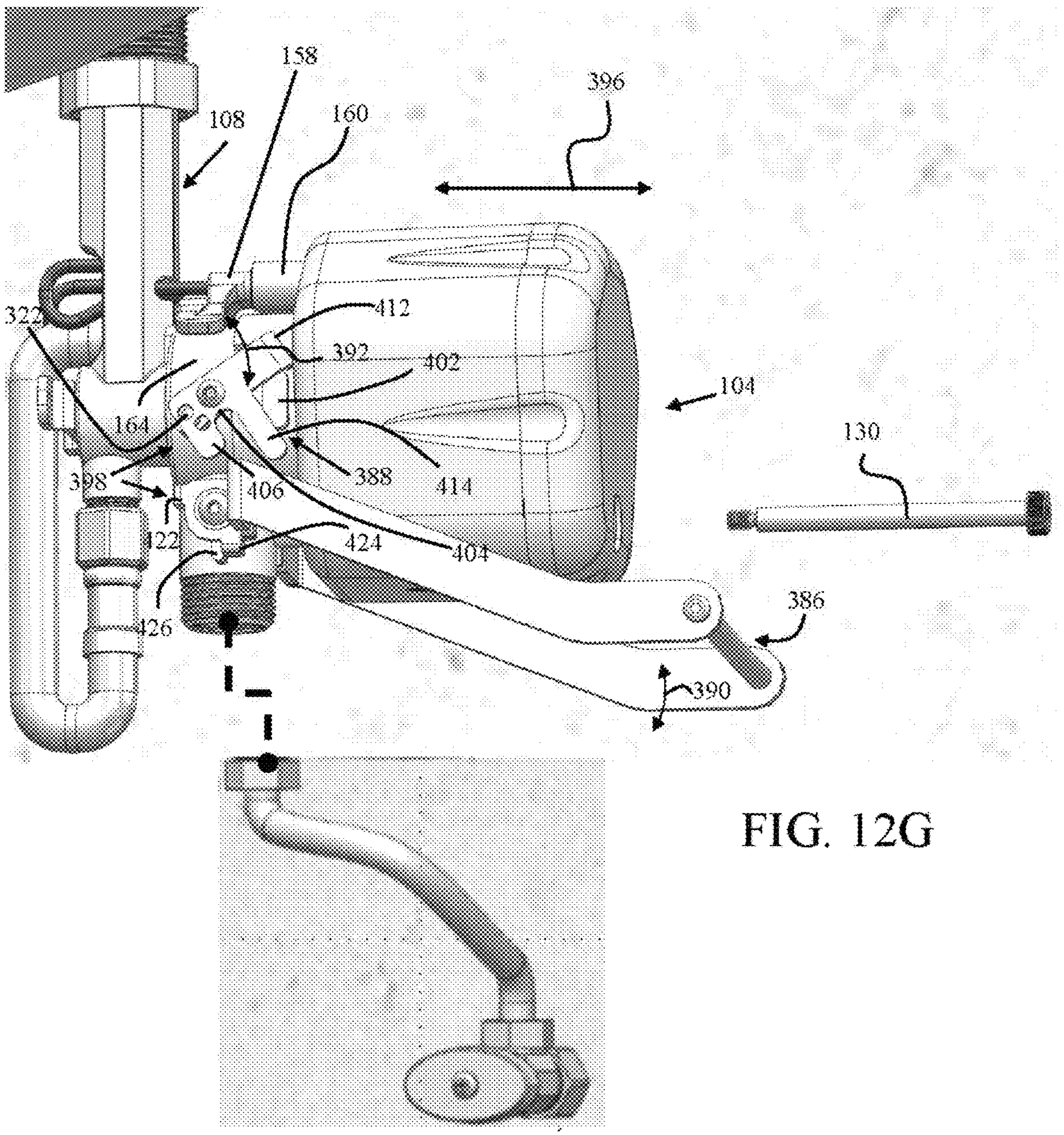

In this non-limiting, exemplary embodiment, adapter 108 includes latch mechanism 398 with a latch handle 386 that is very intuitive to operate to remove and replace controller module cartridge 104, as shown progressively from a fully latched position (FIG. 12A) to an unlatched position (FIG. 12G). All that is required of end-users is to simply pull latch handle 386 of latch mechanism 398 of adapter 108 along direction 390 to unlatch and remove controller module cartridge 104.

As detailed below, as latch handle 386 is pulled towards unlatch position (FIG. 12F) along path 390, main inlet valve 436 also closes to shut-off water. Thereafter, optional security fastener 130 (if used) may be removed and controller module cartridge 104 pulled away from adapter 108 along direction 396 (FIG. 12G). This final action of pulling away controller module cartridge 104 would sever optical communications between spout assembly 106 and controller module cartridge 104. That is, optical plugs 158 will be unplugged from optical receptacles 160. It should be noted that as soon as the latch handle 386 releases controller module cartridge 104, controller module cartridge 104 might be pushed out by residual water pressure present in adapter 108, and there might not be, any need to "pull" controller module cartridge 104 out.

To install a new controller module cartridge 104, all that is required is to push in controller module cartridge 104 to engage controller terminal 164 of adapter 108, which will automatically enable optical plugs 158 to plug into optical receptacles 160. Next, if used, optional security fastener 130 may be used to secure controller module cartridge 104 onto adapter 108. Thereafter, users may simply pull up latch handle 386 in direction 390 to secure latch controller module cartridge 104 onto adapter 108. As latch handle 386 is pulled from the unlatched position (FIG. 12G) to a latched position (FIG. 12A), main inlet valve 436 opens to enable water flow.

FIGS. 13A to 13I are non-limiting, exemplary illustrations of an adapter with a latch mechanism shown in FIGS. 12A to 12G in accordance with one or more embodiments of the present invention. As illustrated, latch mechanism 398 is comprised of a latch handle 386 that includes latch actuators 400 that move latches 388 to latch onto lateral-keepers 402 on controller module cartridge 104.

To latch onto controller module cartridge 104, latch handle 386 is moved from an unlatched position (FIG. 13A) towards a latched position (FIG. 13F), latch actuators 400 are moved to within slot 404 of latches 388 and engage with latching-side 406 of slot 404.

Latch actuators 400 push onto latching-sides 406 in direction 410 to move latches 388 in latch direction 408, which enables latching-ends 412 to latch onto lateral-keepers 402 of controller module cartridge 104. Additionally, latches 388 are secured within one of latched or unlatched positions by securing mechanism 322 (shown in FIG. 13E).

Figure 13A:
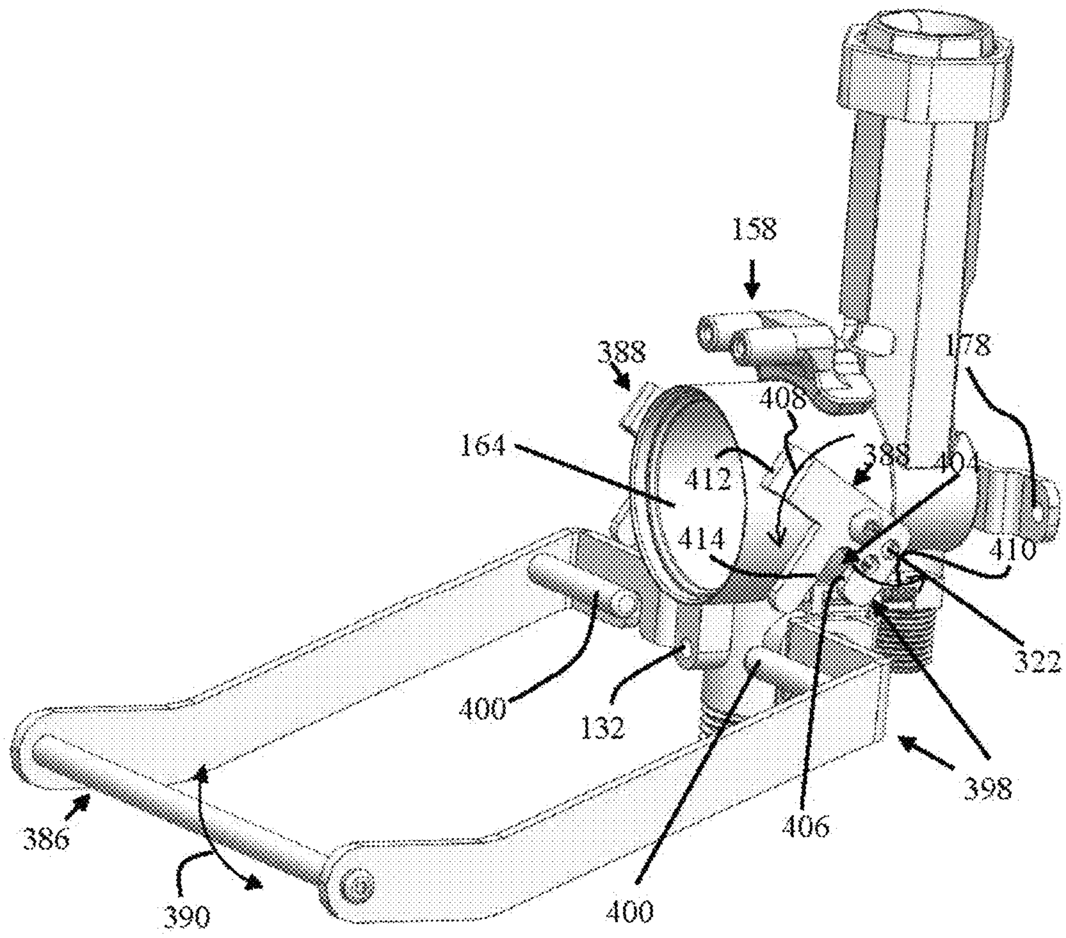
Figure 13B:
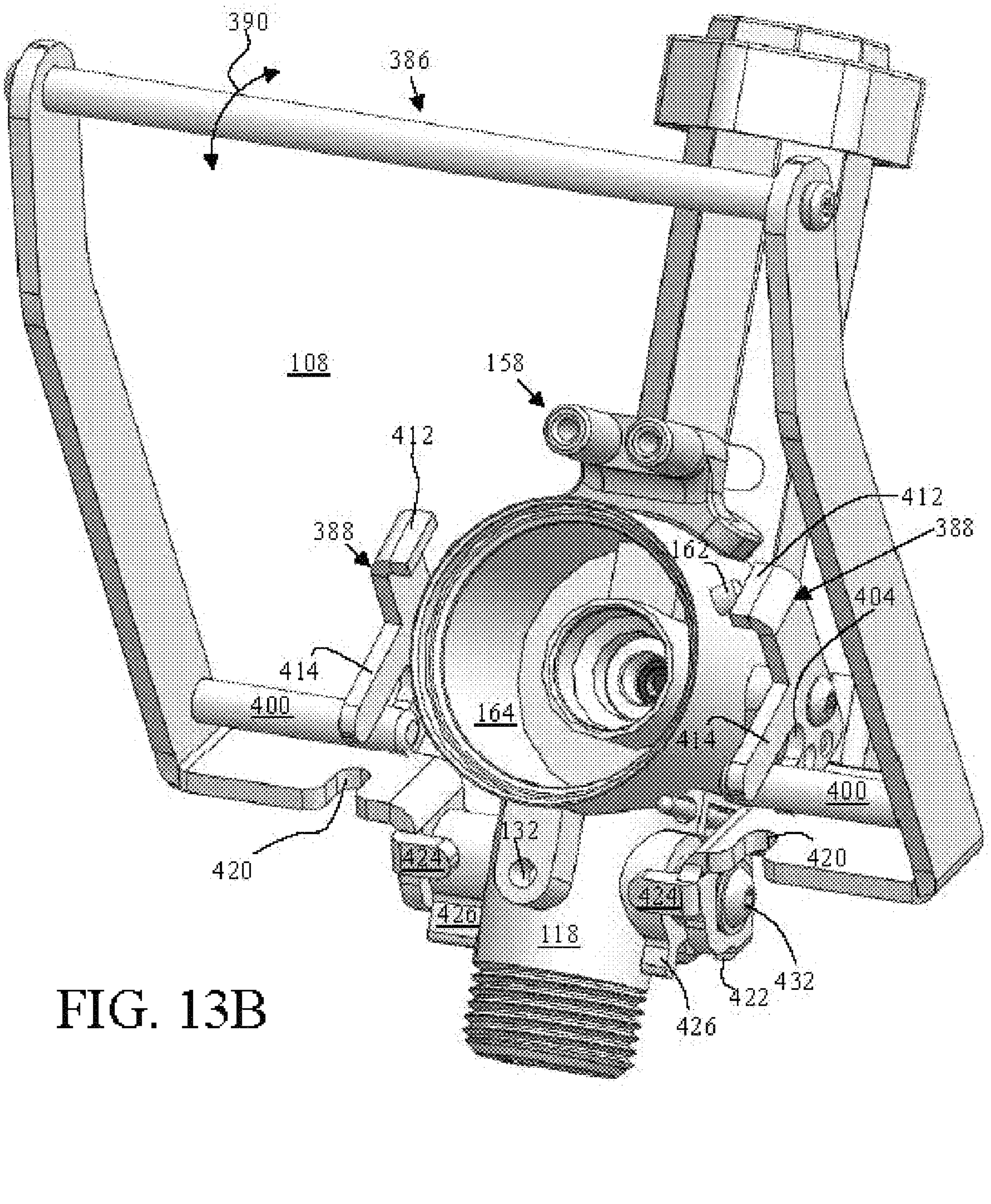
Figure 13C:
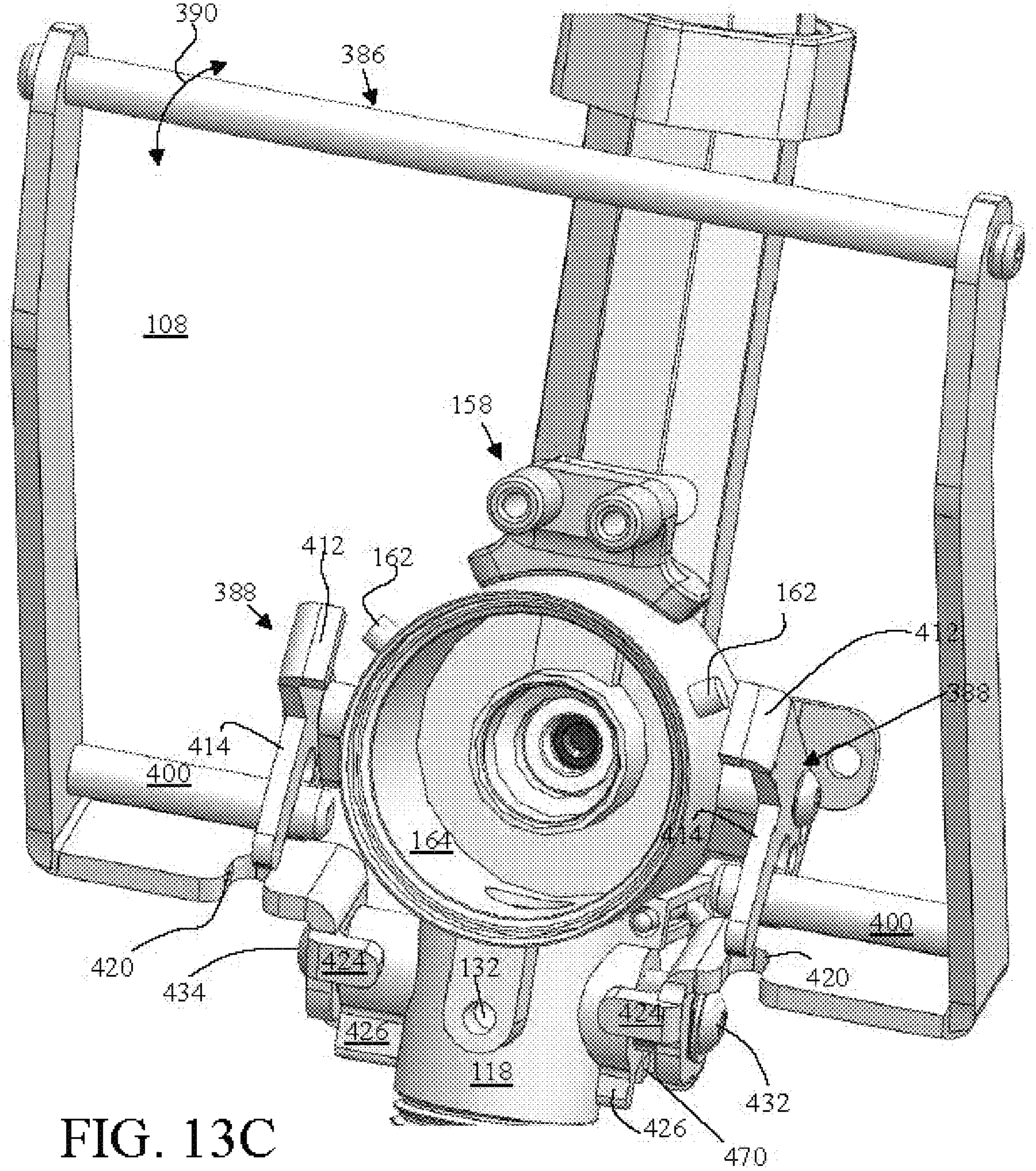
Figure 13D:
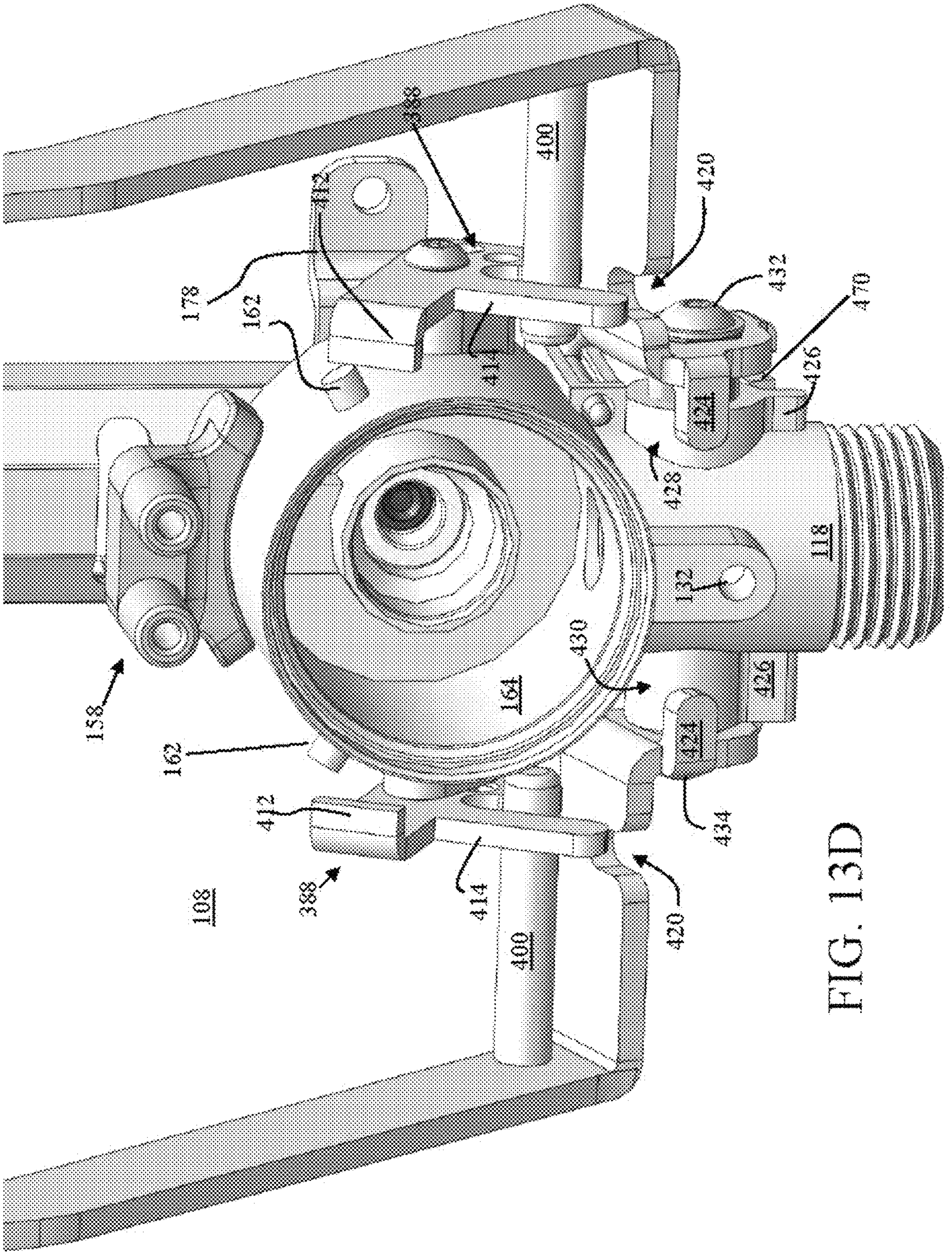
Figure 13E:
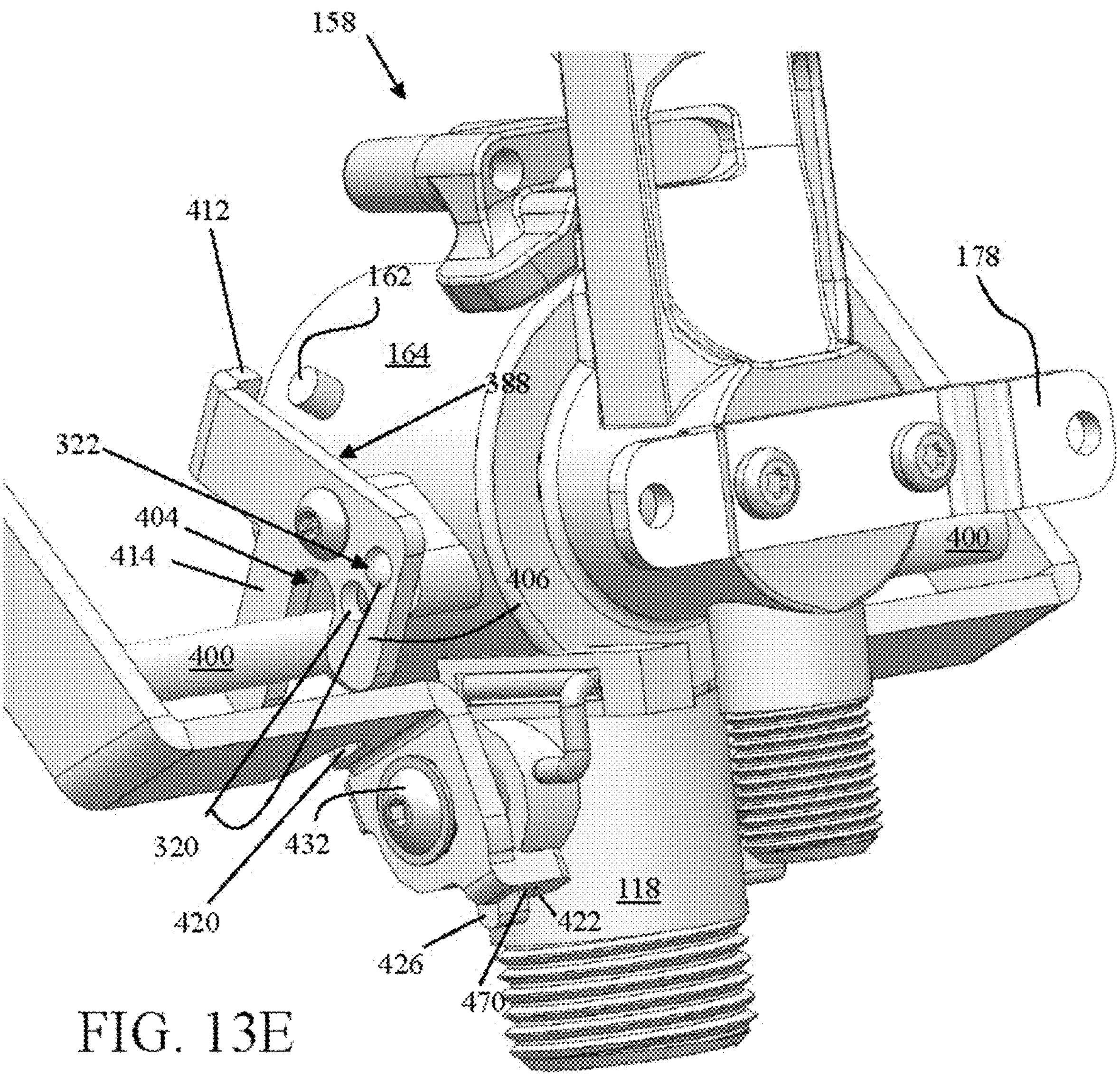
Figure 13F:
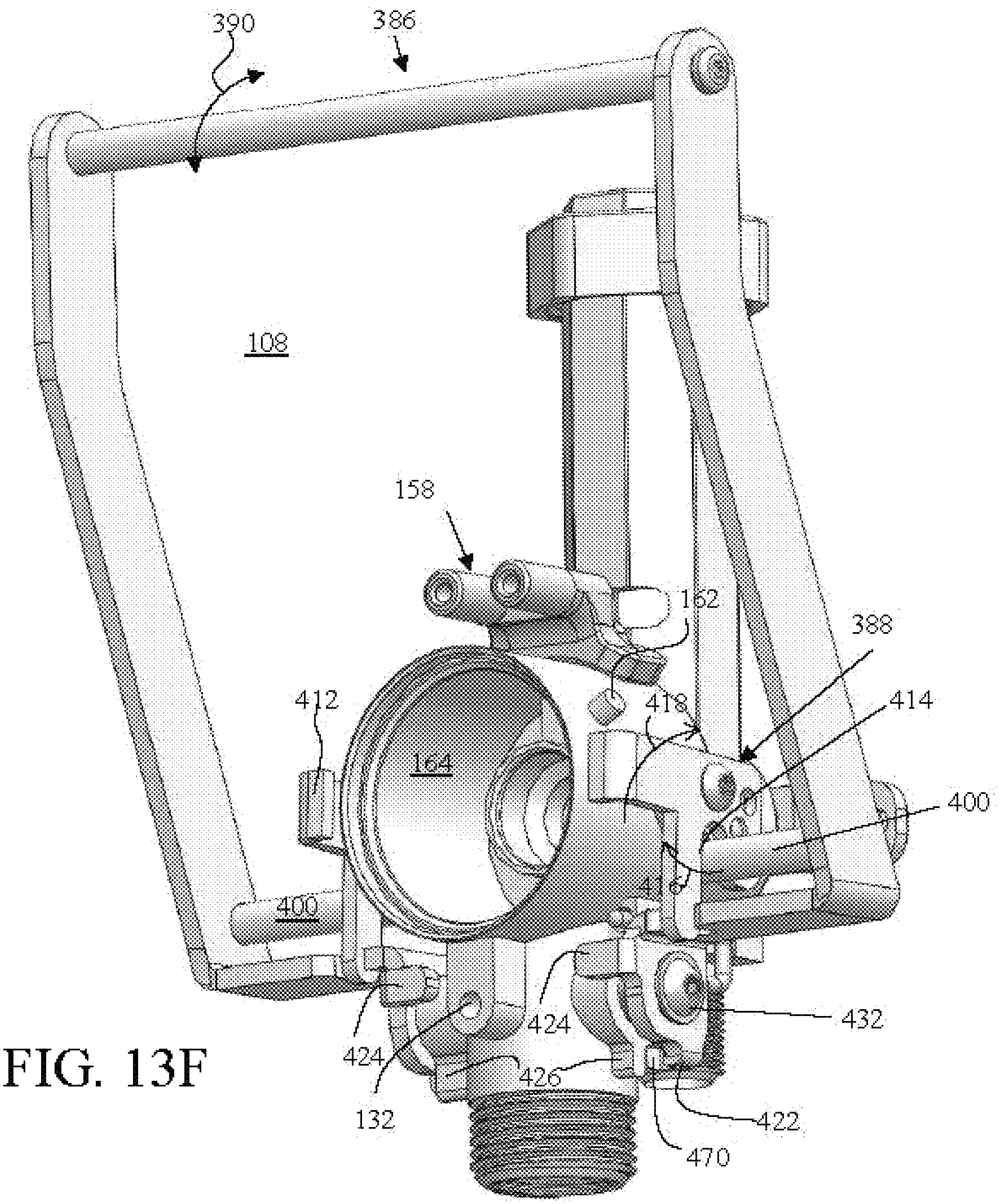

As illustrated, latches 388 include securing-openings 320 for, engagement with a securing mechanism 322 that facilitate in maintaining latches 388 at one of a latched or unlatched position. It should be noted that at the stages shown in FIGS. 13A to 13D water flow 176 is still shut-off as latch handle 386 has not fully reached to its fully latched position to automatically open main inlet valve 436. Further, when unlatching (moving latch handle 386 from a fully latched position shown in FIG. 13F to unlatched position shown in FIG. 13A), main inlet valve 436 closes first as soon as latch handle 386 is moved. Accordingly, just as the above embodiments, main inlet valve 436 in this embodiment shuts-OFF water flow 176 first when moving latch handle 386 to unlatch position (FIG. 13A), and turns ON water flow 176 last when latch handle 386 is moved to its final latched position (FIG. 13F).

To unlatch from controller module cartridge 104, as latch handle 386 is moved from an latched position (FIG. 13F) towards an unlatched position (FIG. 13A), latch actuators 400 would move out of slot 404 of latches 388, but as they move out they engage with unlatching-side 414 (FIG. 13F) of slot 404. Latch actuators 400 push onto unlatching-sides 414 in direction 416 to move latches 388 in latch direction 418, which enables latching-ends 412 to unlatch from lateral-keepers 402 of controller module cartridge 104.

Latches 388 are pivotally connected to the outer lateral sides of controller terminal 164 of adapter 108 by pivot pins 432 and 434. Latches 388 are securely maintained in one of latched and unlatched position by securing mechanism 322. Unlatching-side 414 of latches 388 when in a fully latched position (FIG. 13F) rests within reliefs 420 (FIG. 13D) of latch handle 386.

Latch handle 386 further includes a pair of latched-position stop-flanges 422 and unlatched-position stop-flanges 424 that in their respective final positions engage lateral-stops 426, formed of lateral projections on outer surface of main inlet 118 of adapter 108. For example, FIG. 13F illustrates latched position stop-flanges 422 engaged with lateral-stops 426 when latch handle 386 is fully latched. Unlatched-position stop-flanges 424 engage with lateral-stops 426 when latch handle 386 is in a fully unlatched position (FIG. 13A).

Main inlet 118 includes two lateral protuberances 428 and 430 (FIG. 13D) which include extensions that form lateral-stops 426. Lateral protuberances 428 and 430 further include opening for receiving a pivot pins 432 and 434 that enables latch handle 386 to be movably connected to adapter 108.

Figure 13G:
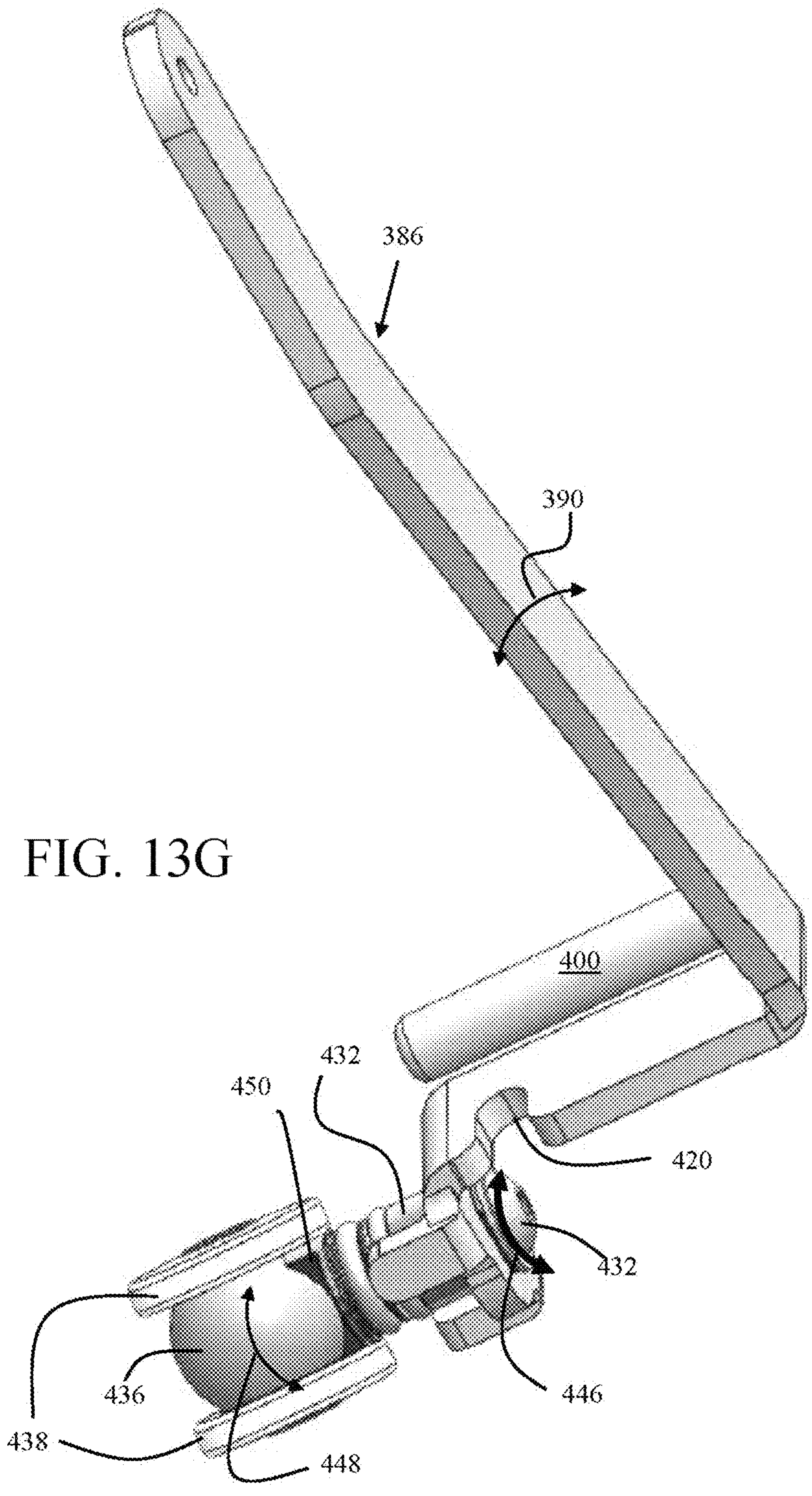
Figure 13H:
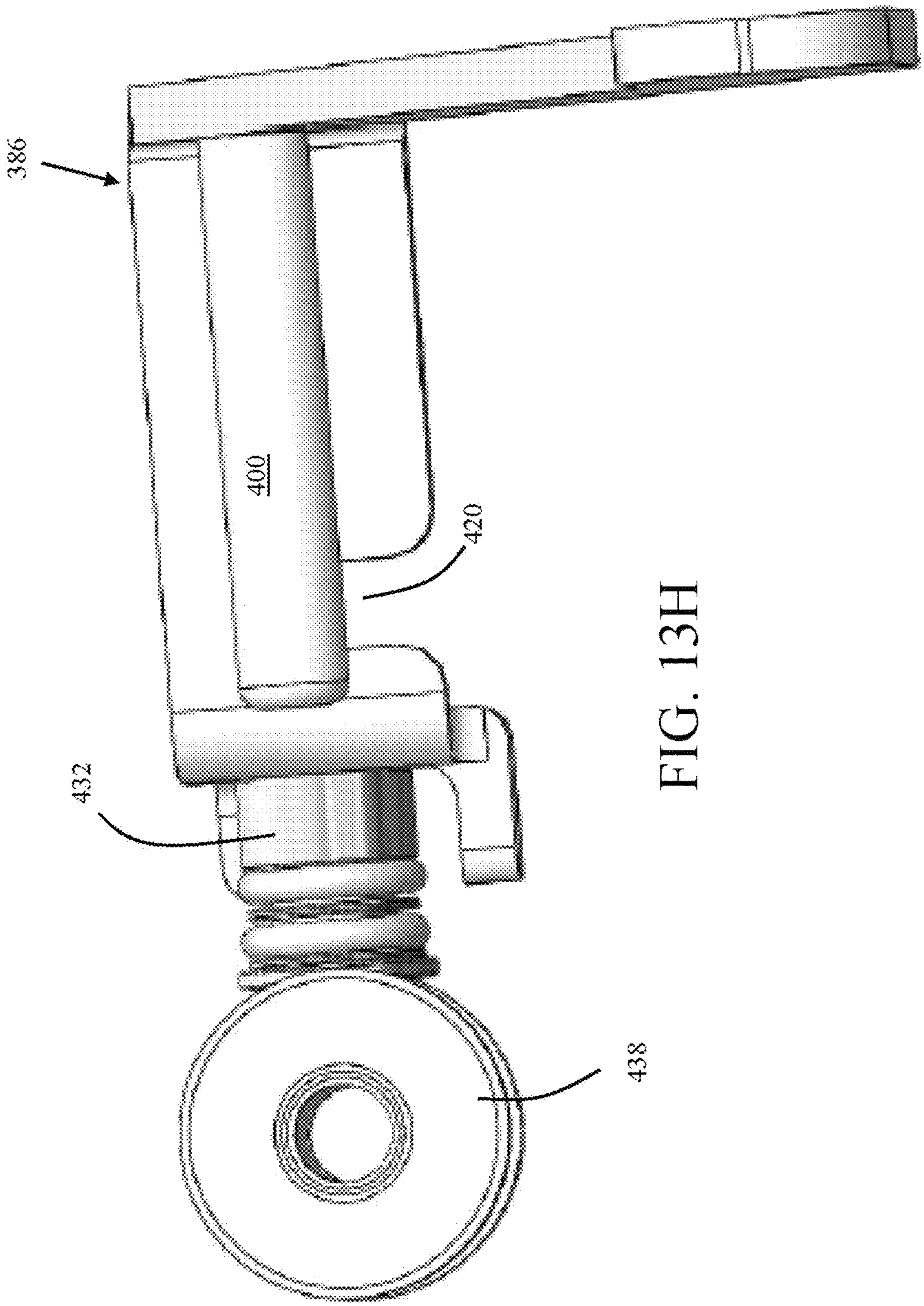
Figure 13I:
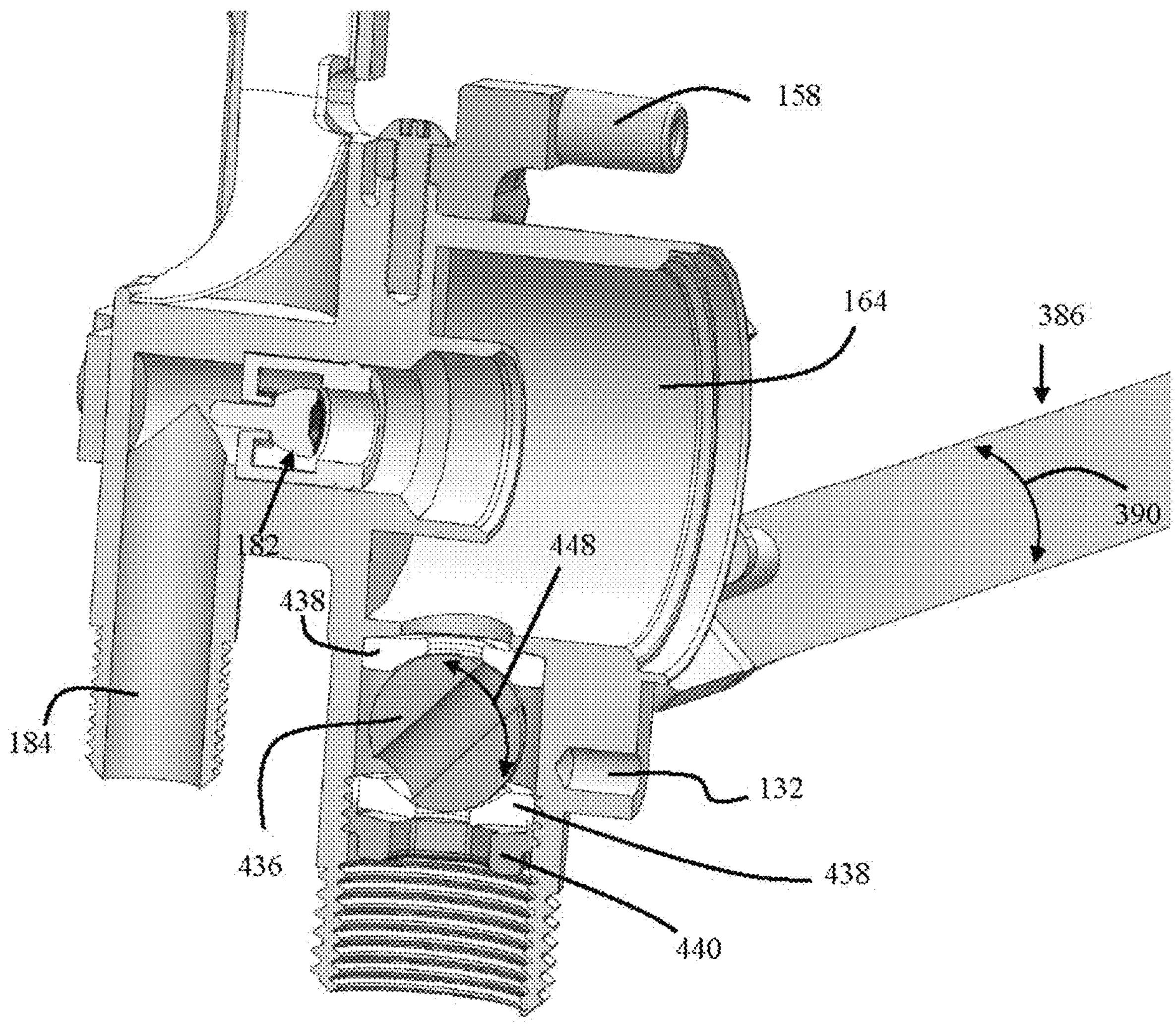

As best illustrated in FIGS. 13G to 13I, pivot pin 432 (also known as ball valve pin) is mechanically connected to a ball valve assembly (which is the main inlet valve 436) in a well-known manner. Ball valve assembly 436 is, very well-known, comprised of ball valve 436, ball valve pin 432, and seats 438, with ball valve 436 connected to pivot pin 432. In general, ball valve 436 has a side-recess that receives an engagement end 450 (FIG. 13G) of pin 432.

In this non-limiting, exemplary embodiment, main inlet valve 436 (i.e., ball valve assembly) is supported by a retainer 440 within main inlet 118. As latch handle 386 is moved in direction 390 (FIGS. 13G and 13I), pivot pin 434 pivots in direction 446 to rotate ball valve 436 in direction 448 to one of open and closed positions.

The illustrated engagement, pins 162 in this non-limiting exemplary embodiment function as indexing feature that move into indexing slots 444 (FIG. 15A) on connecting end 166 of controller module cartridge 104. Engagement pins 162 in this embodiment and indexing slots 444 aid in installing the controller module cartridge 104 onto adapter 108 in the proper orientation. As further illustrated, optical plugs 158 are also positioned on the outer side of controller terminal 164.

FIGS. 14A to 14H are non-limiting, exemplary illustrations of a handle interlock mechanism for the handle of the adapter shown in FIGS. 12A to 13I in accordance with one or more embodiments of the present invention.

Handle latch mechanism 468 includes a latch housing 482 that houses a latch member 474 and a biasing mechanism 480. Biasing mechanism 480 has a default rest position when extended (the spring is not contracted).

As illustrated, as latch handle 386 is pulled from a latched position (FIG. 14A) to an unlatched position (FIGS. 14C to 14H), handle interlock mechanism 468 (generally illustrated within dashed box in FIG. 14A) maintains latch handle 386 in its unlatched position. This way, latch handle 386 is not moved to its latched position accidentally during cleaning or other tasks, but is maintained in the unlatched position (FIGS. 14C to 14H) so to, prevent accidental opening of main inlet valve 436.

Figure 14A:
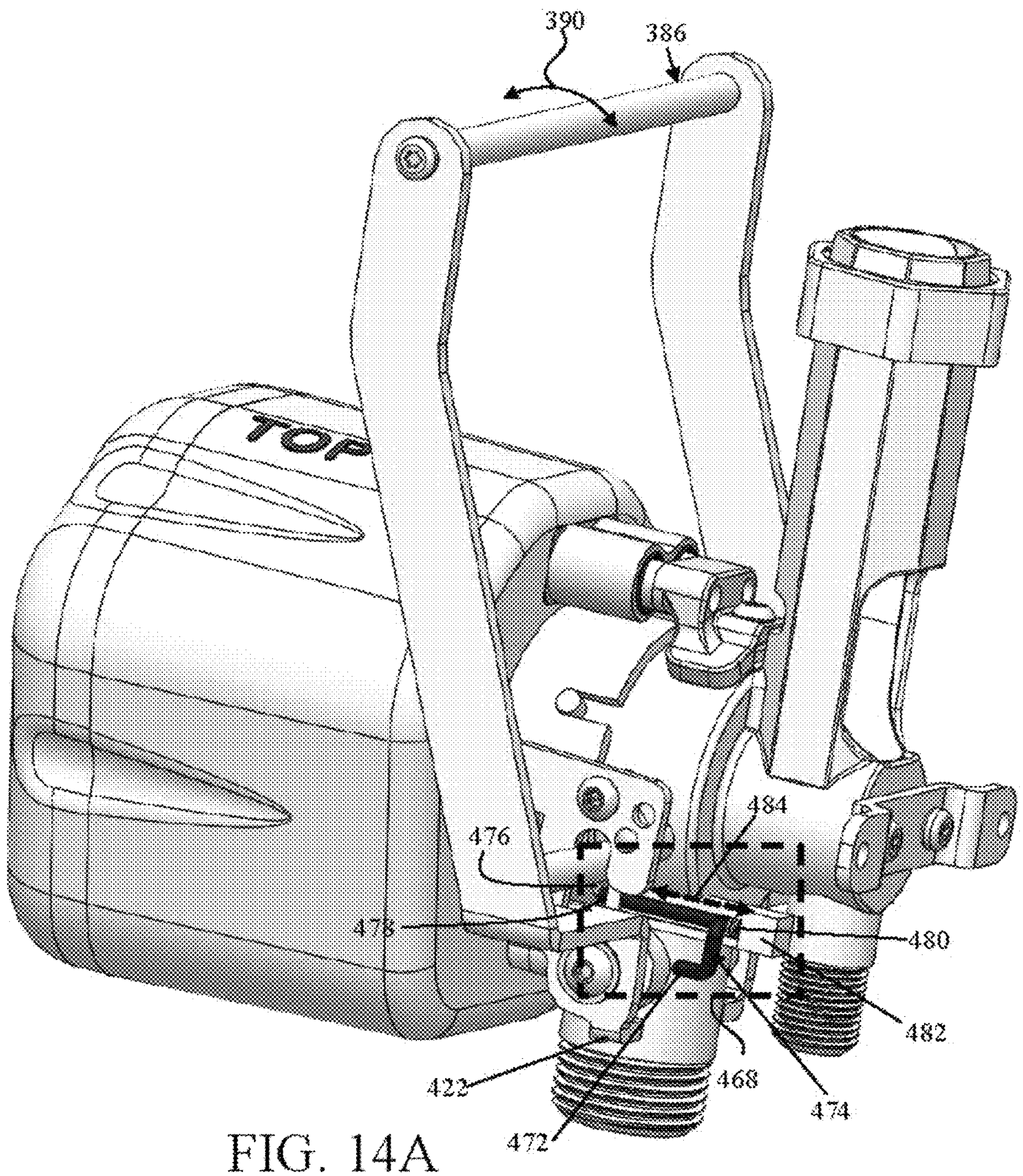
Figure 14B:
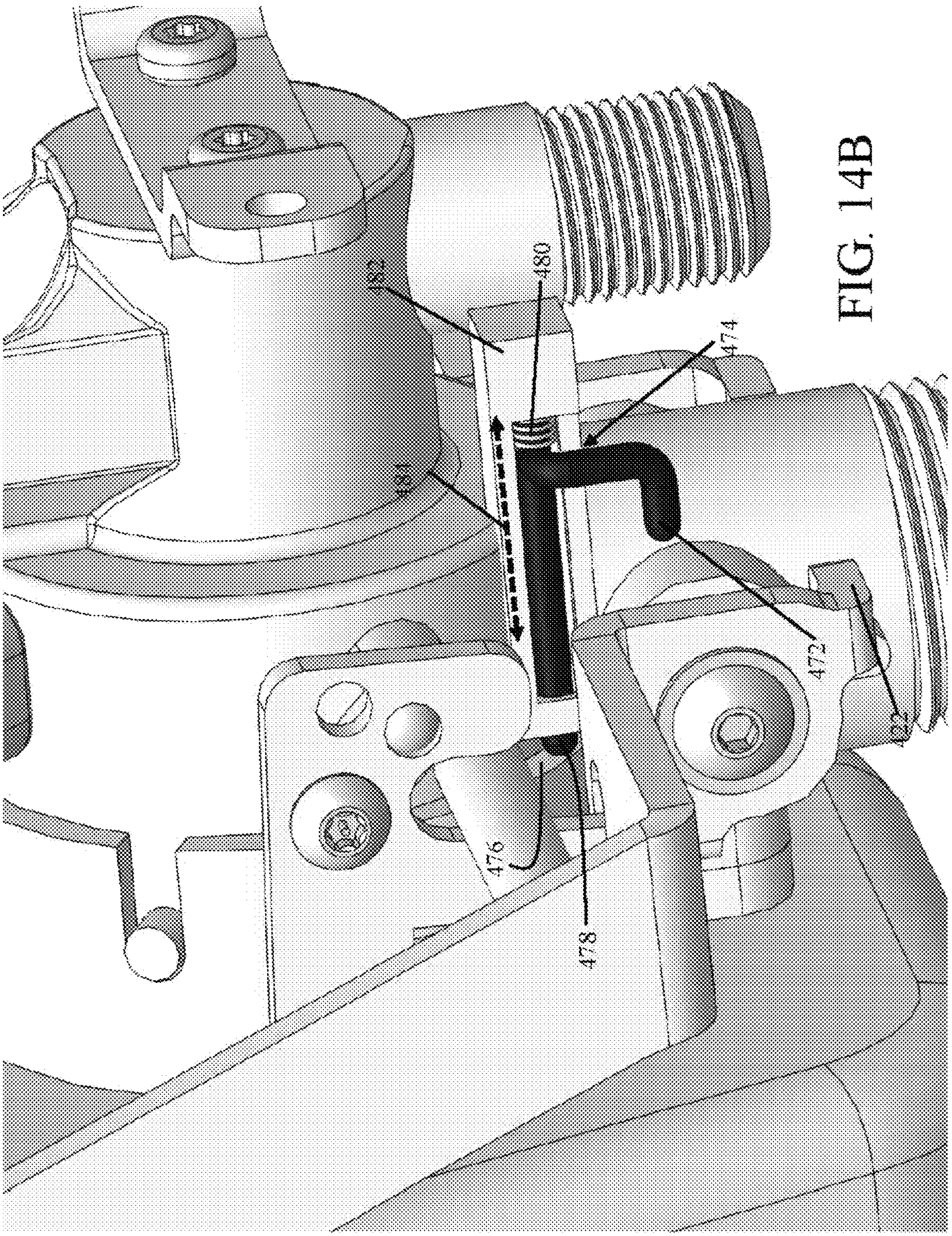
Figure 14C:
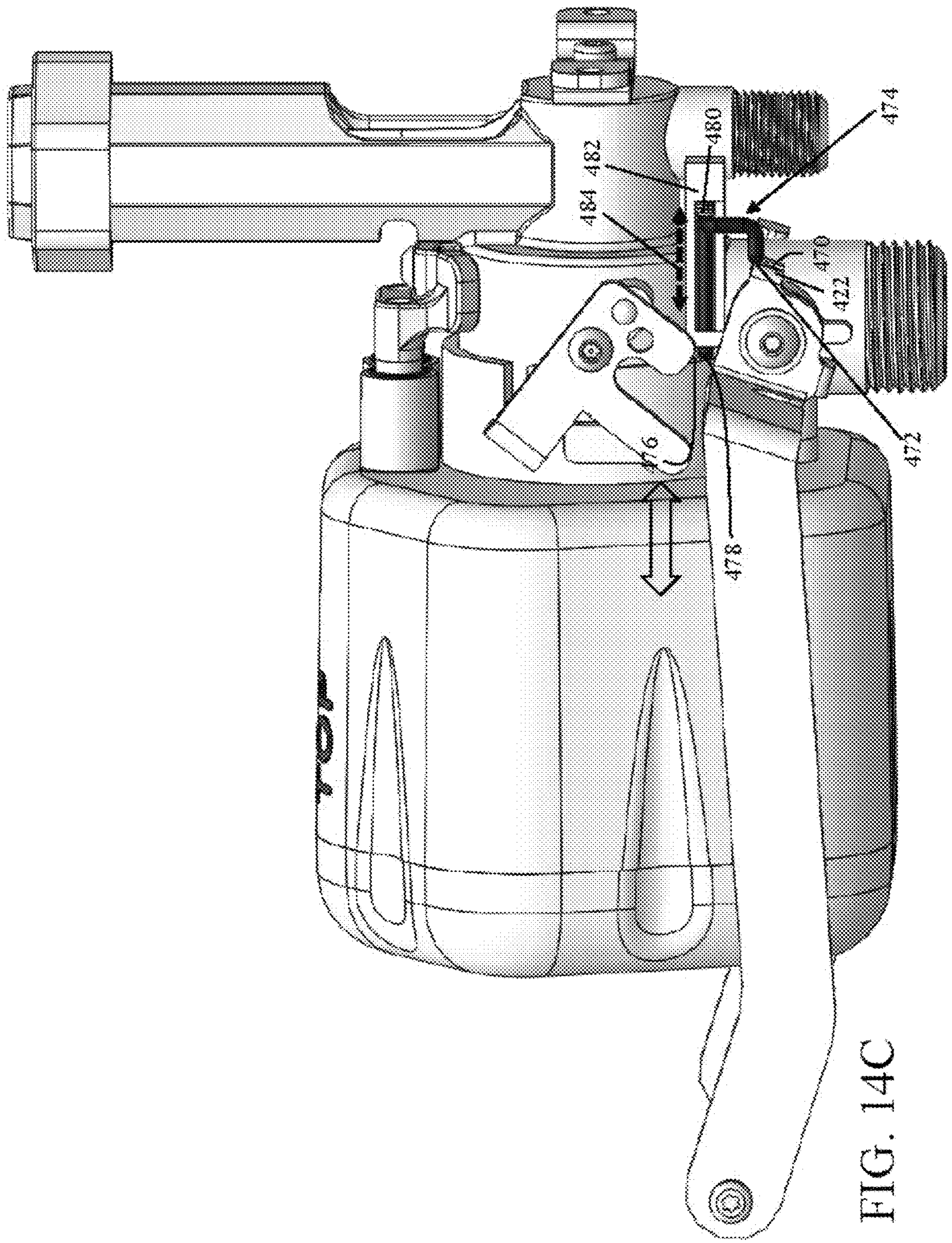
Figure 14D:
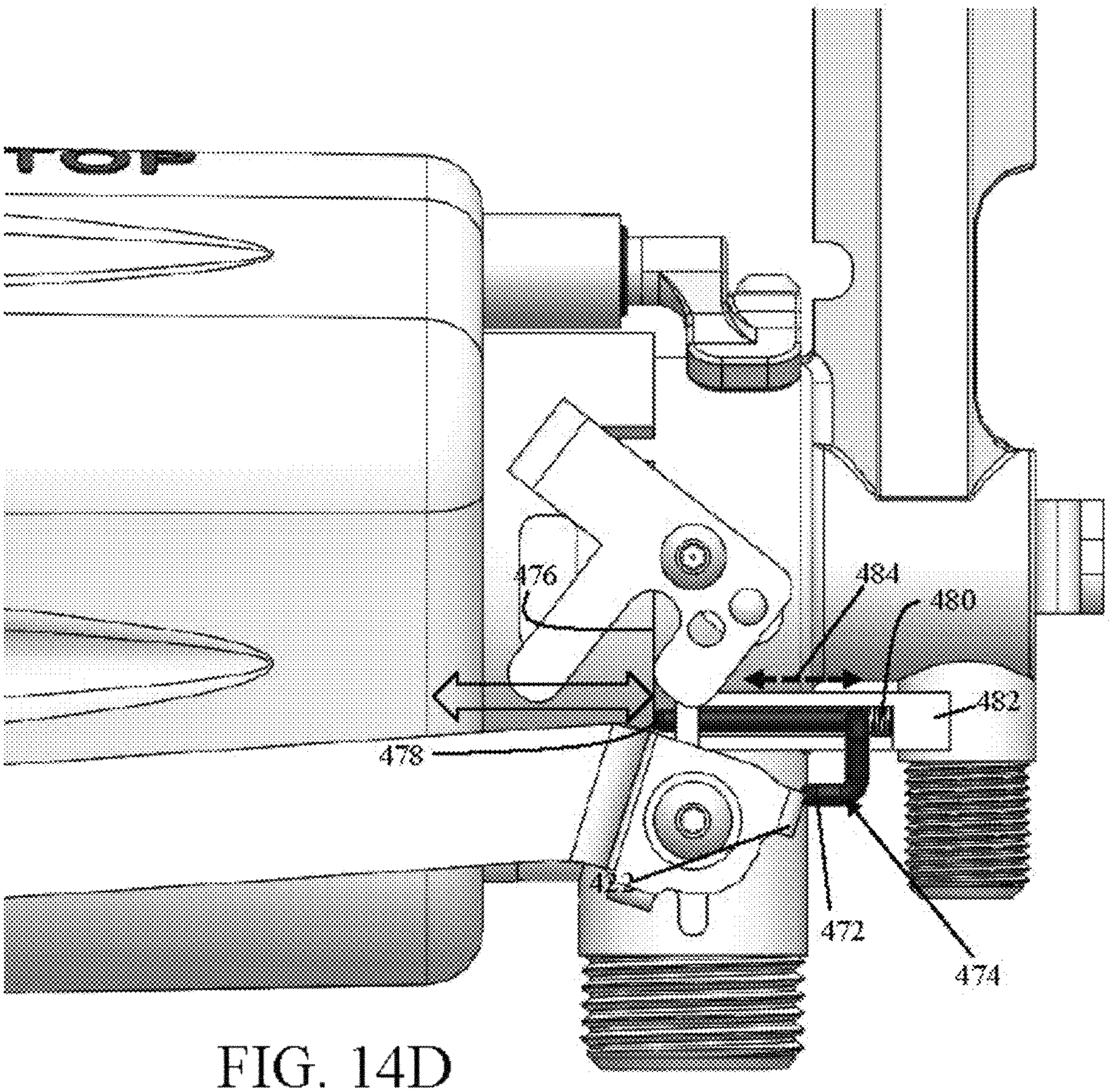
Figure 14E:
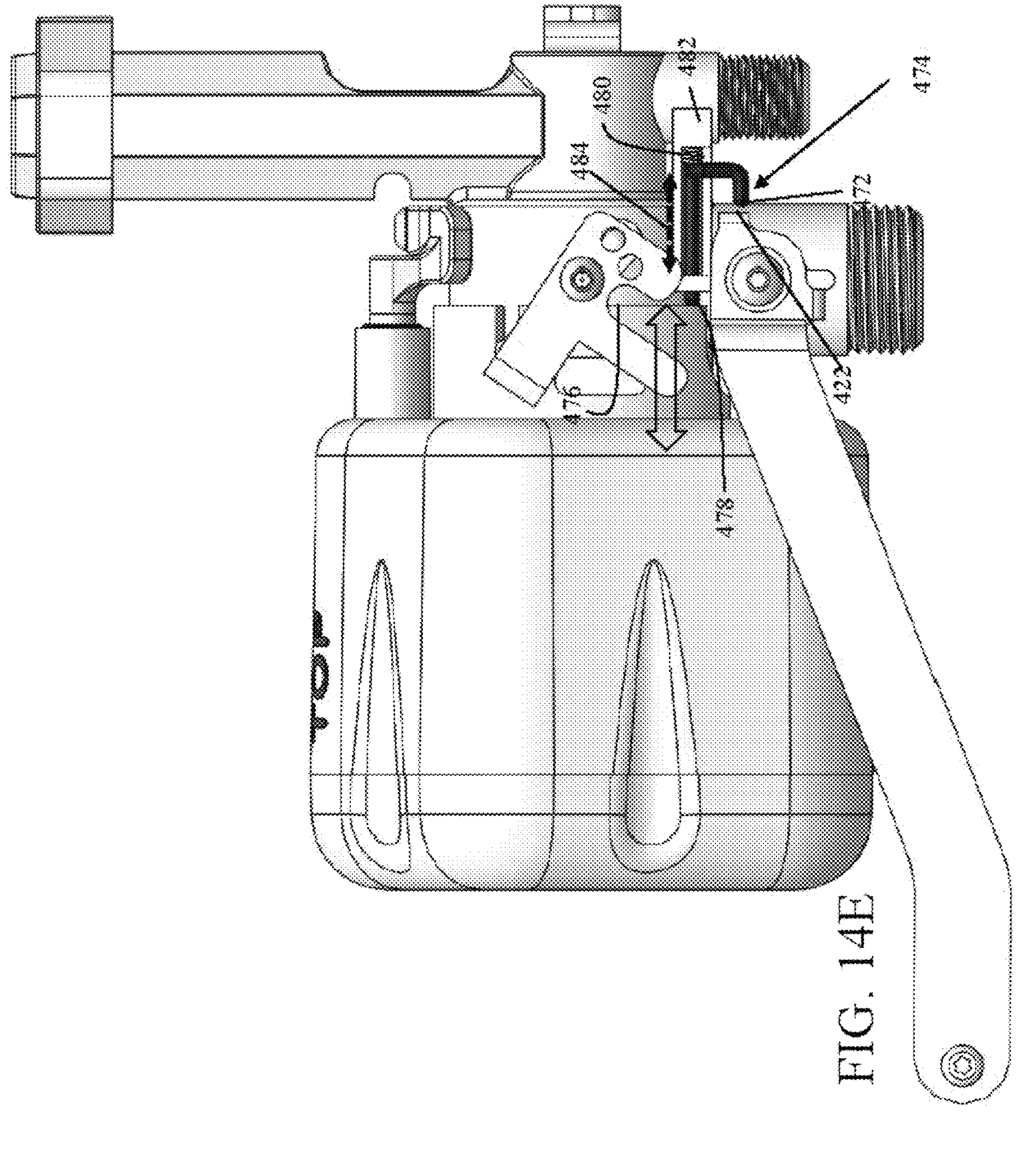
Figure 14F:
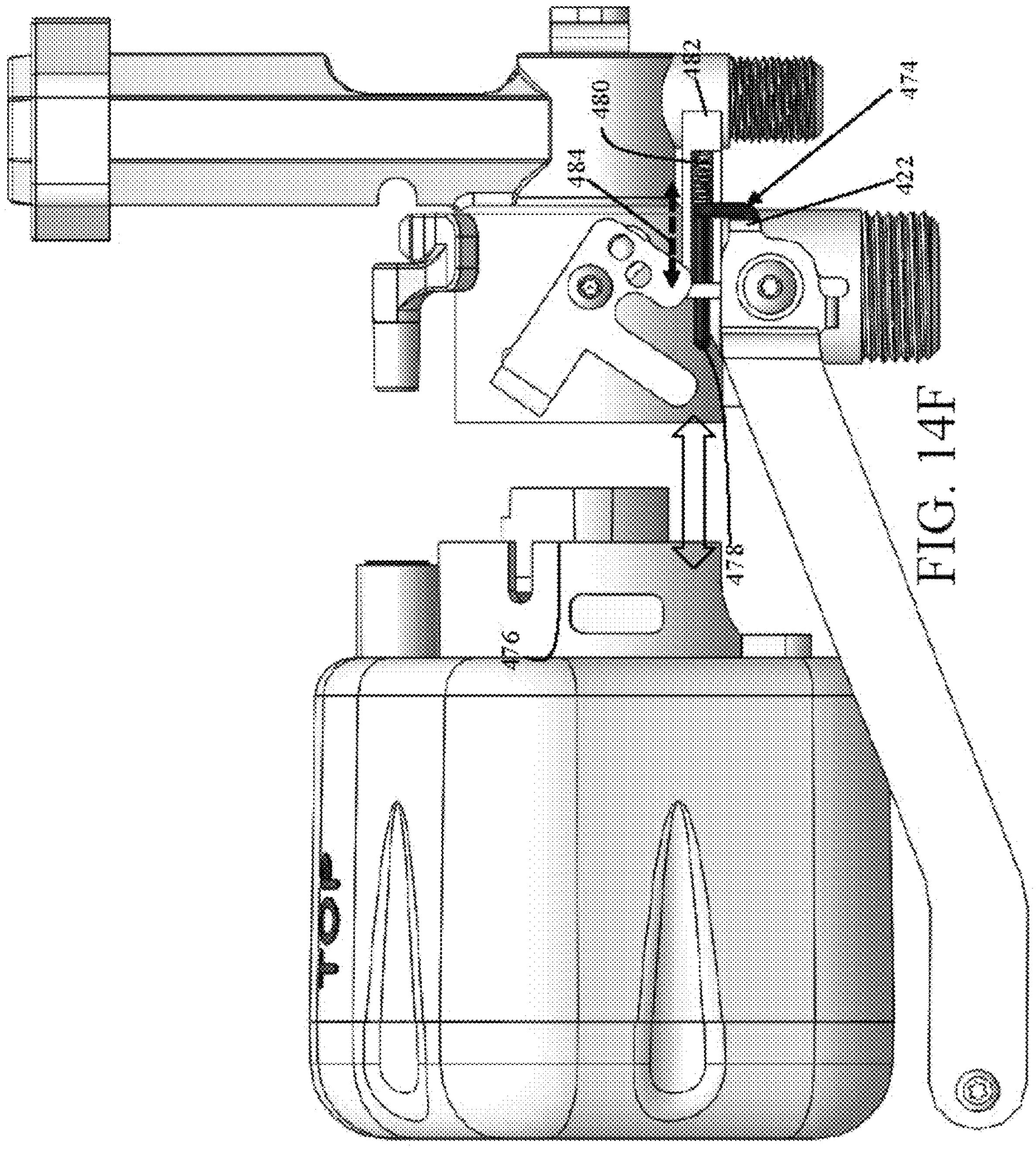
Figure 14G:
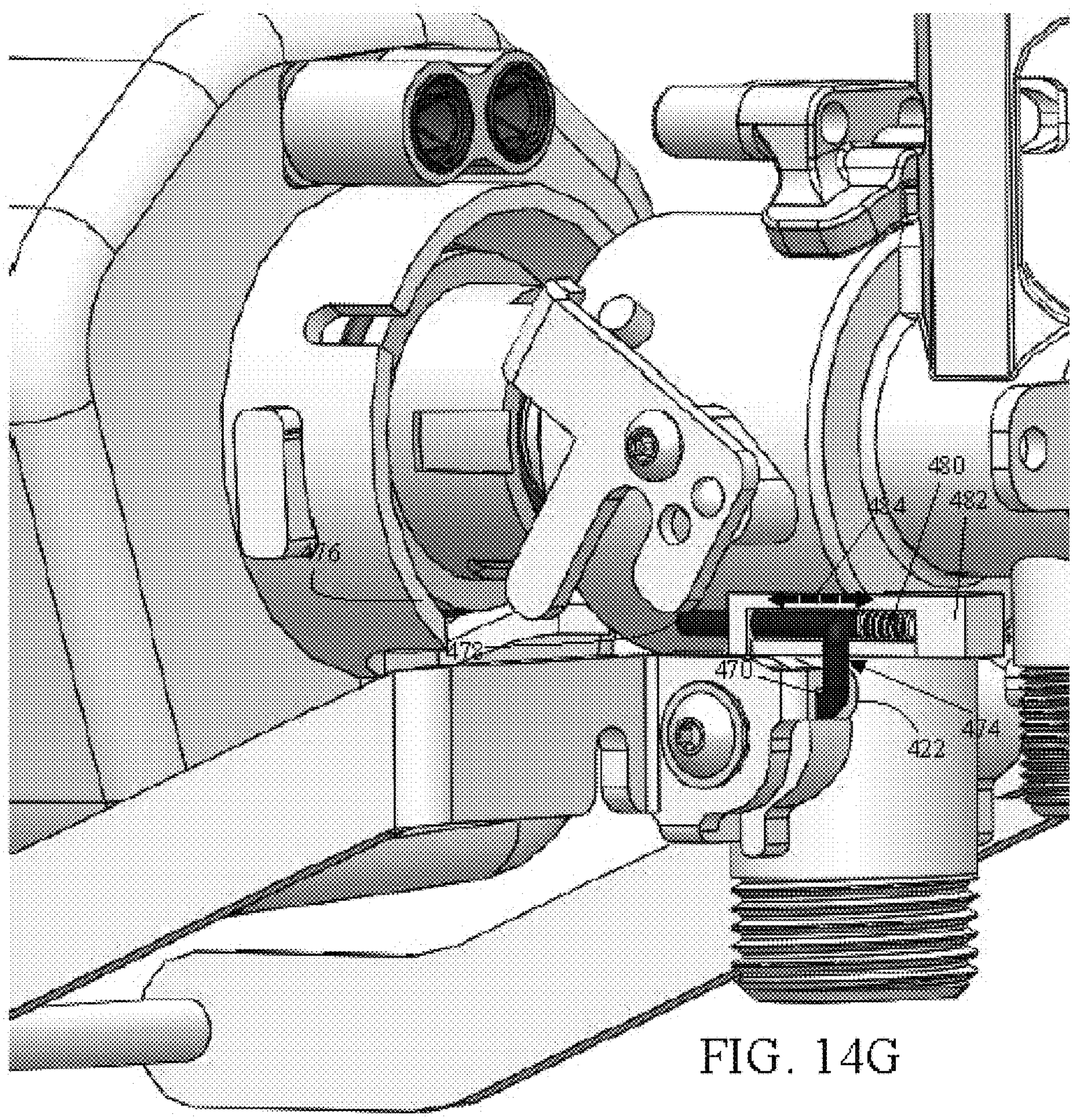
Figure 14H:
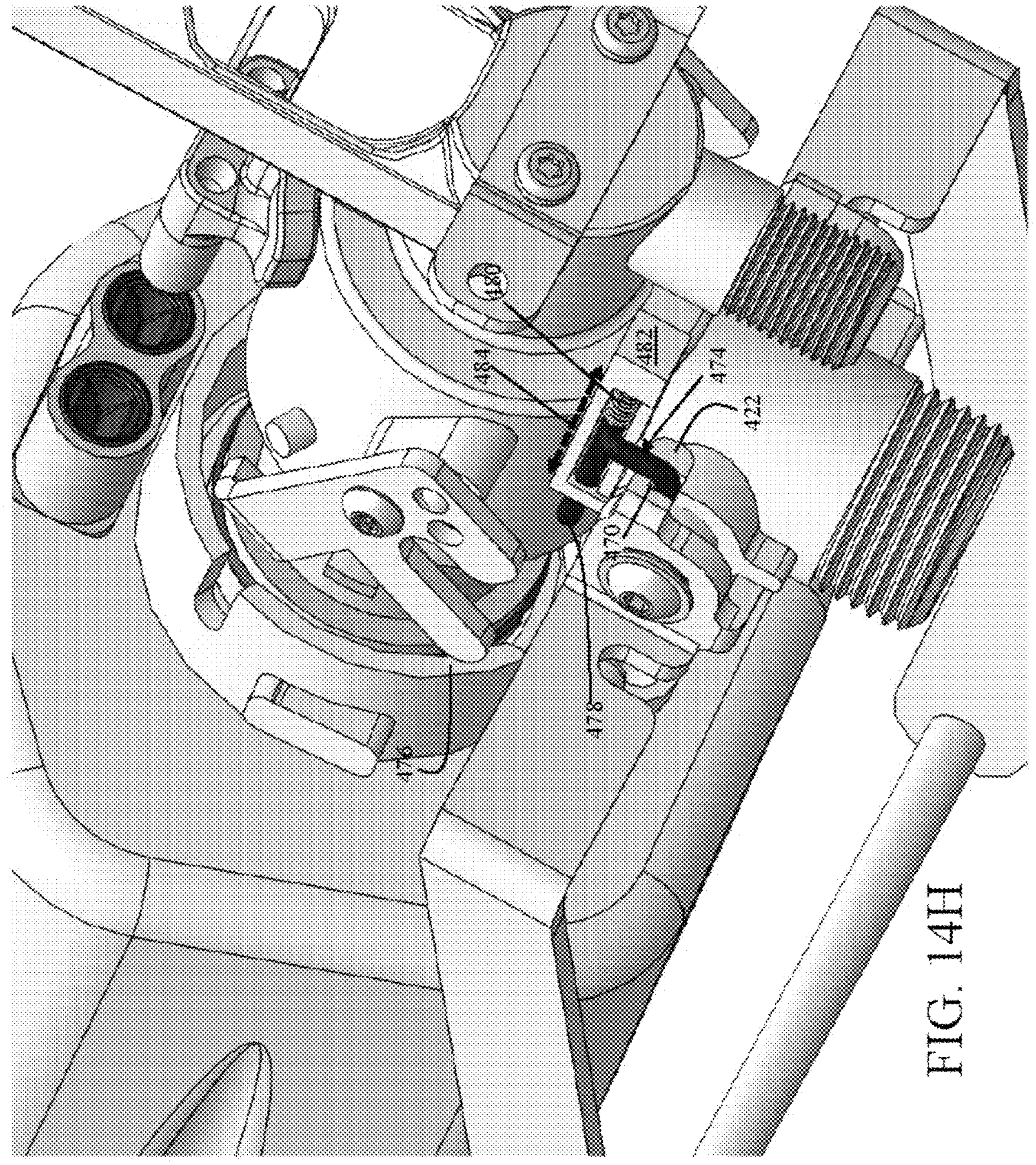

As illustrated in FIGS. 12A to 14H, one or both stop-flanges 422 may comprise a relief 470 to enable a latching-end 472 of latch member 474 to interlock within relief 470 of stop-flange 422 (best shown in FIGS. 14G and 14H). That is, when latch handle 386 is at unlatched position, biasing mechanism 480 at its default rest position pushes latch member 474 along reciprocating path 484 to enable latching end 472 to interlock with relief 470.

When a new or a replacement controller module cartridge 104 is inserted for installation, edge 476 of connecting end 166 contacts and pushes on an engagement end 478 of latch member 474 against biasing mechanism 480 of handle latch mechanism 468 to move latch member 474 along reciprocating path 484, which releases latching end 472 from relief 470 to enable latch handle 386 to move to latched position.

Figure 15A:
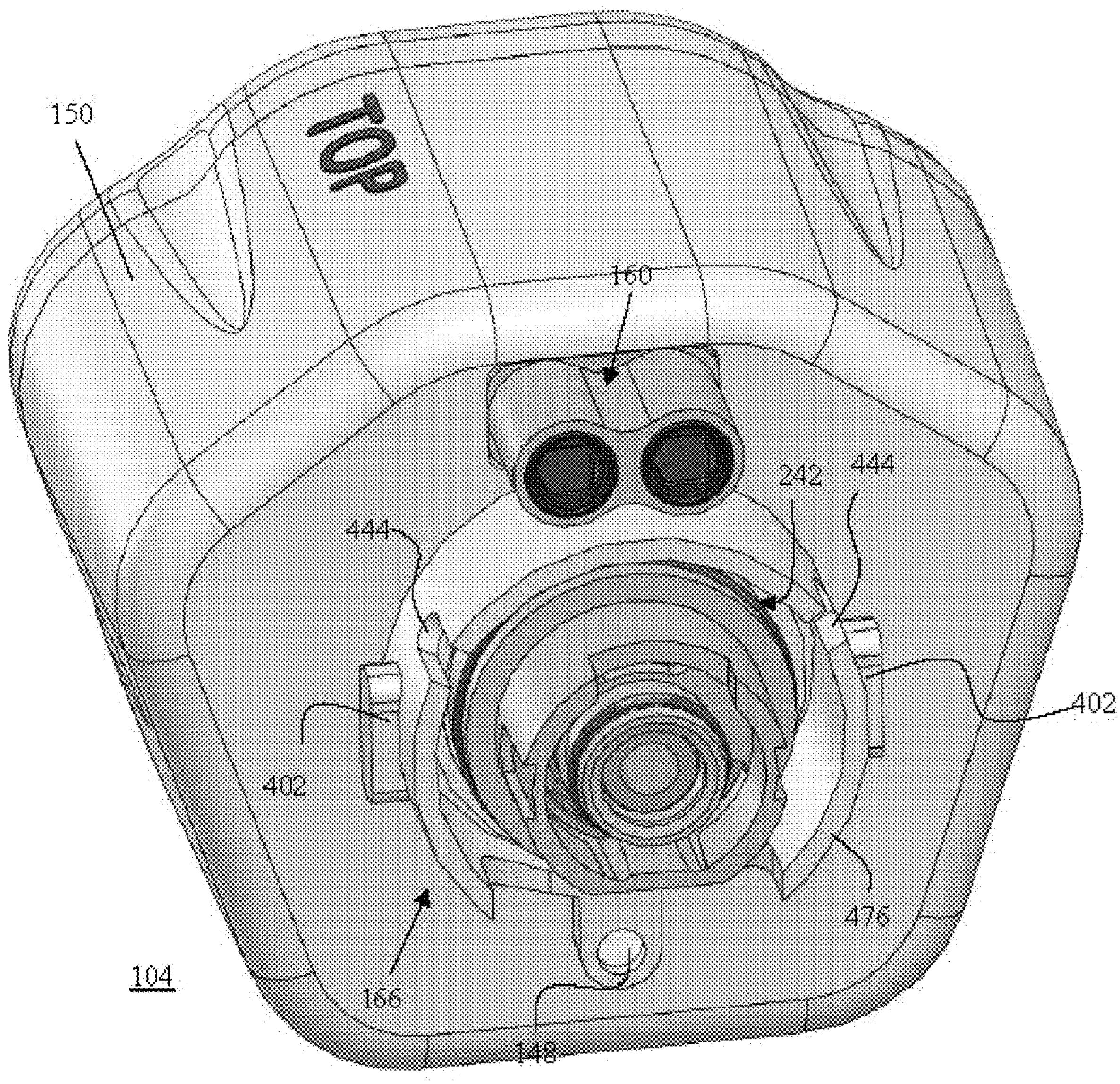
Figure 15B:
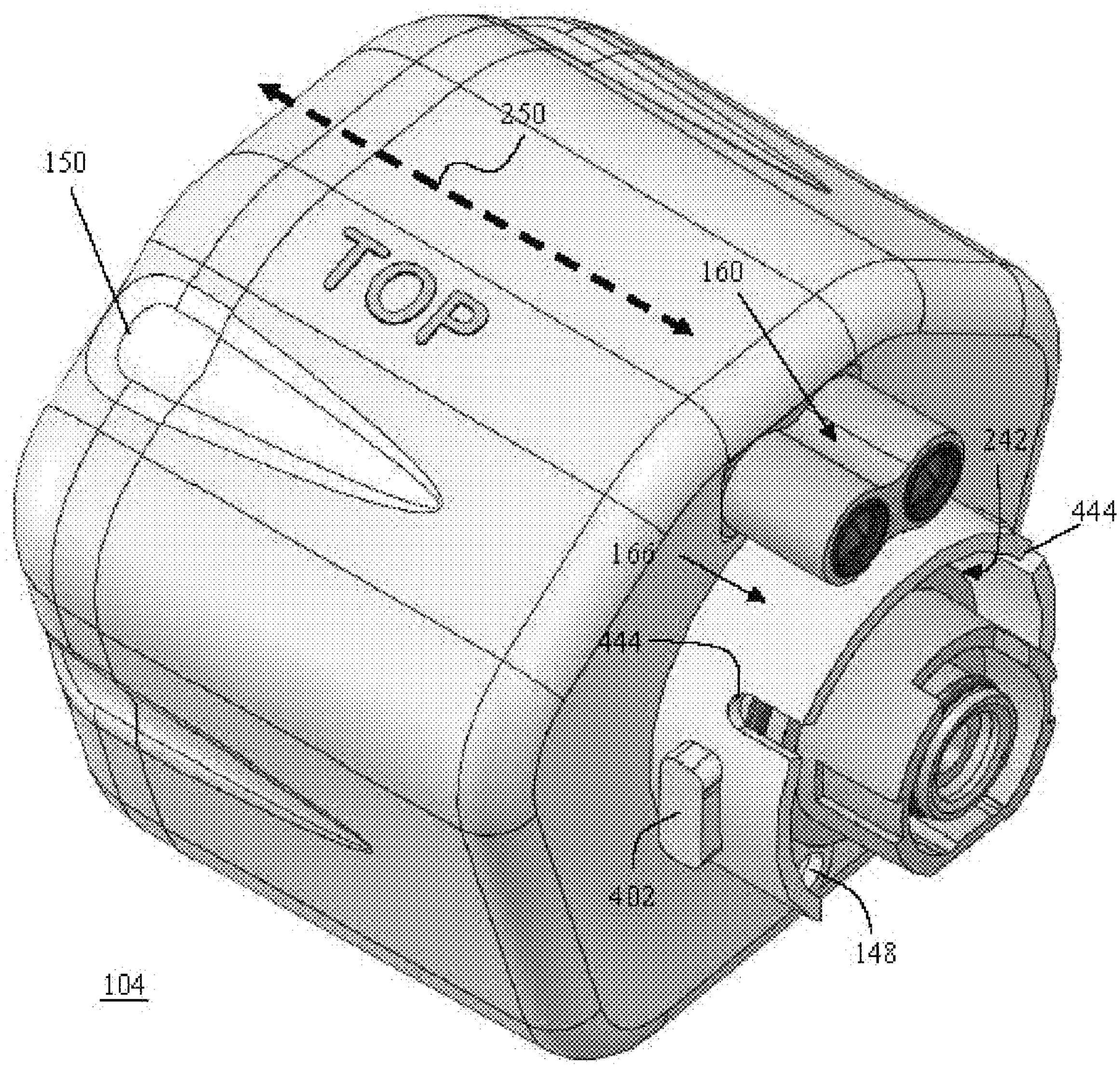

FIGS. 15A and 15B are non-limiting, exemplary illustrations of a controller module cartridge shown in FIGS. 12A to 14H in accordance with one or more embodiments of the present invention. In this non-limiting, exemplary embodiment controller module cartridge 104 is illustrated to use retainer housing 244 of electromechanical device 222 shown in FIGS. 11A to 11K. However, any one of the other types of retainer housings 244 shown throughout the present invention may easily be used for this embodiment.

As illustrated in FIGS. 15A and 15B, controller module cartridge 104 include connecting end 166 comprised of indexing slots 444 that receive two engagement pins 162 (not three like the previous embodiments above). Further included are lateral protuberances that function as lateral-keepers 402 that enable engagement of latching ends 412.

Controller module cartridge 104 further includes optical receptacles 160 that are positioned on an exterior side of housing 150, with optical receptacles 160 oriented parallel to main opening 242 and hence, main axis 250 of controller, module cartridge 104. This arrangement facilitates in easy connection/disconnection of optical plugs 158 with optical receptacles 160 as controller module cartridge 104 is pushed to engage adapter 108.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, instead of using optical valves 208, simple electric or other non-transparent tape may be used to cover over optical receptacles 160 to block impingement of light. However, this has the added disadvantage in that it would require one additional step in installing controller module cartridge 104. That is, one would have to first remove the light blocking tapes first and then commence installing controller module cartridge 104.

As another example instead of plastic fiber optics other well-known technologies may also be used, non-limiting, non-exhaustive listing of examples of which may include light pipes, glass pipes, or technologies capable of light or infrared light transmission. Still another example may include thin paper tape that would break when optical receptacles 160 meet optical plugs 158. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various, members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An electronic faucet, comprising: a spout assembly; a controller module cartridge; and an adapter; the spout assembly is detachably connected to a spout-terminal of the adapter, and the controller module cartridge is detachably connected to a controller terminal of the adapter; the controller module cartridge is replaceable independent of an operational state of an existing downstream or upstream fixture; and as the controller module cartridge engages the adapter, flow of water and optical signals are enabled between the spout assembly and the controller module cartridge; and further, as the controller module cartridge disengages the adapter, flow of water and optical signals are disabled between spout assembly and the controller module cartridge.

2. The electronic faucet as set forth in claim 1, wherein:

a valve operator controls a valve to control flow of water during removal and installation of the controller module cartridge.

3. The electronic faucet as set forth in claim 1, wherein:

optical-valves control flow of optical signals during removal and installation of the controller module cartridge.

4. The electronic faucet as set forth in claim 3, wherein:

the optical valves have a default closed position and are moved to an open position when the controller module cartridge is installed and are closed when the controller module cartridge is removed.

5. The electronic faucet as set forth in claim 1, wherein: optical valves are positioned within optical receptacles mounted on the controller module cartridge.

6. The electronic faucet as set forth in claim 4, wherein: as optical plugs of a set of optical fibers are inserted within the optical receptacles, the optical plugs push open the optical valves to enable flow of optical signals from detector-end of optical fibers to an electronic optical element.

7. The electronic faucet as set forth in claim 1, wherein: the controller module cartridge includes:

a housing having a connecting end for detachably connecting the controller module cartridge to the adapter;

the connecting end is comprised of a main opening through which a retainer of an electromechanical device housed within controller module cartridge extends;

the main opening of the housing is partially surrounded by curved walls;

the curved walls include openings that function as guiding-slots to receive engagement pins of the adapter.

8. The electronic faucet as set forth in claim 1, wherein: the controller module cartridge further includes a security through-opening through which a security fastener is passed to secure controller module cartridge to the adapter.

9. The electronic faucet as set forth in claim 1, wherein: the controller module cartridge further includes optical receptacles that are positioned on an exterior of a housing of the controller module cartridge, with the optical receptacles oriented perpendicular to a main axis of the controller module cartridge.

10. The electronic faucet as set forth in claim 1, wherein: the controller module cartridge interior includes a first compartment for housing an electronic controller module linked with optical receptacles;

the electronic controller module is connected to a set of batteries housed within the interior of the controller module cartridge;

the electronic controller module is further connected to an electromechanical device.

11. The electronic faucet as set forth in claim 10, wherein: a housing of the electromechanical device is comprised of:

an engagement end having:

a valve operator that actuates a main inlet valve to control flow of water.

12. An electronic faucet, comprising: a controller module cartridge that is detachably connected to a spout assembly by an adapter, without tools for detaching; the controller module cartridge is replaceable independent of an operational state of an existing downstream or upstream fixture; as the controller module cartridge engages the adapter, flow of water and optical signals are enabled between the spout assembly and the controller module cartridge; and as the controller module cartridge disengages the adapter, flow of water and optical signals are disabled between spout assembly and the controller module cartridge.

13. The electronic faucet as set forth in claim 12, wherein: a main inlet valve within the adapter closes as the controller module cartridge disengages the adapter; and the main inlet valve within the adapter opens as the controller module cartridge engages the adapter.

14. The electronic faucet as set forth in claim 12, wherein: flow of water is controlled optically via optical communications between spout assembly and controller module cartridge.

15. The electronic faucet as set forth in claim 12, wherein: the controller module cartridge includes optical receptacles communicatively associated with an electronic controller module circuitry for control of flow of water when the controller module cartridge is installed onto adapter.

16. The electronic faucet as set forth in claim 12, wherein: the adapter includes optical plugs communicatively associated with an electronic controller module circuitry of the controller module cartridge via optical receptacles for control of flow of water when the controller module cartridge is installed onto the adapter.

17. An electronic faucet, comprising: a spout assembly; a controller module cartridge; and an adapter; the controller module cartridge is replaceable independent of an operational state of an existing downstream or upstream fixture wherein: as the controller module cartridge engages the adapter, flow of water and communication signals are enabled between the spout assembly and the controller module cartridge only when the controller module cartridge is installed; wherein: as the controller module cartridge disengages the adapter, flow of water and communication signals are disabled between spout assembly and the controller module cartridge.

18. The electronic faucet as set forth in claim 17, wherein: the spout assembly is comprised of:

a shell that encases:

an aerator housing and an aerator;

a set of plastic optical fibers (POF), detecting-ends of which are secured with the aerator housing; and a hose through which water passes, an egress end of which is connected to aerator though which water exits.

19. The electronic faucet as set forth in claim 17, wherein: the spout assembly is comprised of:

a shank end that is connected to a spout-terminal of the adapter.

20. The electronic faucet as set forth in claim 17, wherein: a spout-terminal end of a spout terminal of the adapter detachably press-interlocked-fits within a shank end of a shank of the spout assembly.

21. The electronic faucet as set forth in claim 20, wherein: the shank end is comprised of:

an inner surface that has a flat polygonal configuration, and an outer circumferential surface that is threaded.

22. The electronic faucet as set forth in claim 20, wherein: the spout terminal end is comprised of:

an outer surface that has a polygonal configuration with tapered edges to form chamfer polygonal sides to facilitate engagement of the spout-terminal with an inner surface of a shank end.

23. The electronic faucet as set forth in claim 22, wherein: tapered edges continue to press against inner surface of shank end as a fastener is tightened onto a threaded outer circumference surface of the shank end, pulling the spout terminal end further into a tighter and deeper engagement with shank end.

24. The electronic faucet as set forth in claim 23, wherein: outer surface of spout terminal and inner surface of shank end interlock due to polygonal configurations of outer and inner surfaces of respective spout terminal end and shank end.

25. The electronic faucet as set forth in claim 17, wherein: the adapter is comprised of:

a bracket for maintaining optical plugs aligned with optical receptacle of optical sensory unit to enable removal and installation of controller module cartridge.

* * * * *